(12) United States Patent
McCrossan et al.

(10) Patent No.: US 8,350,870 B2
(45) Date of Patent: Jan. 8, 2013

(54) RECORDING MEDIUM, REPRODUCTION APPARATUS, RECORDING METHOD, REPRODUCING METHOD, PROGRAM, AND INTEGRATED CIRCUIT

(75) Inventors: Joseph McCrossan, Simi Valley, CA (US); Tomoyuki Okada, Nara (JP); Tomoki Ogawa, Amagasaki (JP)

(73) Assignee: Panasonic Corporation, Osaka (JP)

( * ) Notice: Subject to any disclaimer, the term of this patent is extended or adjusted under 35 U.S.C. 154(b) by 141 days.

(21) Appl. No.: 12/341,265

(22) Filed: Dec. 22, 2008

(65) Prior Publication Data
US 2009/0185789 A1    Jul. 23, 2009

Related U.S. Application Data

(62) Division of application No. 10/554,627, filed on Oct. 18, 2006, now Pat. No. 7,505,050.

(51) Int. Cl.
*G09G 5/00* (2006.01)
*H04N 9/74* (2006.01)
*H04N 9/79* (2006.01)
*H04N 5/91* (2006.01)

(52) U.S. Cl. ........ 345/629; 348/589; 386/216; 386/219; 386/246

(58) Field of Classification Search ................ None
See application file for complete search history.

(56) References Cited

U.S. PATENT DOCUMENTS

| | | | |
|---|---|---|---|
| 5,741,136 A | 4/1998 | Kirksey et al. | |
| 5,907,659 A | 5/1999 | Yamauchi et al. | |
| 5,938,447 A | 8/1999 | Kirksey | |
| 6,062,863 A | 5/2000 | Kirksey et al. | |
| 6,189,064 B1* | 2/2001 | MacInnis et al. | 710/244 |
| 6,273,726 B1 | 8/2001 | Kirksey et al. | |
| 6,275,852 B1 | 8/2001 | Filepp et al. | |
| 6,285,825 B1* | 9/2001 | Miwa et al. | 386/98 |
| 6,473,102 B1 | 10/2002 | Rodden et al. | |
| 7,142,225 B1 | 11/2006 | Boler et al. | |
| 2001/0026561 A1 | 10/2001 | Morris et al. | |
| 2002/0196467 A1 | 12/2002 | Delhoune et al. | |
| 2003/0035063 A1 | 2/2003 | Orr | |
| 2003/0142236 A1 | 7/2003 | Aratani et al. | |
| 2004/0081434 A1 | 4/2004 | Jung et al. | |
| 2004/0095831 A1 | 5/2004 | Hino et al. | |
| 2004/0213542 A1 | 10/2004 | Hamasaka et al. | |

(Continued)

FOREIGN PATENT DOCUMENTS
EP    0 920 014    6/1999
(Continued)

OTHER PUBLICATIONS

European Broadcasting Union, "Digital Video Broadcasting (DVB); Subtitling Systems"; Final Draft ETSI EN 300 743 V1.2.1 (Jun. 2002) (European Standard, Telecommunications series); pp. 1-48.

(Continued)

*Primary Examiner* — Tize Ma

(57) ABSTRACT

A recording medium storing an AVClip structured by multiplexing video stream and a graphics stream. The graphics stream represents a moving picture made of a plurality of pictures, and the graphics stream includes graphics data representing graphics to be combined with the pictures. The graphics stream also includes window information (WDS) that specifies a window for rendering the graphics, and that indicates a width, a height and a position of the window on a plane which is a plane memory of a reproduction apparatus that combines the graphics with the pictures.

2 Claims, 42 Drawing Sheets

U.S. PATENT DOCUMENTS

2004/0217971 A1 * 11/2004 Kim et al. .................... 345/589

FOREIGN PATENT DOCUMENTS

| EP | 1 130 909 | 9/2001 |
| JP | 2002209177 | 7/2002 |
| JP | 2003219372 | 7/2003 |
| RU | 2 119 187 | 5/1991 |
| RU | 2195708 | 12/2002 |
| TW | 579505 | 3/2004 |
| WO | 96/19077 | 6/1996 |
| WO | 00/28518 | 5/2000 |
| WO | WO 00/46988 | 8/2000 |
| WO | WO 02/23914 | 3/2002 |

OTHER PUBLICATIONS

ETSI EN 300 743 V1.2.1 (Oct. 2002) "Digital Video Broadcasting (DVB); Subtitling Systems" European Broadcasting Union, pp. 6-21.

Russian Application No. 2007140686/28(044534) Office Action (Decision on Grant), Aug. 16, 2011, 13 pages including English Translation.

European Application No. 10179417.0, Extend search report dated Jul. 8, 2011, 12 pages.

European Application No. 10179413.9, Extend search report dated Jul. 8, 2011, 12 pages.

* cited by examiner

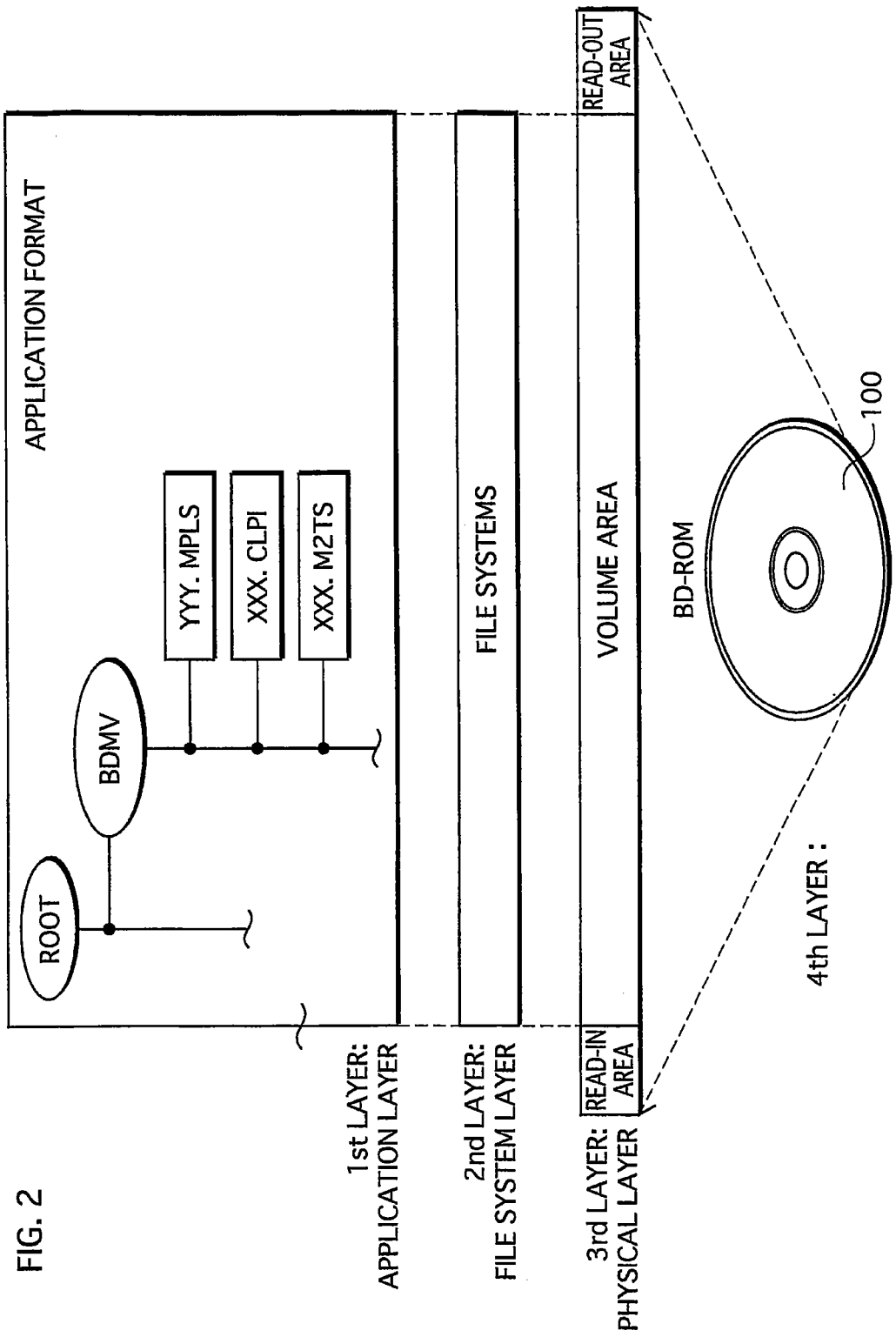

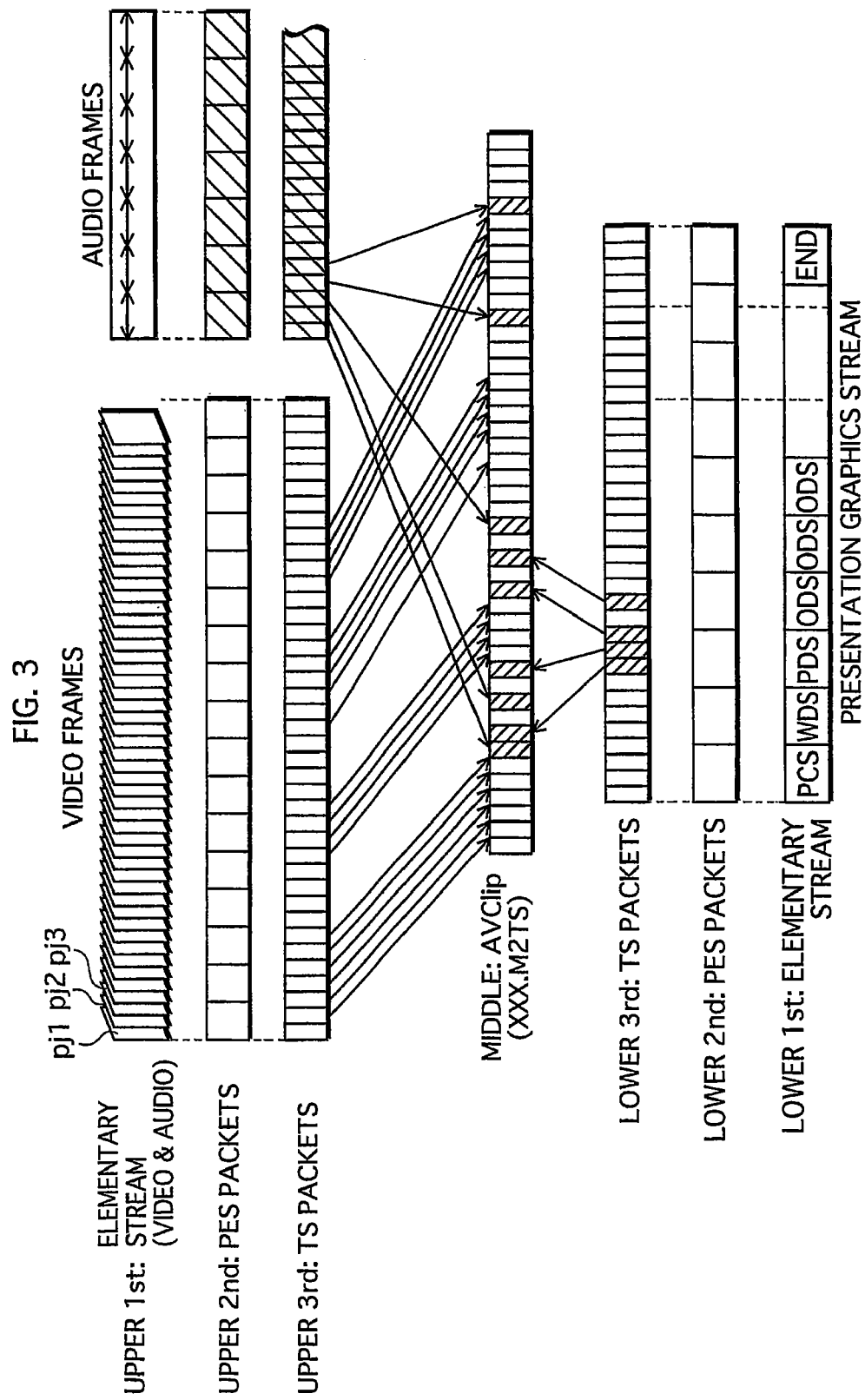

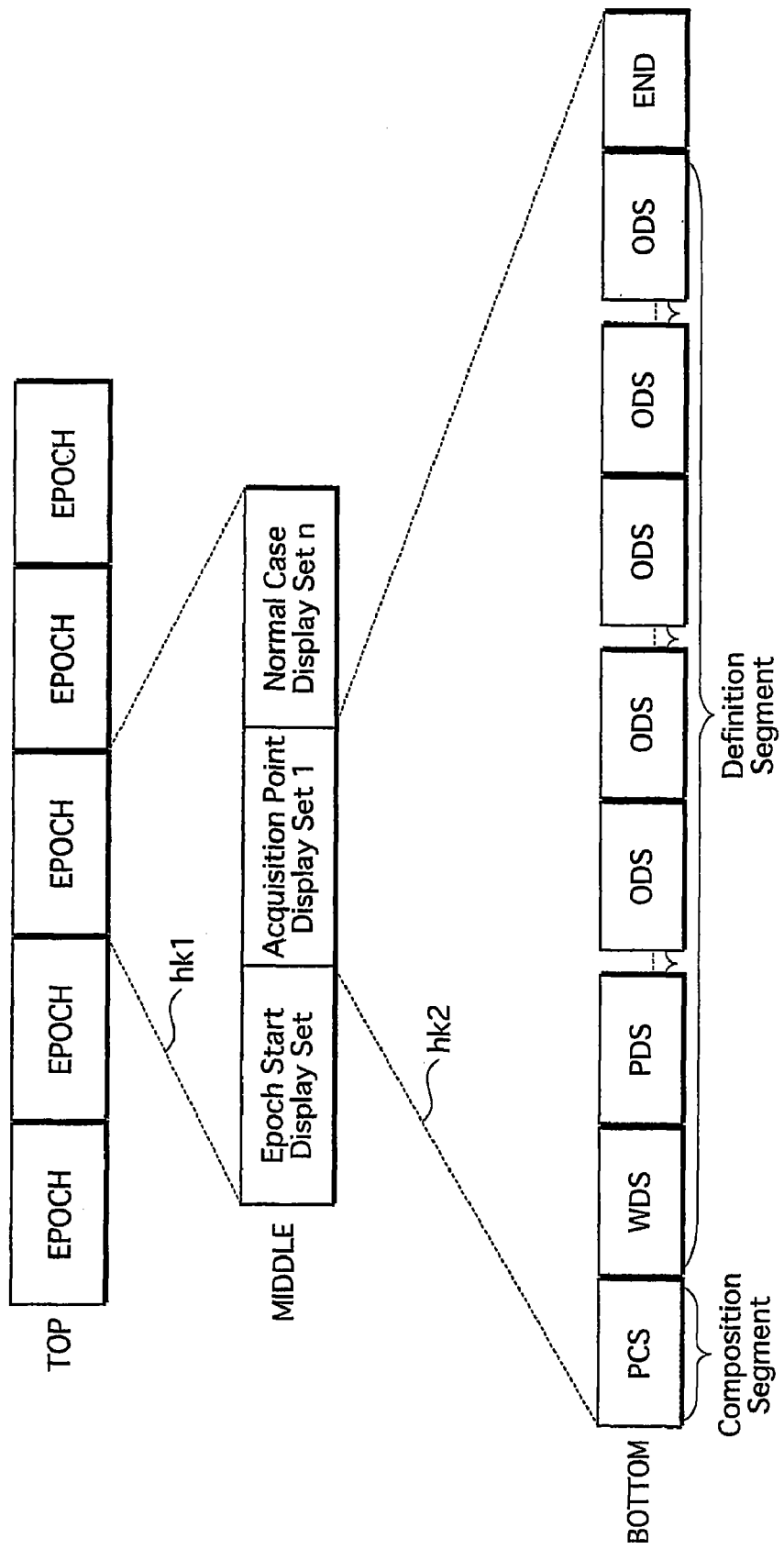

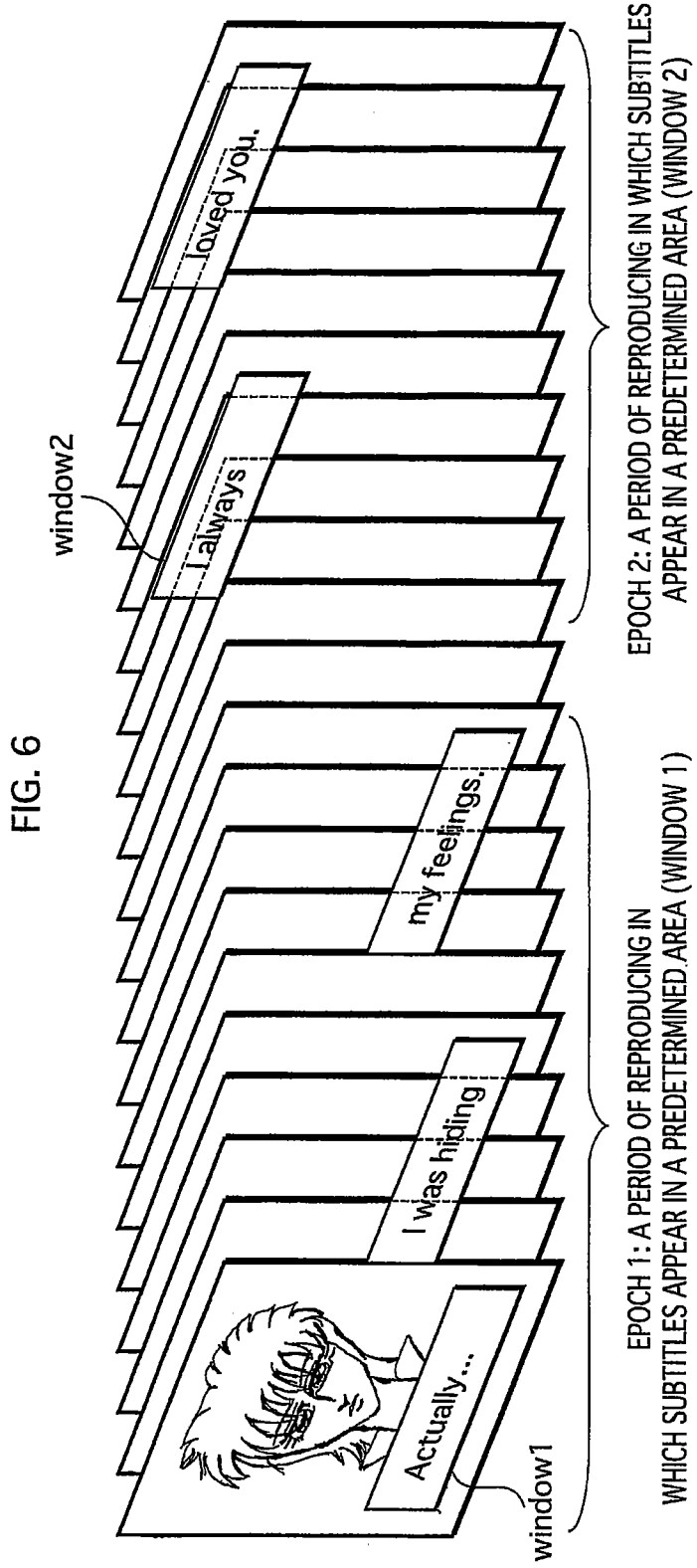

FIG. 8A
window_definition_segment

| window_id |
|---|
| window_horizontal_position |
| window_vertical_position |
| window_width |
| window_height |

FIG. 8B
presentation_composition_segment

| segment_type |
|---|
| segment_length |
| composition_number |
| composition_state |
| palette_update_flag |
| palette_id |
| window_information(1) |
| window_information(2) |
| ... |
| window_information(i) |
| ... |
| window_information(m) | wd1

| object_id |
|---|
| window_id |
| object_cropped_flag |
| object_horizontal_position |
| object_vertical_position |
| cropping_rectangle_information(1) |
| cropping_rectangle_information(2) |
| ... |
| cropping_rectangle_information(i) |
| ... |
| cropping_rectangle_information(n) | wd2

| object_cropping_horizontal_position |
|---|
| object_cropping_vertical_position |
| object_cropping_width |
| object_cropping_height |

FIG. 17
OBJECT BUFFER
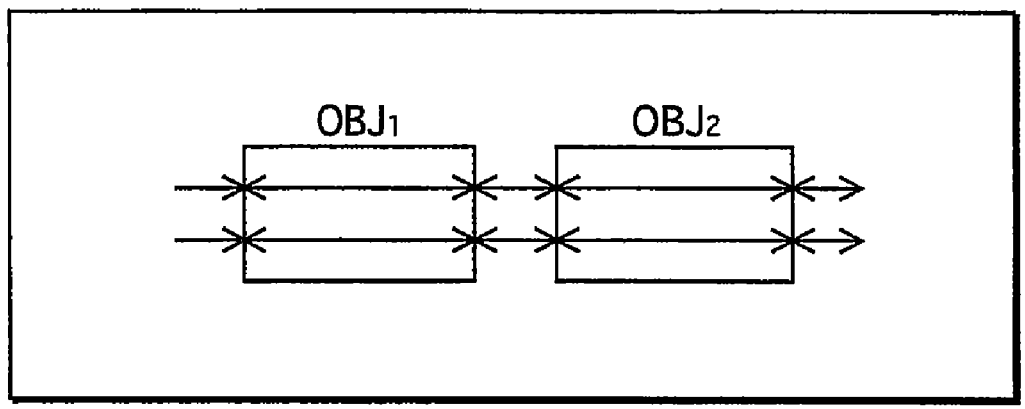
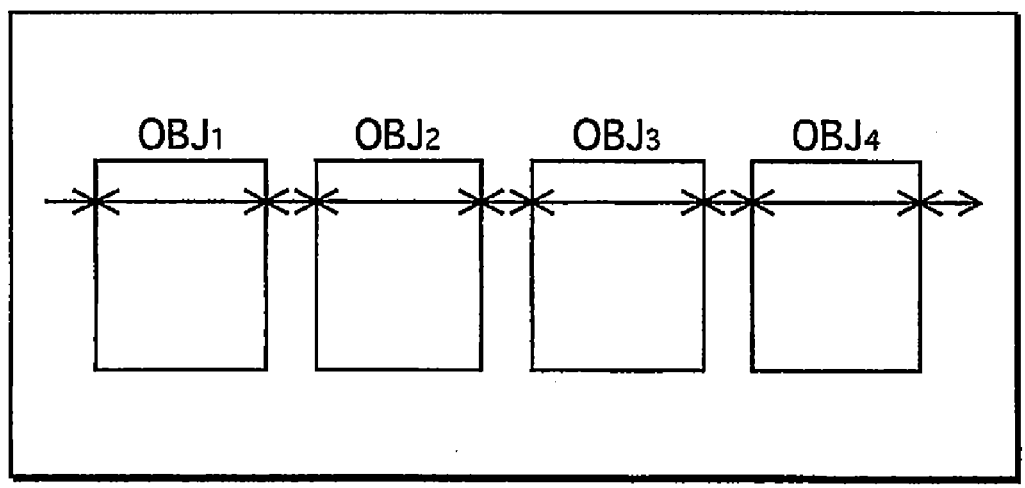
X: EDGE

FIG. 18

PTS( DSn[PCS)] )>=DTS( DSn[PCS] )+DECODEDURATION( DSn )

Where:
- DECODEDURATION( DSn ) is calculated as follows:

```
decode_duration = 0 ;
decode_duration += PLANEINITIALIZATIONTIME( DSn ) ;
if( DSn. PCS. num_of_objects == 2 )
{
        decode_duration += WAIT( DSn, DSn. PCS. OBJ[0], decode_duration ) ;
        if( DSn. PCS. OBJ[0]. window_id == DSn. PCS. OBJ[1]. window_id )
        {
                decode_duration += WAIT( DSn, DSn. PCS. OBJ[1], decode_duration ) ;
                decode_duration += 90000*( SIZE( DSn. PCS. OBJ[0]. window_id )//256*10⁶ ) ;
        }
        else
        {
                decode_duration += 90000*( SIZE( DSn. PCS. OBJ[0]. window_id )//256*10⁶ ) ;
                decode_duration += WAIT( DSn, DSn. PCS. OBJ[1], decode_duration );
                decode_duration += 90000*( SIZE( DSn. PCS. OBJ[1]. window_id )//256*10⁶ ) ;
        }
}
else if( DSn. PCS. num_of_objects ==1 )
{
        decode_duration += WAIT( DSn, DSn. PCS. OBJ[0], decode_duration ) ;
        decode_duration += 90000*( SIZE( DSn. PCS. OBJ[0]. window_id )//256*10⁶ ) ;
}
return decode_duration ;
```

- PLANEINITIALIZATIONTIME( DSn ) is calculated as follows:

```
initialize_duration=0 ;
if( DSn. PCS. composition_state= = EPOCH_START )
{
    initialize_duration = 90000*( 8*video_width*video_height//256*10⁶) ;
}
else
{
    for( i=0 ; i < WDS. num_windows ; i++ )
    {
            if( EMPTY(DSn.WDS.WIN[i],DSn ) )
                initialize_duration += 90000*( SIZE( DSn. WDS. WIN[i] )//256*10⁶) ;
    }
}
return initialize_duration ;
```

- WAIT( DSn, OBJ, current_duration ) is calculated as follows:

```
wait_duration = 0 ;
if( EXISTS( OBJ. object_is, DSn ) )
{
    object_definition_ready_time = PTS( GET( OBJ. object_id. DSn ) ) ;
    current_time = DTS( DSn. PCS )+current_duration ;
    if( current_time < object_definition_ready_time )
            wait_duration += object_definition_ready_time - current_time ) ;
}
return wait_duration ;
```

DECODE_DURATION
=(2)+(3)

DECODE_DURATION
=(1)+(3)

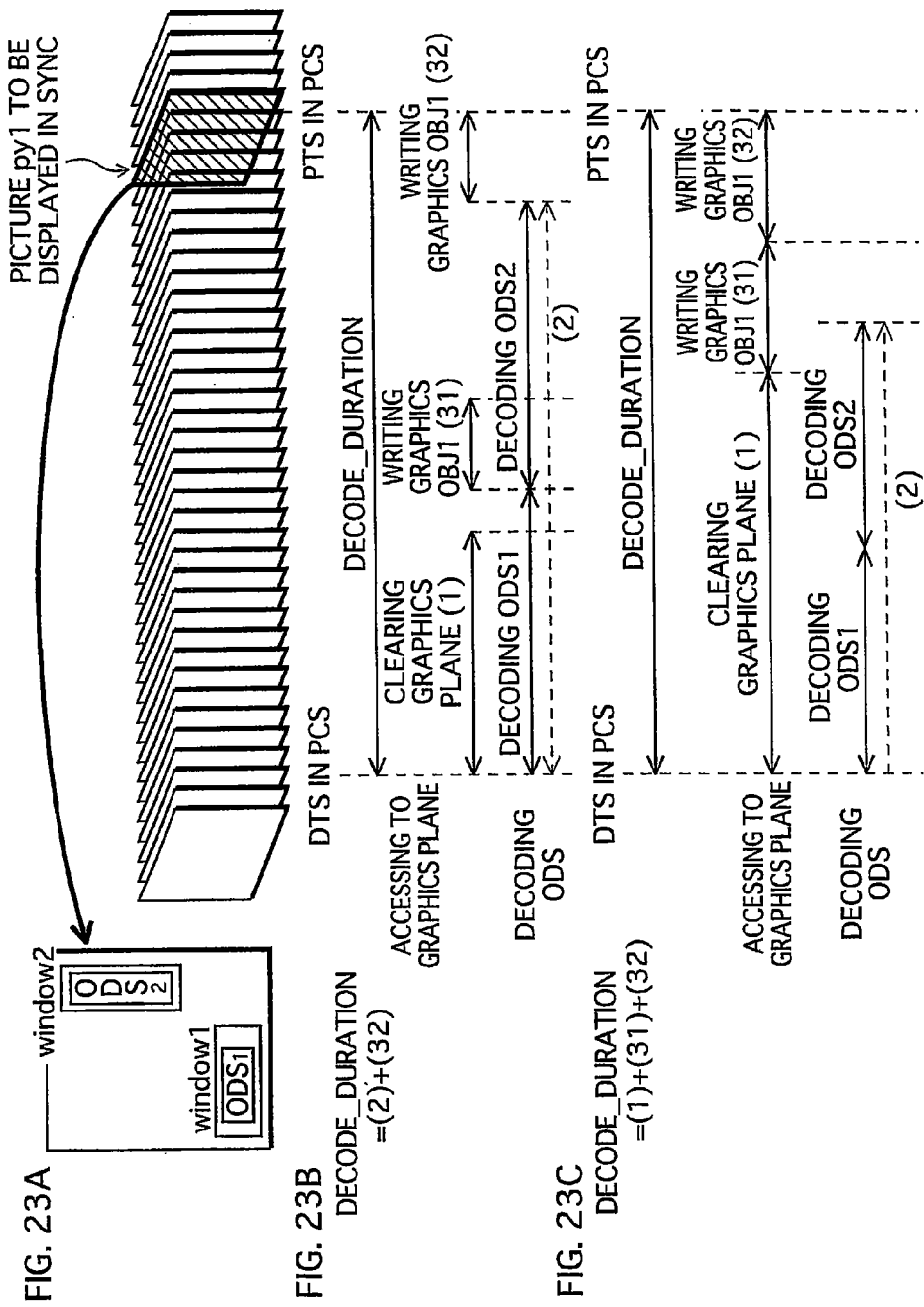

(DS1) PCS1.1-PDS1-ODS1-END
ODS1 "what is blu-ray"

(DS2) PCS1.2-END (DS3) PCS1.3-END (DS4) PCS2-ODS2-END
ODS2 "blu-ray is "
          everywhere ered in a page image.

RECORDING MEDIUM, REPRODUCTION APPARATUS, RECORDING METHOD, REPRODUCING METHOD, PROGRAM, AND INTEGRATED CIRCUIT

This is a divisional application of U.S. Serial No. 10/554,627, filed on Oct. 18, 2006 now U.S. Pat. No. 7,505,050.

TECHNICAL FIELD

The present invention relates to a recording medium such as a BD-ROM, and a reproduction apparatus, and more specifically, to a technique of subtitling by reproducing a digital stream constituted by multiplexing a video stream and a graphics stream.

BACKGROUND ART

Subtitling realized by rendering graphics streams is an important technique for allowing people in different linguistic areas to appreciate a film produced in a language other than their native languages. An example of a conventional technique of subtitling is a memory allocation scheme for a Pixel Buffer based on the ETSI EN 300 743 standard set forth by European Telecommunications Standards Institute (ETSI). The Pixel Buffer is a memory for temporarily storing decompressed graphics, and a reproduction apparatus writes the graphics in the Pixel Buffer to a display memory called a Graphics Plane, and thus the graphics is displayed. In the memory allocation scheme, a definition of a Region is included in the Pixel Buffer, and a part of the decompressed graphics that corresponds to the Region is written to the Graphics Plane. For example, when a subtitle "Goodbye . . . " is contained in the Pixel Buffer and a position and a size of the Region are defined so as to includes a part "Go", then the part "Go" is written to the Graphics Plane and displayed on the screen. Likewise, when the position and size of the Region are defined so as to includes a part "Good", then the part "Good" is displayed on the screen.

By repeating of the defining of the Region and the writing to the Graphics Plane, the subtitle "Goodbye . . . " is displayed on the screen gradually, i.e., first "Go", next "Good", then "Goodbye", and finally the whole subtitle "Goodbye . . . " is displayed. By rendering a subtitle in such a way, it is possible to realize a wipe-in effect.

The ESTE EN 300 743 standard, however, does not at all consider to guarantee the sync between a graphics display and a picture display when a burden for writing to the Graphics Plane is high. The graphics written to the Graphics Plane is not compressed, and accordingly, the burden for writing to the Graphics Plane increases as a resolution of the graphics becomes higher. A size of the graphics to be written to the Graphics Plane is up to 2 Mbytes when rendering the graphics in a resolution of 1920×1080, which is a proposed standard resolution for a BD-ROM, and a higher bandwidth for a graphics data transfer from the Pixel Buffer to the Graphics Plane is necessary in order to render graphics as large as 2 Mbytes synchronously with the picture display. However, demanding a high bandwidth for the data transfer to write the graphics to the Graphics Plane hinders an attempt of cost reduction in manufacturing the reproduction apparatus. It is possible to lower the necessary bandwidth in writing to the Graphics Plane by having the reproduction apparatus always perform a "reasonable write", in which only a difference from a previous display is written to the Graphics Plane. However, demanding the reproduction apparatus to always perform the "reasonable write" restricts software applicable to the reproduction apparatus.

As described in the above, the high burden for writing to the Graphics Plane demands that reproduction apparatuses operate in the high bandwidth or perform the reasonable write, and as a result, restricts product development of reproduction apparatuses.

DISCLOSURE OF THE INVENTION

An object of the present invention is to provide a recording medium with which graphics may be updated synchronously with a picture display even when an amount of data to be written to a Graphics Plane is large.

In order to achieve the above object, an example of the recording medium according to the present invention is a recording medium used for storing data, said recording medium comprising: a digital stream constituted by multiplexing a video stream and a graphics stream, wherein said video stream represents a moving picture made of a plurality of pictures, and the graphics stream includes: graphics data representing graphics to be combined with the pictures; and window information that specifies a window for rendering the graphics therein, the window information indicating a width, a height and a position of the window on a plane, the plane being a plane memory of a reproduction apparatus that combines the graphics with the pictures.

By specifying a part of the Plane corresponding to each picture as the window for rendering the graphics, it is not necessary that the reproduction apparatus renders the graphics for an entire plane, and it is sufficient that the reproduction apparatus renders the graphics only in a limited size of window. Because it is not necessary to render the graphics outside the window in the plane, the load of software in the reproduction apparatus may be reduced.

Further, by setting a size of the window so as to ensure a sync display between the graphics and the picture, it becomes possible for a producer who performs authoring to guarantee the sync display in any kind of reproduction apparatus, even when update of the graphics is performed in a worst case.

Moreover, by setting a position and a size of the window by the window information, it is possible to adjust the position and size of the window in the authoring, so that the subtitles are out of the way of pictures when viewing the screen. Therefore, the visibility of the graphics are maintained even when the picture on the screen changes as time passes, and thus it is possible to maintain the quality of a film.

The worst case in updating the graphics means a case in which the graphics is updated in a least efficient operation, i.e. all clear and re-drawing of the window. When setting the size of the window in order to prepare for the worst case, it is desirable that the above recording medium is such that the width and height of the window are set so that a size of the window is 1/x of the plane, the plane corresponding to a size of each picture and x being a real number based on a ratio between a window update rate and a picture display rate.

By setting the window size in this manner, a bandwidth on the reproduction apparatus that is necessary for writing to the graphics plane is set to a fixed value. By structuring the reproduction apparatus so as to satisfy this bandwidth, it is possible to realize the sync display between the graphics and the picture regardless of the software mounted to the reproduction apparatus.

As described above, it is possible to present a minimum standard for a structure of the reproduction apparatus. As long as the transfer rate is set so as to satisfy the minimum standard, a design of the reproduction apparatus is at the discretion of developers. Therefore, it is possible to expand the possibility in development of the reproduction apparatus.

BRIEF DESCRIPTION OF THE DRAWINGS

FIG. 2 illustrates a structure of a BD-ROM.

FIG. 3 is a diagram schematically illustrating a structure of an AVClip.

FIG. 5 illustrates a logical structure that is made of various kinds of functional segments.

FIG. 6 illustrates a relation between a display position of a subtitle and an Epoch.

FIG. 8A illustrates syntax of a Window Definition Segment (WDS).

FIG. 8B illustrates syntax of a Presentation Composition Segment (PCS).

FIG. 17 is a diagram comparing two cases: a window has four Graphics Objects, and a window has two Graphics Objects.

FIG. 18 illustrates an example of an algorithm for calculating a decode duration.

FIG. 23A describes a case in which each of two Windows includes an ODS.

FIG. 23B illustrates a case in which a decode period (2) is longer than a total of a clearing period (1) and a write period (31).

FIG. 23C illustrates a case in which a total of the clearing period (1) and the write period (31) is longer than the decode period (2).

BEST MODE FOR CARRYING OUT THE INVENTION

[First Embodiment]

A First Embodiment of a recording medium according to the present invention is explained below.

Figure 1:
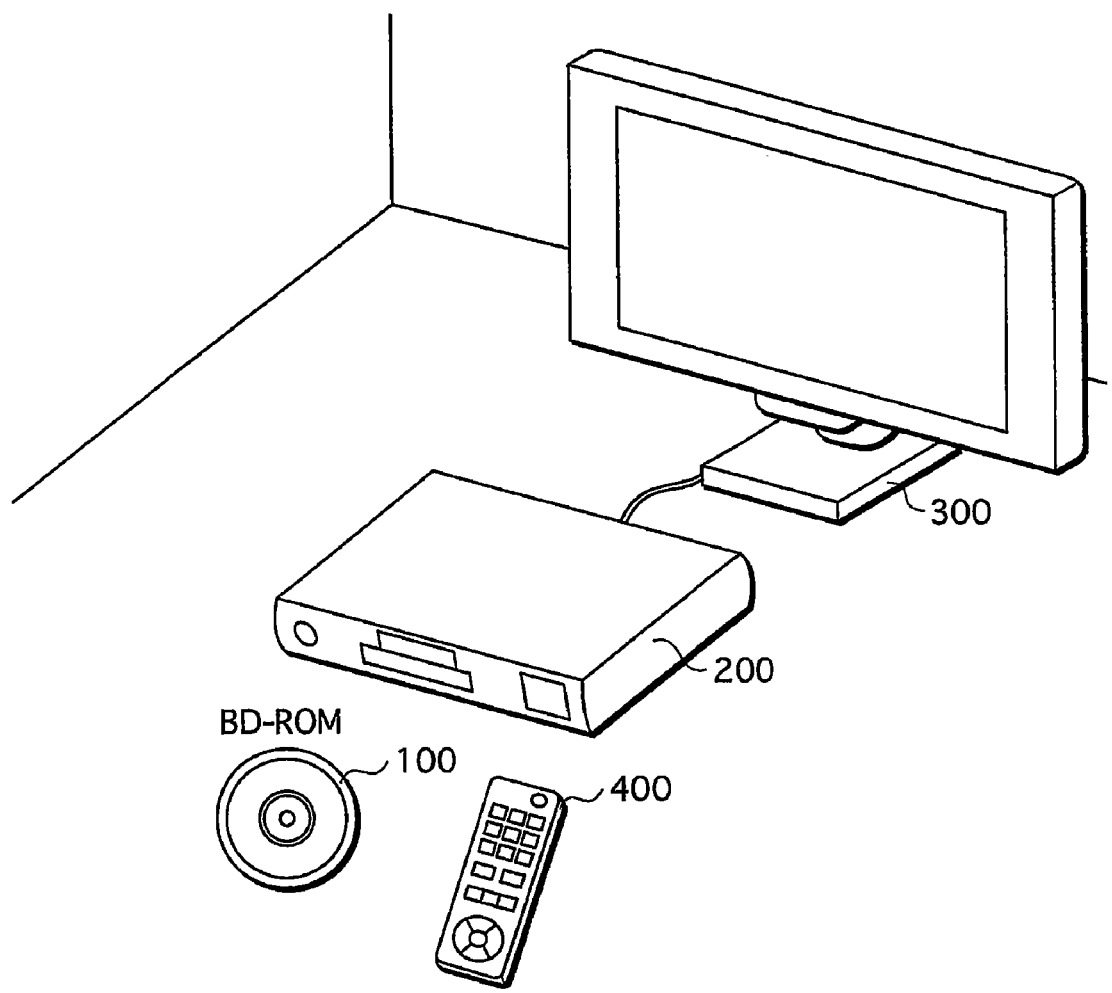
FIG. 1 illustrates an example of use of a recording medium according to the present invention.

FIG. 1 illustrates an example of use of the recording medium. In the drawing, BD-ROM 100 is an example of a non-transitory recording medium according to the present invention. The BD-ROM 100 is used for providing data of movie works to a Home Theatre System structured by a reproduction apparatus 200, a television 300, and a remote controller 400.

The recording medium according to the present invention is manufactured by an improvement in an application layer of a BD-ROM. FIG. 2 illustrates a structure of the BD-ROM.

In the drawing, the BD-ROM is shown at a bottom of the drawing, and a track on the BD-ROM is shown above the BD-ROM. The track is actually in a spiral shape on the disc, but shown in a line in the drawing. The track includes a lead-in area, a volume area, and a lead-out area. The volume area in this drawing has a physical layer, a file system layer, and an application layer. At a top of the drawing, an application format of the BD-ROM is illustrated using a directory structure. As illustrated in the drawing, the BD-ROM has a directory BDMV under the root directory, and the BDMV directory contains a file for storing an AVClip with an extension M2TS (XXX.M2TS), a file for storing administrative info for the AVClip with an extension CLPI (XXX.CLPI), and a file for defining a logical Play List (PL) for the AVClip with an extension MPLS (YYY.MPLS). By forming the above application format, it is possible to manufacture the recording medium according to the present invention. In a case in which there are more than one file for each kind, it is preferable to provide three directories named STREAM, CLIPINF, and PLAYLIST under the BDMV to store the files with the same extension in one directory. Specifically, it is desirable to store the files with the extension M2TS in the STREAM, the files with the extension CLPI in the CLIPINF, and the files with the extension MPLS in the PLAYLIST.

An explanation about the AVClip (XXX.M2TS) in the above application format is given below.

The AVClip (XXX.M2TS) is a digital stream in MPEG-TS format (TS is Transport Stream) obtained by multiplexing a video stream, at least one audio stream, and a presentation graphics stream. The video stream represents pictures of the film, the audio stream represents sound of the film, and the presentation graphics stream represents subtitles of the film. FIG. 3 is a diagram schematically illustrating a structure of the AVClip.

The AVClip (XXX.M2TS) is structured in a following manner. Each of the video stream made of plural vide frames (picture pj1, pj2, and pj3), and the audio stream made of plural audio frames (top row of the drawing) are converted into a line of PES packets (second row of the drawing), and then into a line of TS packets (third row of the drawing). The presentation graphics stream (bottom row of the drawing) is converted into PES packets (second to bottom row of the drawing), and then into TS packets (third to bottom row of the drawing). Three lines of PS packets are multiplexed, and thus the AVClip (XXX.M2TS) is constituted.

In the drawing, only one presentation graphics stream is multiplexed. However, in a case in which the BD-ROM is compatible to plural languages, a presentation graphics stream for each language is multiplexed to constitute the AVClip. The AVClip constituted in the above manner is divided into more than one extent, like ordinary computer files, and stored in areas in the BD-ROM.

Figure 4A:
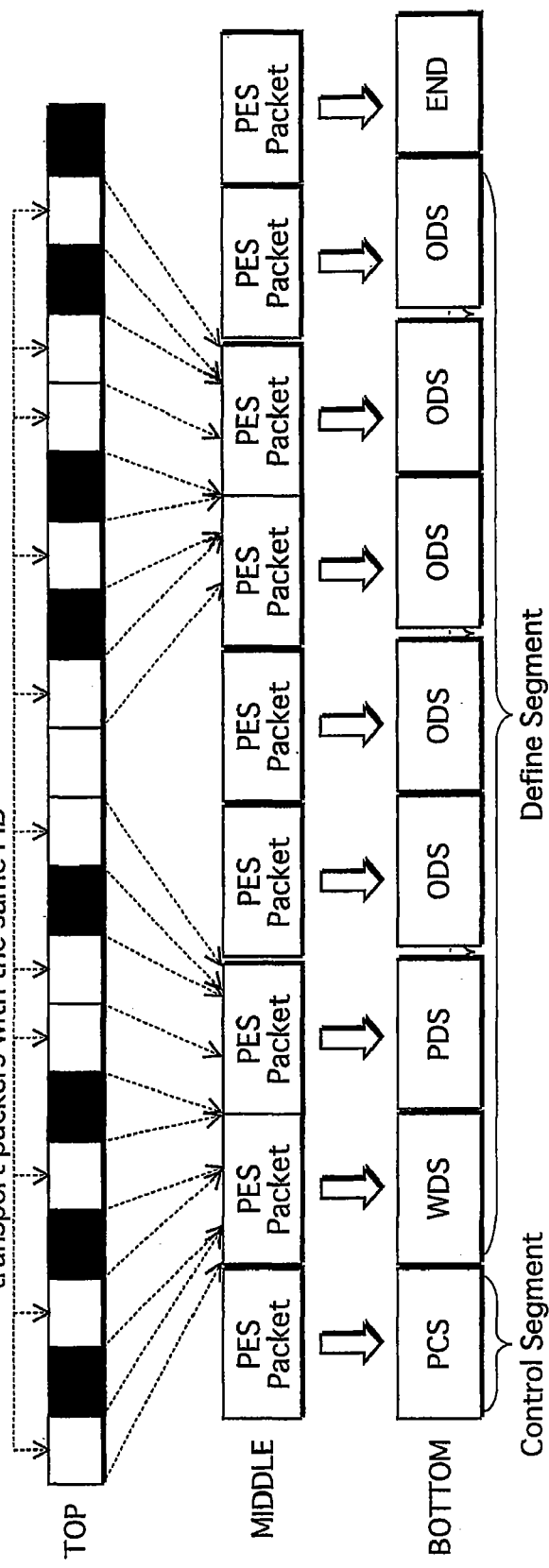
FIG. 4A illustrates a structure of a presentation graphics stream.

Next, the presentation graphics stream is explained. FIG. 4A illustrates a structure of the presentation graphics stream. A top row indicates the TS packet line to be multiplexed to the AVClip. A second to the top row indicates the PES packet line that constitutes a graphics stream. The PES packet line is structured by retrieving payloads out of TS packets having a predetermined PID, and connecting the retrieved payloads.

A third to the top row indicates the structure of the graphics stream. The graphics stream is made of functional segments named a Presentation Composition Segment (PCS), a Window Definition Segment (WDS), a Palette Definition Segment (PDS), an Object Definition Segment (ODS); and an END of Display Set Segment (END). Among the above functional segments, the PCS is called a screen composition segment, and the WDS, PDS, ODS, and END are called definition segments. The PES packet and each of the functional segments correspond one to one, or one to plurality. In other words, one functional segment is either recorded in the BD-ROM after converted into one PES packet, or after divided into fragments and converted into more than one PES packet.

Figure 4B:
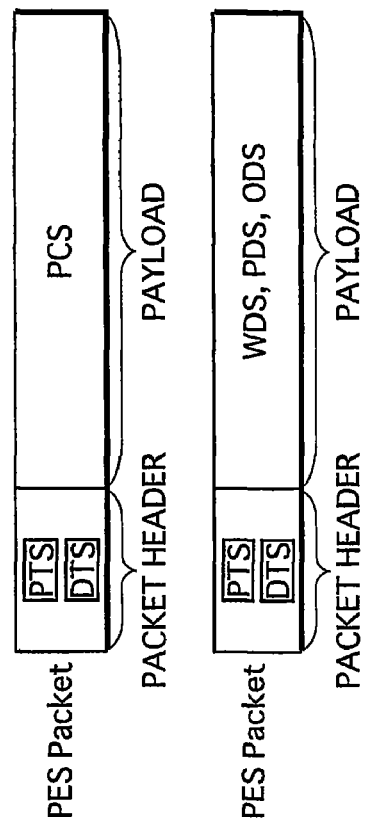
FIG. 4B illustrates a PES packet obtained after functional segments are converted.

FIG. 4B illustrates the PES packet obtained by converting the functional segments. As shown in the drawing, the PES packet is made of a packet header and the payload, and the payload is a substantial body of a functional segment. The packet header includes a DTS and a PTS corresponding to the functional segment. The DTS and PTS included in the packet header are hereinafter referred to as the DTS and PTS of the functional segment.

The above described various kind of functional segments constitute a logical structure as illustrated in FIG. 5. FIG. 5 illustrates the logical structure that is made of the various kinds of functional segments. In the drawing, a top row illustrates Epochs, a middle row illustrates Display Sets (DS), and a bottom row illustrates the functional segments.

Each of the DS shown in the middle row is a group of functional segments that compose graphics for one screen, among all of the plural functional segments that constitute the graphics stream. Broken lines in the drawing indicate the DS to which the functional segments in the bottom row belong, and show that a series of the functional segments of the PCS, WDS, PDS, ODS, and END constitute one DS. The reproduction apparatus is able to generate graphics for one screen by reading the functional segments that constitute the DS.

The Epochs shown in the top row indicate time periods, and memory management is consecutive timewise along a timeline of the AVClip reproduction in one Epoch. One Epoch also represents a group of data that is assigned to the same period of time. The memory referred to here are the Graphics Plane that stores the graphics for one screen, and an Object Buffer that stores decompressed graphics data. The consecutiveness of the memory management means a flash of the Graphics Plane or of the Object Buffer does not occur in the Epoch, and erasing and rendering of the graphics are only performed in a predetermined rectangular area on the Graphics Plane (the flash here indicates clearing of all contents of the stored data in a plane or a buffer). A size and a position of the rectangular area are fixed during one Epoch. As long as the erasing and rendering of the graphics are only performed in the predetermined rectangular area on the Graphics Plane, a sync reproduction between the picture and the graphics is guaranteed. In other words, the Epoch is a unit in the reproducing timeline, and in this unit, the picture and the graphics are guaranteed to be reproduced synchronously. When moving the area, in which the graphics are erased and rendered, to a different position, it is necessary to define a point on the timeline to move the area, and a period after the point becomes a new Epoch. The sync reproduction is not guaranteed at a boarder between two Epochs.

In viewing an actual film, one Epoch is a time period in which subtitles are displayed in the same rectangular area on the screen. FIG. 6 illustrates a relation between the position of the subtitles and the Epochs. In an example illustrated by the drawing, the positions at which the five subtitles "Actually . . . ", "I was hiding", "my feelings.", "I always", and "loved you." are shown move according to the picture in the film. Specifically, the subtitles "Actually . . . ", "I was hiding", and "my feelings." appear at the bottom of the screen, while the subtitles "I always" and "loved you." are shown at the top of the screen. The position of the rectangular area moves in order that the subtitles are out of the way of pictures when viewing the screen, considering visibility of the film. A time period during which the subtitles appear at the bottom is an Epoch 1, and a subsequent time period during which the subtitles appear at the top is an Epoch 2. The Epochs 1 and 2 each have a different area in which the subtitles are rendered. The area in the Epoch 1 is a Window 1 positioned at the bottom of the screen, and the area in the Epoch 2 is a Window 2 positioned at the top of the screen. The memory management is consecutive in each of the Epochs 1 and 2, and accordingly, rendering of the subtitles in the Windows 1 and 2 is synchronous with the pictures.

Next, details about the Display Set (DS) are described.

Broken lines hk11 and hk12 in FIG. 5 indicate which functional segment at the middle row belongs to which Epoch. A series of DS "Epoch Start", "Acquisition Point", and "Normal Case" constitute the Epoch at the top raw. The "Epoch Start", "Acquisition Point", and "Normal Case" are types of the DS, and an order between the "Acquisition Point" and "Normal Case" does not matter and either of them may come first.

The Epoch Start is a DS that has a display effect of "new display", which indicates a start of a new Epoch. Because of this, the Epoch Start contains all functional segments needed to display a new composition of the screen. The Epoch Start is provided at a position which is a target of a skip operation of the AVClip, such as a chapter in a film.

The Acquisition Point is a DS that has a display effect of "display refresh", and is identical in content used for rendering graphics with the Epoch Start which is a preceding DS. The Acquisition Point is not provided at a starting point of the Epoch, but contains all functional segments needed to display the new composition of the screen. Therefore, it is possible to display the graphics without fail when a skip operation to the Acquisition Point is performed. Accordingly, with the Acquisition Point, it is possible to compose a screen in the middle of the Epoch.

The Acquisition Point is provided at a position that could be a target for the skip operation. An example of such a position is a position that could be specified when performing a time search. The time search is an operation in response to a user's input of a time to start reproducing from a reproducing point corresponding to the time specified by the user. The time is specified roughly, such as by 10 minutes or by 10 seconds, and accordingly, points at which the reproduction starts are provided at such as a 10 minute interval, or a 10 second interval. By providing the Acquisition Point at the points at which the reproduction may start, it is possible to perform reproduction smoothly after the time search.

The Normal Case is a DS that has a display effect of "display update", and contains only elements that are different from the preceding composition of the screen. Specifically, when subtitles in a DSv is the same as subtitles in a DSu but the screen is displayed differently in the DSv and DSu, the DSv is provided so as to include only the PCS and makes the DSv the Normal Case. By this, it does not necessary to provide an ODS with the same content as the content of the ODS in the preceding DS, and a data size in the BD-ROM may be reduced. On the other hand, because the DS as the Normal Case contains only the difference, it is not possible to compose the screen using the Normal Case alone.

Details of the Definition Segments (ODS, WDS, and PDS) are explained below. The Object Definition Segment (ODS) is a functional segment that defines the Graphics Object. An explanation of the Graphics Object is given first. A selling point of the AVClip recorded in the BD-ROM is its resolution as high as hi-vision, and therefore the resolution for the Graphics Object is set at 1920×1080 pixels. Because of the high resolution of 1920×1080 pixels, it is possible to display a specific character style for the subtitles clearly on the screen. As for colors of the subtitles, a bit length of an index value for each pixel (Color Difference Red Cr, Color Difference Blue Cb, Luminance Y, and Transparency T) is 8 bits, and thus it is possible to chose any 256 colors out of full color (16,777,216 colors) for the subtitles. The subtitles realized by the Graphics Object are rendered by positioning texts on a transparent background.

Figure 7A:
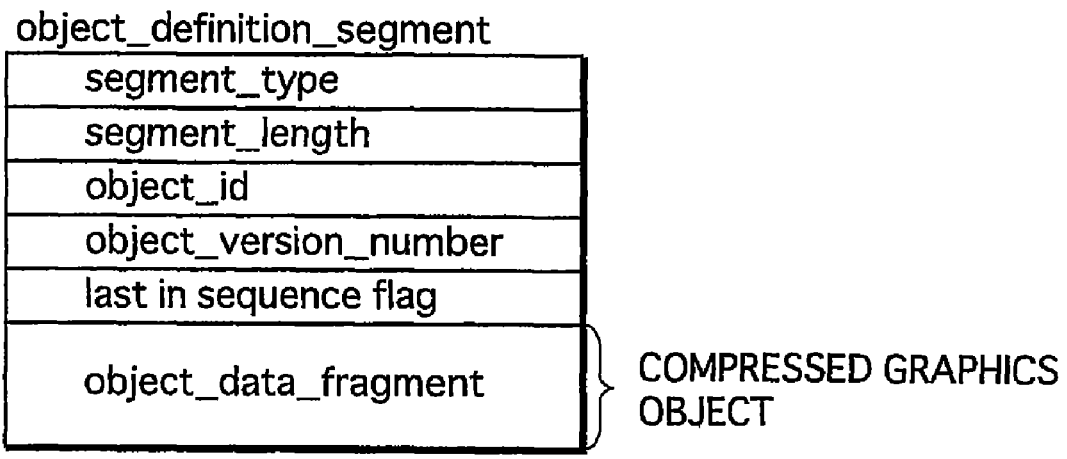
FIG. 7A illustrates syntax to define a Graphics Object in an Object Definition Segment (ODS).

Syntax of ODS to define the Graphics Object is shown in FIG. 7A. The ODS is made of segment_type indicating that the segment is the ODS, segment_length indicating a data length of the ODS, object_id uniquely identifying the Graphics Object corresponding to the ODS in the Epoch, object_version_number indicating a version of the ODS within the Epoch, last_insequence_flag, and object_data_fragment which is a consecutive sequence of bytes corresponding to a part or all of Graphics Object.

The object_id is for uniquely identifying the Graphics Object corresponding to the ODS in the Epoch. The Epoch of the graphics stream contains more than one ODS having the same ID. The ODS having the same ID also have the same width and height, and are assigned with a common area in the Object Buffer. After one of the ODS having the same ID is read in the common area, the read ODS is overwritten by a subsequent ODS having the same ID. By overwriting the ODS that is read to the Object Buffer by the subsequent ODS having the same ID as the reproduction of the vide stream proceeds, the graphics by the ODS is updated accordingly. A size constraint that the width and height of the Graphics Object having the same ID should be the same is applied only during one Epoch, and the Graphics Objects in different Epochs may have different sizes.

Explanations about last_sequence_flag and object_data_fragment are given next. In some cases, it is not possible to store the decompressed graphics that constitutes the subtitle in one ODS due to a payload constraint of the PES packet. In such cases, the graphics is split into a series of consecutive fragments, and one fragment is set to the object_data_fragment. When one Graphics Object is stored as more than one fragment, every fragment except a last fragment has the same size. The last fragment is less than or equal to the size of previous fragments. The ODS carrying the fragments appear in the same sequential order in the DS, with an end of the sequence indicated by the ODS having the last_sequence_flag. Although the above described syntax of the ODS is based on a premise that the fragments are stacked in from the preceding PES, the fragments may be stacked so that each PES contains a blank part.

Figure 7B:
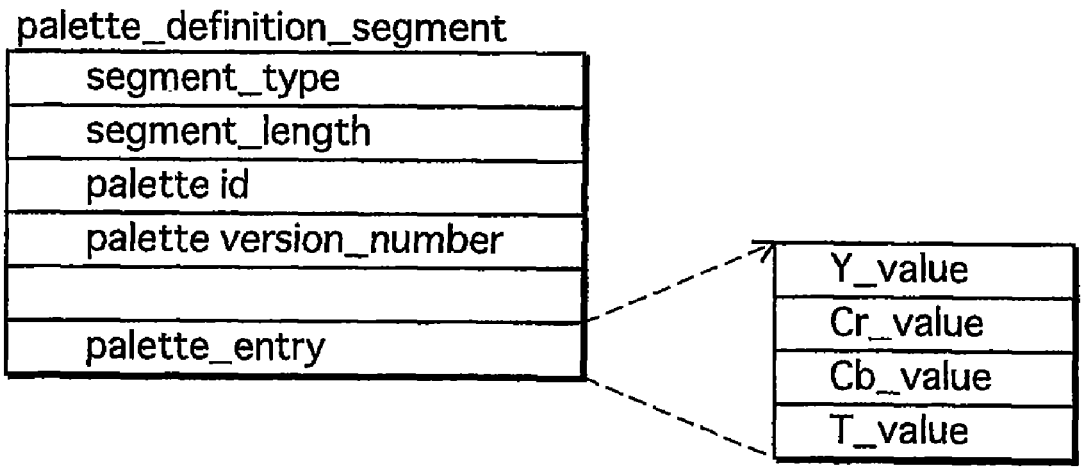
FIG. 7B illustrates syntax of a Palette Definition Segment (PDS).

Next, the Palette Definition Segment (PDS) is explained. The PDS is used to define a palette for a color conversion. FIG. 7B shows syntax of the PDS. The PDS is made of segment_type indicating that the segment is the PDS, segment_length indicating a data length of the PDS, palette_id uniquely identifying the palette contained in the PDS, palette_version_number indicating a version of the PDS within the Epoch, and palette_entry_id specifying an entry number of the palette. The palette_entry_id indicates the Color Difference Red (Cr_value), the Color Difference Blue (Cb_value), Luminance (Y_value), and Transparency (T_value).

Next, an explanation about the Window Definition Segment (WDS) is given below.

The WDS is used to define the rectangular area on the Graphics Plane. As described in the above, the memory management is sequential only when erasing and rendering is performed within a certain area on the Graphics Plane. The area on the Graphics Plane is defined by the WDS and called "Window". FIG. 8A illustrates syntax of the WDS. As shown by the drawing, the WDS is made of segment_type indicating that the segment is the WDS, segment_length indicating a data length of the WDS, window_id uniquely identifying the Window on the Graphics Plane, window_horizontal_position specifying a horizontal address of a top left pixel of the Window on the Graphics Plane, window_vertical_position specifying a vertical address of the top left pixel of the Window on the Graphics Plane, window_width specifying a width of the Window on the Graphics Plane, and window_height specifying a height of the Window on the Graphics Plane.

Ranges of values that the window_horizontal_position, window_vertical_position, window_width, and window_height may take are explained below. A coordinate system for those values is within an area on the Graphics Plane, and whose size is indicated two-dimensionally by the window_height for a height and the window_width for a width.

The window_horizontal_position specifies the horizontal address of the top left pixel of the Window on the Graphics Plane, and is within a range of 0 to (window_width)−1. Also, the window_vertical_position specifies the vertical address of the top left pixel of the Window on the Graphics Plane, and is within a range of 0 to (window_height)−1.

The window_width specifies the width of the Window on the Graphics Plane. The specified width falls within a range of 1 to (video_width)-(window_horizontal_position). Further, the window_height specifies the height of the Window on the Graphics Plane, and the specified height is within a range of 1 to (video_height)-(window_vertical_position).

The position and size of the Window on the Graphics Plane for each Epoch are defined by the window_horizontal_position, window_vertical_position, window_width, and window_height. Accordingly, it is possible to adjust the position and size of the Window at authoring, so that the Window in one Epoch appears at the position that does not come in the way of the picture when viewing the film. By this, the visibility of the subtitles becomes higher. Because the WDS is defined for each Epoch, it is possible to adjust the position of the Window according to the picture, even if the picture changes in the course of time. As a result, the quality of the film is maintained as high as in a case where the subtitles are incorporated in the main body of the film.

Next, the End of Display Set Segment (END) is explained. The END provides an indication that a transmission of the DS is completed. The End is inserted into a stream immediately after a last ODS in one DS. The End is made of segment_type indicating that the segment is the END and segment_length indicating a data length of the END. The END does not include any other element that requires a further explanation.

Next, an explanation about the Presentation Composition Segment(PCS) is given below.

The PCS is a functional segment that is used for composing an interactive display. FIG. 8B illustrate syntax of the PCS. As shown in the drawing, the PCS is made of segment_type, segment_length, composition_number, composition_state, palette_update_flag, palette_id, and window information 1-m.

The composition_number identifies the Graphics Update in the DS by values in a range of 0 to 15. If the Graphics Update exists between the head of the Epoch and the PCS, the composition_number is incremented every time the Graphics Update occurs.

The composition_state indicates the type of the DS in which the PCS is contained, Normal Case, Acquisition Point, or Epoch Start.

The palette_update_flag indicates that the PCS describes a Palette only Display Update. The Palette only Display Update indicates that only the palette is updated from an immediately previous palette. The palette_update_flag field is set to "1", if the Palette only Display Update is performed.

The palette_id identifies the palette to be used in the Palette only Display Update.

The window information 1-m indicate how to control each Window in the DS to which the PCS belong. A broker, line wd1 in FIG. 8B is to detail an internal syntax for window information i. The window information i is made of object_id, window_id, object_cropped_flag, object_horizontal_position, an object_vertical_position, and cropping_rectangle information 1-n.

The object_id identifies the ODS in a Window corresponding to the window information i.

The window_id identifies the Window to which the Graphics Object is allocated in the PCS. Up to two Graphics Objects may be assigned to one Window.

The object_cropped_flag is used to switch between display and no-display of a cropped Graphics Object in the Object Buffer. When the object_cropped_flag is set to "1", the cropped Graphics Object is displayed in the Object Buffer, and if set to "0", the Graphics Object is not displayed.

The object_horizontal_position specifies a horizontal address of a top left pixel of the Graphics Object in the Graphics Plane.

The object_vertical_position specifies a vertical address of the top left pixel of the Graphics Object in the Graphics Plane.

The cropping_rectangle information 1-n are elements used when the object_cropped_flag is set to "1". A broken line wd2 is to detail an internal syntax for cropping_rectangle information i. As shown by the broken line wd2, the cropping_rectangle information i is made of four fields, object_cropping_horizontal_position, object_cropping_vertical_position, object_cropping_width, and object_cropping_height.

The object_cropping_horizontal_position specifies a horizontal address of a top left corner of a cropping rectangle to be used during rendering of the Graphics Object in the Graphics Plane. The cropping rectangle is a cropping frame that is used to specify and crop a part of the Graphics Object, and corresponds to Region in the ETSI EN 300 743 standard.

The object_cropping_vertical_position specifies a vertical address of the top left corner of the cropping rectangle to be used during rendering of the Graphics Object in the Graphics Plane.

The object_cropping_width specifies a width of the cropping rectangle.

The object_cropping_height specifies a height of the cropping rectangle.

Figure 9:
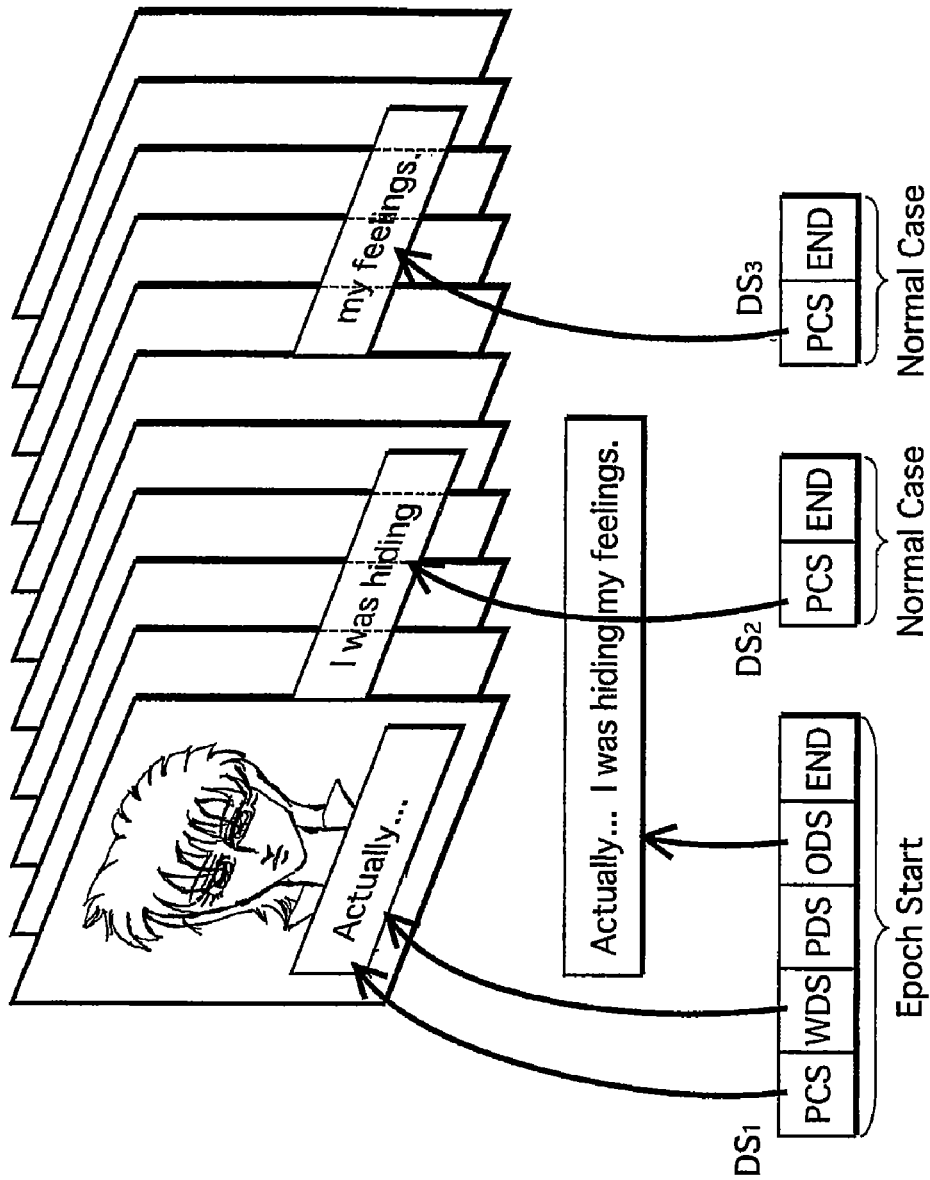
FIG. 9 illustrates an example of a description of a Display Set for subtitling.

A specific example of the PCS is detailed below. In the example, the subtitles "Actually . . . ", "I was hiding", and "my feelings." as shown in FIG. 6 appear gradually by writing to the Graphics Plane 3 times as the picture proceeds. FIG. 9 is an example of description for realizing such a subtitle display. An Epoch in the drawing includes a DS1 (Epoch Start), a DS2 (Normal Case), and a DS3 (Normal Case). The DS1 contains a WDS for specifying the Window in which the subtitles are displayed, an ODS for specifying the line "Actually . . . I was hiding my feelings.", and a first PCS. The DS2 contains a second PCS, and the DS3 contains a third PCS.

Figure 10:
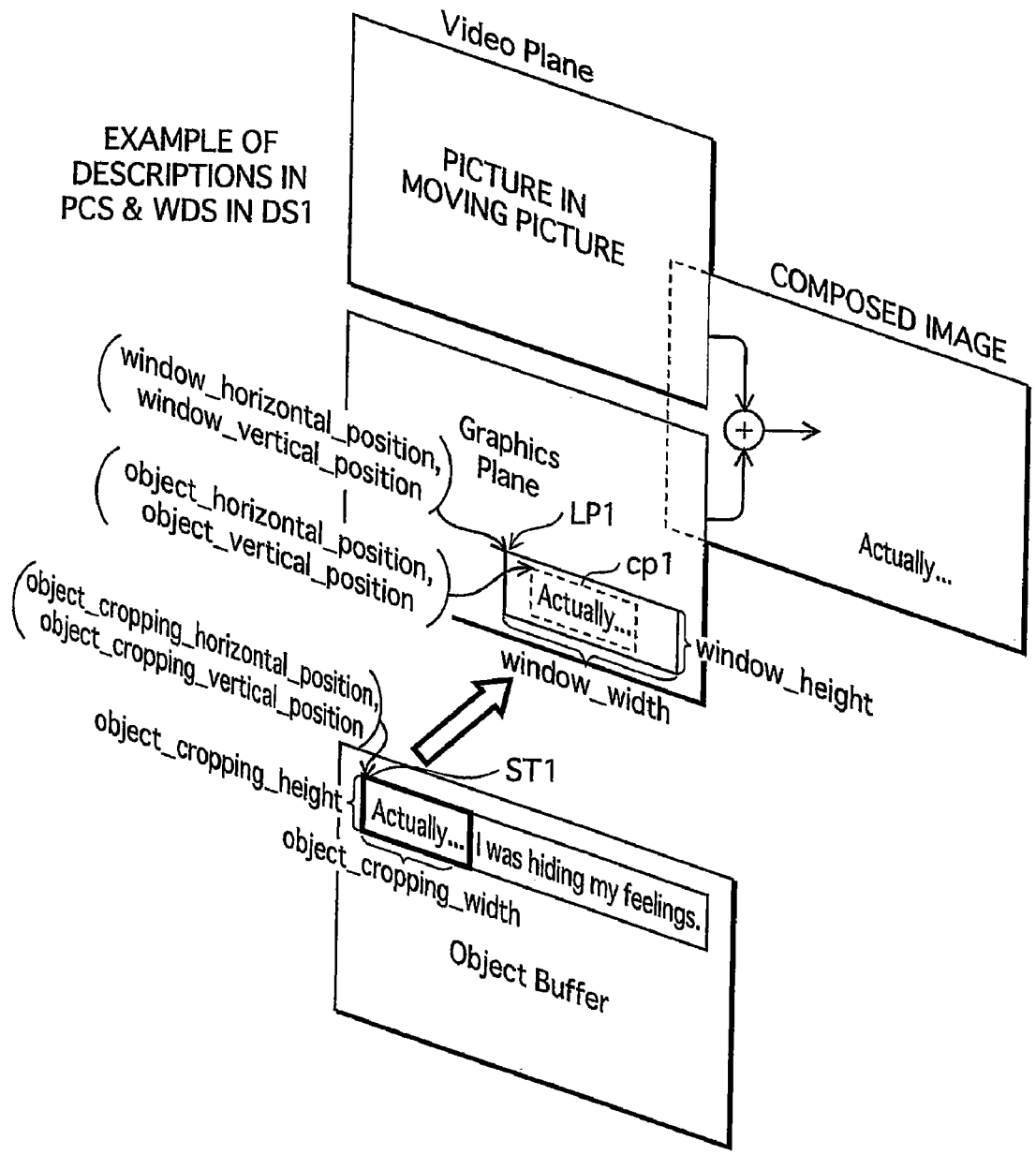
FIG. 10 illustrates an example of a description of the WDS and PCS in a DS1.
Figure 11:
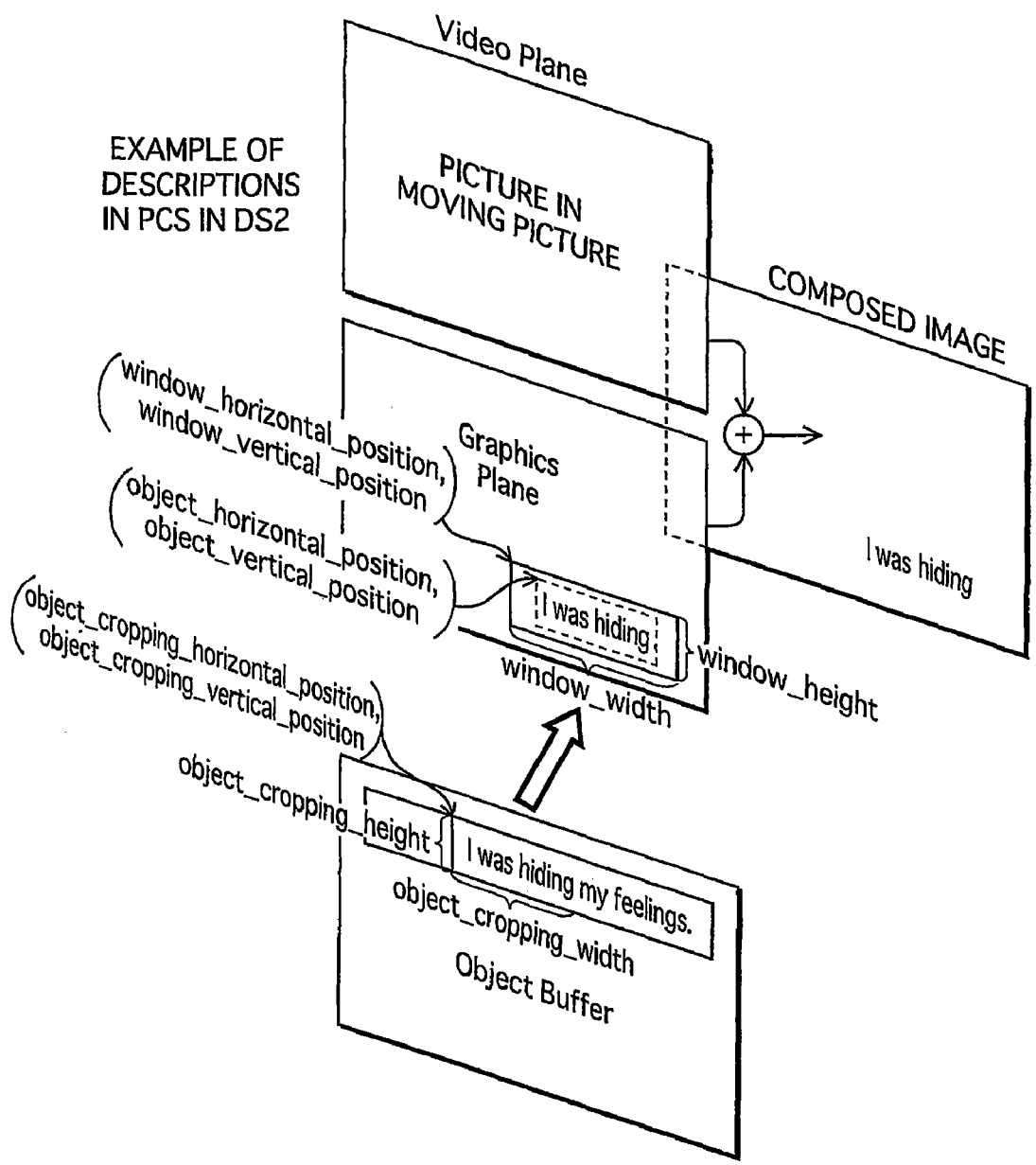
FIG. 11 illustrates an example of a description of the PCS in a DS2.
Figure 12:
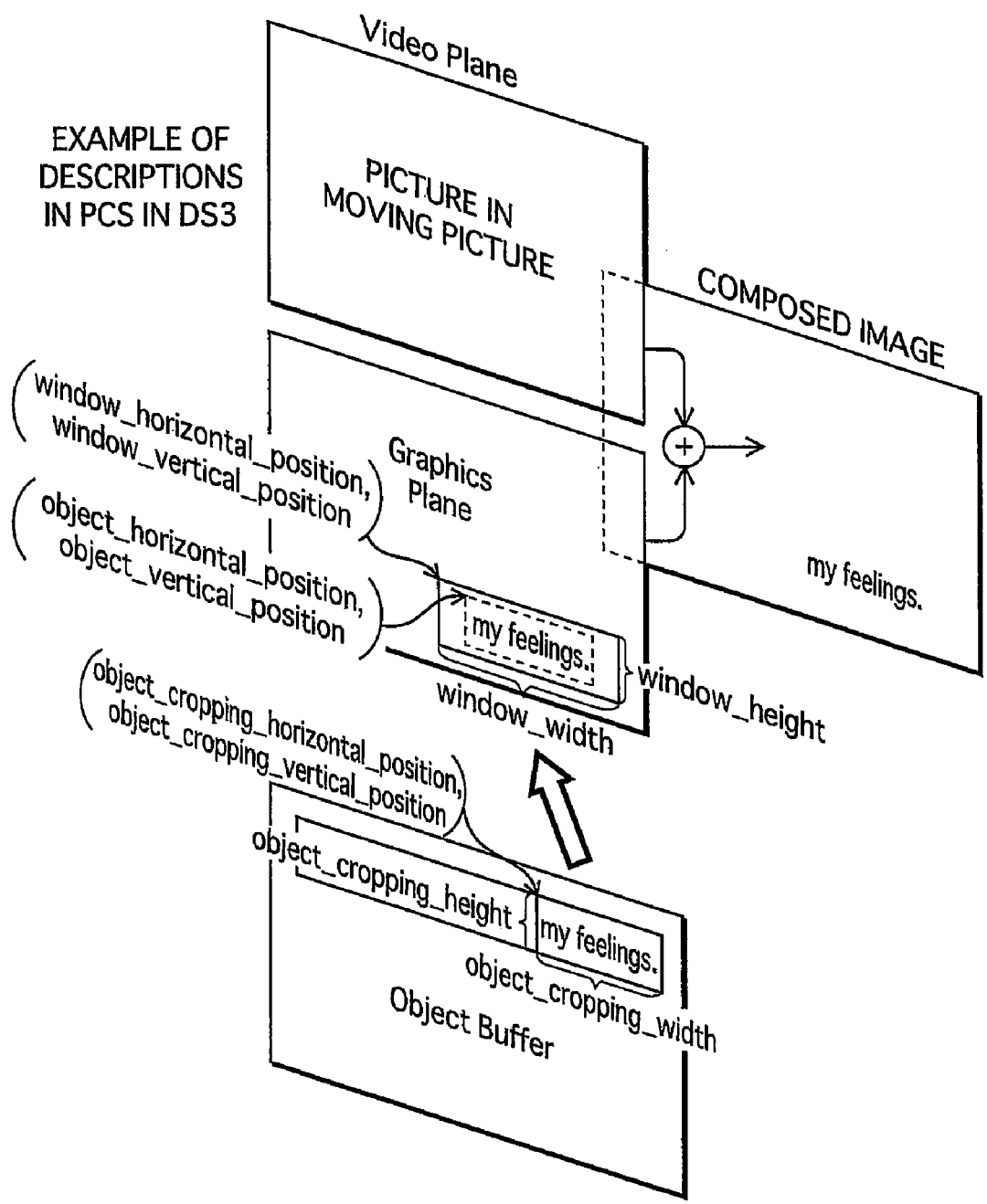
FIG. 12 illustrates an example of a description of the PCS in a DS3.

FIGS. 10-12 illustrate examples of the WDS and PCS contained in the DS. FIG. 10 shows an example of the PCS in the DS1.

In FIG. 10, the window_horizontal_position and the window_vertical_position of the WDS are indicated by a LP1, a position of the top left pixel of the Window on the Graphics Plane. The window_width and window_height indicate the width and height of the Window, respectively.

In FIG. 10, the object_cropping_horizontal_position and object_cropping_vertical_position indicate a reference point ST1 of the cropping rectangle in the coordinate system in which an origin is the top left pixel of the Graphics Object. The cropping rectangle is an area having the width from the ST to the object_cropping_width, and the height from the ST to the object_cropping_height (a rectangle shown by a heavy-line frame). The cropped Graphics Object is positioned within a rectangle shown by a broken-line frame cp1, with a reference point in the coordinate system with an origin at the object_horizontal_position and object_vertical_position (the top left pixel of the Graphics Object) in the Graphics Plane. By this, the subtitle "Actually . . . " is written to the Window on the Graphics Plane, and then composed with the movie picture and displayed on the screen.

FIG. 11 shows an example of the PCS in the DS2. The WDS in the DS2 is not explained, because the WDS in the DS2 is the same as the WDS in the DS1. A description of the cropping information in the DS2 is different from the description of the cropping information shown in FIG. 10.

In FIG. 11, the object_cropping_horizontal_position and object_cropping_vertical_position in the cropping information indicate a top left pixel of the subtitle "I was hiding" out of "Actually . . . I was hiding my feelings." in the Object Buffer. The object_cropping_width and object_cropping_height indicates a width and a height of a rectangle containing the subtitle "I was hiding". By this, the subtitle "I was hiding" is written to the Window on the Graphics Plane, and then composed with the movie picture and displayed on the screen.

FIG. 12 shows an example of the PCS in the DS3. The WDS in the DS3 is not explained, because the WDS in the DS3 is the same as the WDS in the DS1. A description of the cropping information in the DS3 is different from the description of the cropping information shown in FIG. 10.

In FIG. 12, the object_cropping_horizontal_position and object_cropping_vertical_position in the cropping information indicate a top left pixel of the subtitle "my feelings." out of "Actually . . . I was hiding my feelings." in the Object Buffer. The object_cropping_width and object_cropping_height indicates a width and a height of a rectangle containing the subtitle "my feelings.". By this, the subtitle "my feelings." is written to the Window on the Graphics Plane, and then composed with the movie picture and displayed on the screen.

By describing the DS1, DS2, and DS3 as explained above, it is possible to achieve an effect of displaying the subtitles on the screen. It is also possible to achieve other kinds of effect, and description protocols for realizing other effects are explained below.

Figure 13:
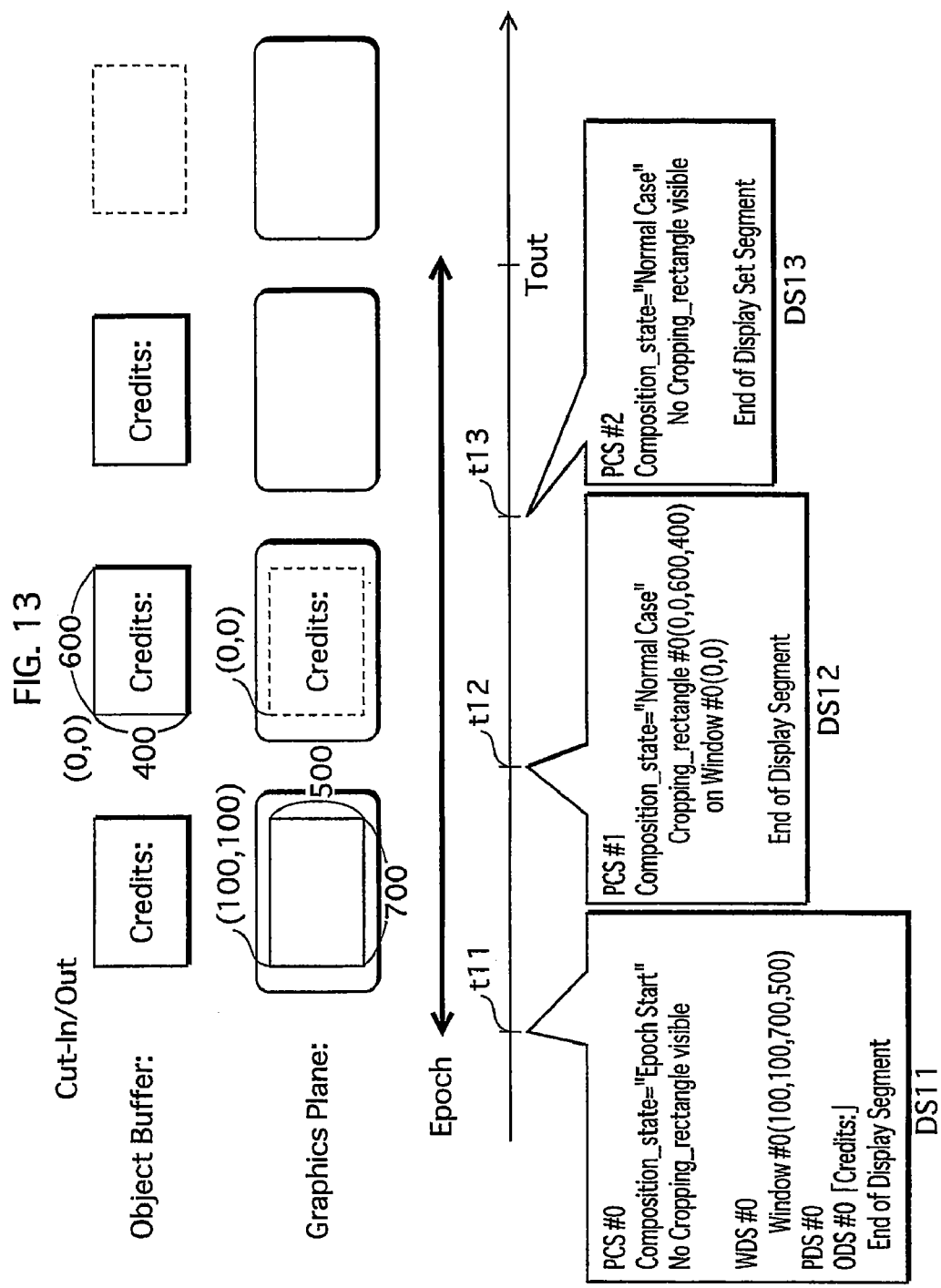
FIG. 13 is an example of a description of a Display Set when Cut-in/Out is performed, illustrating along a timeline.

First, a description protocol for a Cut-In/Out effect is explained. FIG. 13 shows an example of the description of the DS when Cut-In/Out is performed, illustrating along a timeline.

In the drawing, x and y in Window(x,y,u,v) respectively indicate values of the window_vertical_position and window_horizontal_position, and u and v respectively indicate values of the window_width and window_height. Also in the drawing, a and b in Cropping Rectangle (a,b, c,d) respectively indicate values of the object_cropping_vertical_position and object_cropping_horizontal_position, and c and d indicate values of the object_cropping_width and object_cropping_height, respectively. Display Sets DS11, DS12, and DS13 are at points t11, t12, and t13 on the reproduction timeline in the drawing.

The DS11 at the point t11 includes a PCS#0 in which the composition_state is "Epoch Start" and the object_cropped_flag is "0" (no_cropping_rectangle_visible), a WDS#0 having a statement for a Window in a width 700×height 500 at (100,100) in the Graphics Plane, a PDS#0, an ODS#0 indicating a subtitle "Credits:", and an END.

The DS12 at the point t12 includes a PCS#1 whose composition_state is "Normal Case" and indicating a crop operation of the Graphics Object to be in a 600×400 size from (0,0) in the Object Buffer (cropping_rectangle#0(0,0,600,400)), and positioning the cropped Graphics Object at the coordinates (0,0) in the Graphics Plane (on Window#0(0,0)).

The DS13 at the point t13 includes a PCS#2 whose composition_state is "Normal Case" and in which the object_cropped_flag is set to "0" so as to erase the cropped Graphics Object (no_cropping_rectangle_visible).

With the above explained Display Sets, the subtitle "Credits:" is no-display at the t11, appears at the t12, then becomes no-display at the t13 again, and the Cut-In/Cut-Out effect is realized.

Figure 14:
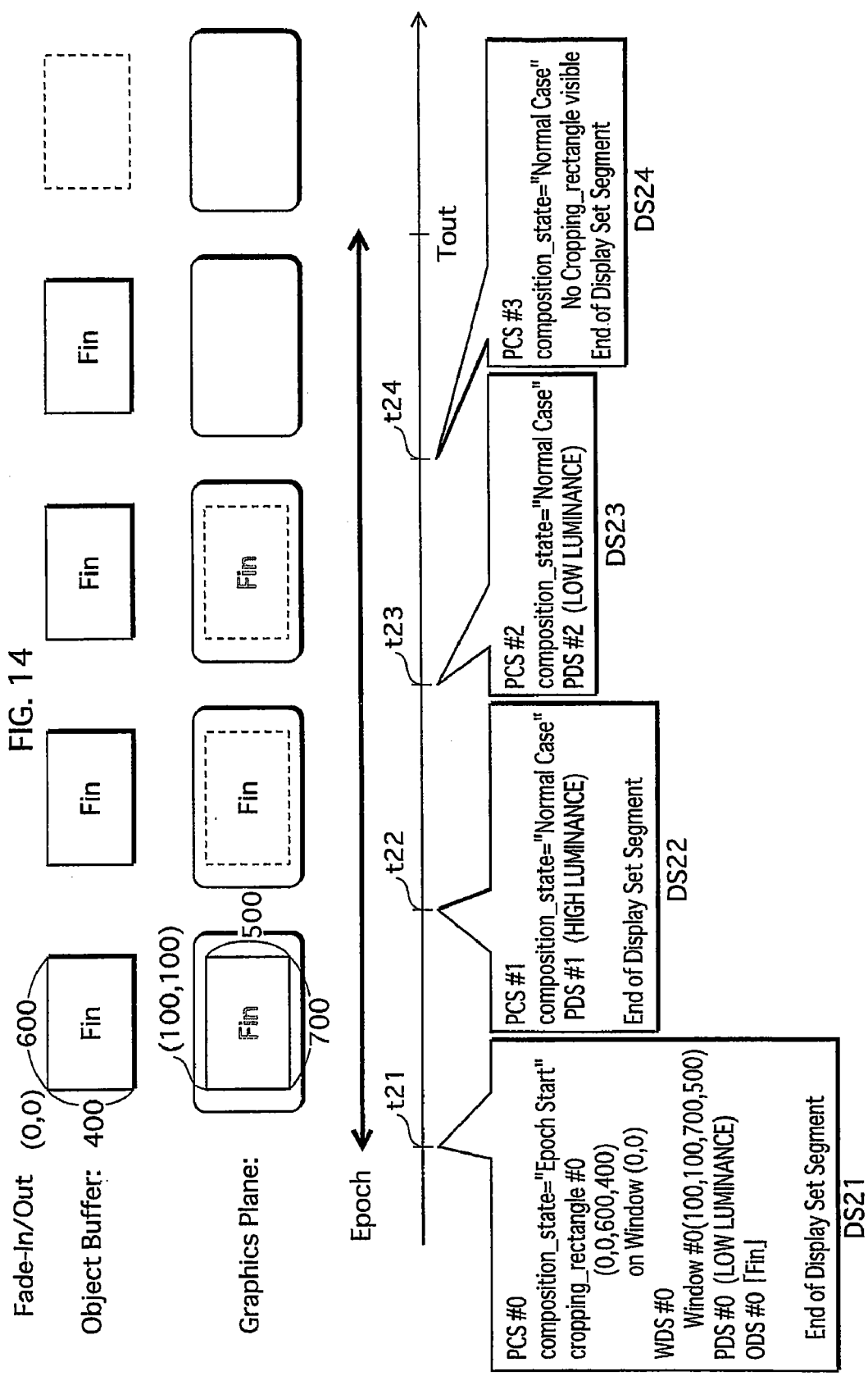
FIG. 14 is an example of a description of a Display Set when Fade-In/Out is performed, illustrating along a timeline.

Secondly, a description protocol for a Fade-In/Out effect is explained. FIG. 14 shows an example of the description of the DS when Fade-In/Out is performed, illustrating along a timeline. Display Sets DS21, DS22, DS23, and DS24 are at points t21, t22, t23, and t24 on the reproduction timeline in the drawing.

The DS21 at the point t21 includes a PCS#0 whose composition_state is "Epoch Start" and indicating the crop operation of the Graphics Object to be in a 600×400 size from (0,0) in the Object Buffer (cropping_rectangle#0(0,0,600,400)), and positioning the cropped Graphics Object at the coordinates (0,0) in the Graphics Plane (on Window#0 (0,0)), a WDS#0 having a statement for a Window in a width 700× height 500 at (100,100) in the Graphics Plane, a PDS#0, an ODS#0 indicating a subtitle "Fin", and an END.

The DS22 at the point t22 includes a PCS#1 whose composition_state is "Normal Case", and a PDS#1. The PDS#1 indicates the same level of Cr and Cb as the PDS#0, but a luminance indicated by the PDS#1 is higher than the luminance in the PDS#0.

The DS23 at the point t23 includes a PCS#2 whose composition_state is "Normal Case", a PDS#2, and an END. The PDS#2 indicates the same level of Cr and Cb as the PDS#1, but the luminance indicated by the PDS#2 is lower than the luminance in the PDS#1.

The DS24 at the point t24 includes a PCS whose composition_state is "Normal Case" and the object_cropped_flag is "0" (no_cropping_rectangle_visible), and an END.

Each DS specifies a different PDS from a preceding DS, and accordingly, the luminance of the Graphics Object that is rendered with more than one PCS in one Epoch becomes gradually high, or low. By this, it is possible to realize the effect of Fade-In/Out.

Figure 15:
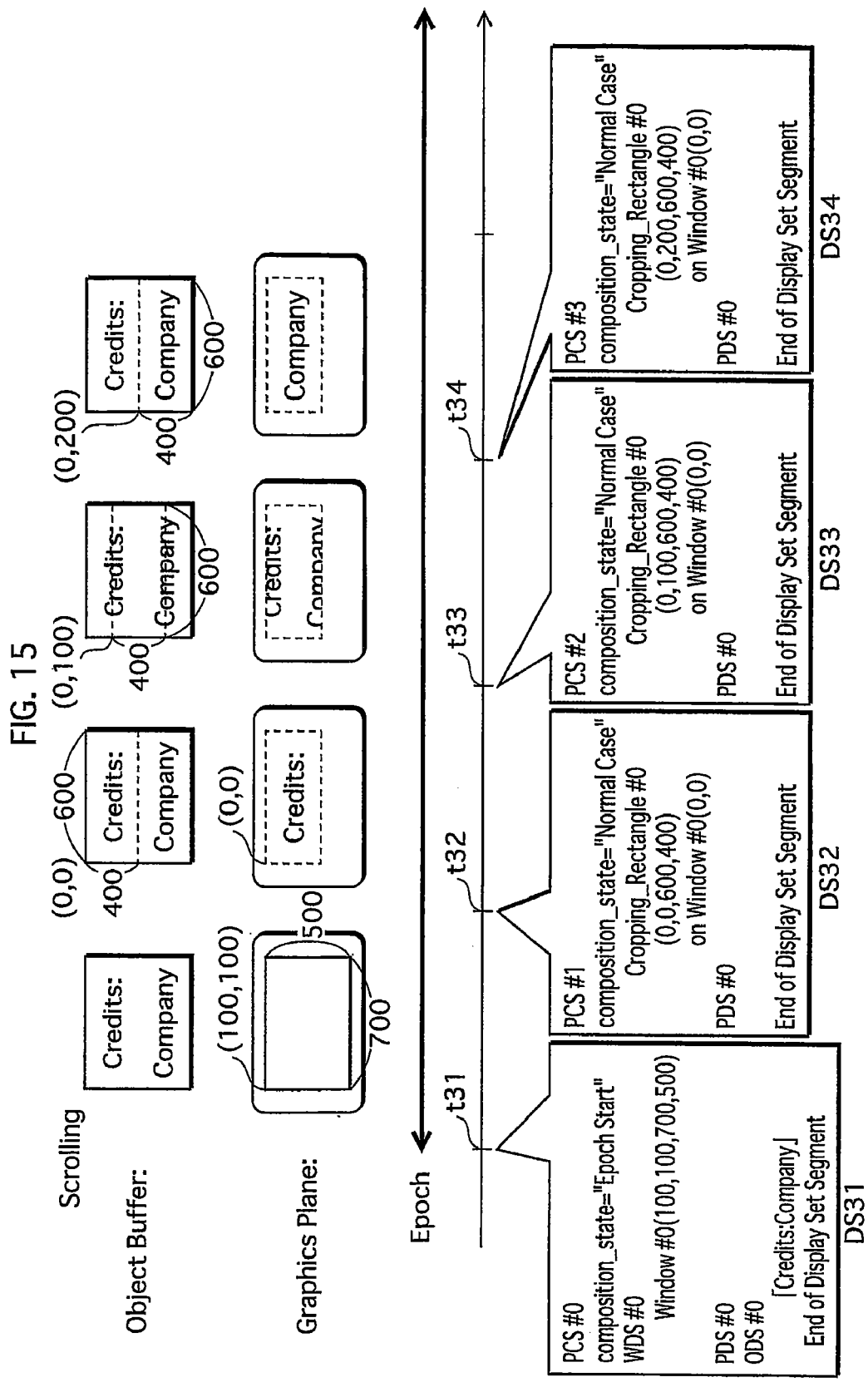
FIG. 15 is an example of a description of a Display Set when Scrolling is performed, illustrating along a timeline.

Next, a description protocol for a Scrolling is explained. FIG. 15 shows an example of the description of the DS when Scrolling is performed, illustrating along a timeline. Display Sets DS31, DS32, DS33, and DS34 are at points t31, t32, t33, and t34 on the reproduction timeline in the drawing.

The DS31 at the point t31 includes a PCS#0 whose composition_state is set to "Epoch Start" and object_cropped_flag is "0" (no_cropping_rectangle_visible), a WDS#0 having a statement for a Window in a width 700×height 500 at (100,100) in the Graphics Plane, a PDS#0, an ODS#0 indicating a subtitle "Credits: Company", and an END.

The DS32 at the point t32 includes a PCS#1 whose composition_state is "Normal Case" and indicating the crop operation of the Graphics Object to be in a 600×400 size from (0,0) in the Object Buffer (cropping_rectangle#0(0,0,600, 400)), and positioning the cropped Graphics Object at the coordinates (0,0) in the Graphics Plane (on Window#C (0,0)).

An area of the 600×400 size from (0,0) in the Object Buffer includes a part "Credits:" of the subtitle "Credits: Company" shown in two lines, and thus the part "Credits:" appears on the Graphics Plane.

The DS33 at the point t33 includes a PCS#2 whose composition_state is "Normal Case" and indicating the crop operation of the Graphics Object to be in a 600×400 size from (0,100) in the Object Buffer (cropping_rectangle#0 (0,100, 600,400)), and positioning the cropped Graphics Object at the coordinates (0,0) in the Graphics Plane (on Window#0 (0,0)). The area of the 600×400 size from (0,100) in the Object Buffer includes the part "Credits: " and a part "Company" of the subtitle "Credits: Company" shown in two lines, and thus the parts "Credits:" and "Company" appear in two lines on the Graphics Plane.

The DS34 at the point t34 includes a PCS#3 whose composition_state is "Normal Case" and indicating the crop operation of the Graphics Object to be in a 600×400 size from (0,200) in the Object Buffer (cropping_rectangle#0 (0,200, 600,400)), and positioning the cropped Graphics Object at the coordinates (0,0) in the Graphics Plane (on Window#0 (0,0)). The area of the 600×400 size from (0,200) in the Object Buffer includes the part "Company" of the subtitle "Credits: Company" shown in two lines, and thus the part "Company" appears on the Graphics Plane. By the above PCS description, it is possible to scroll down the subtitle in two lines.

Figure 16:
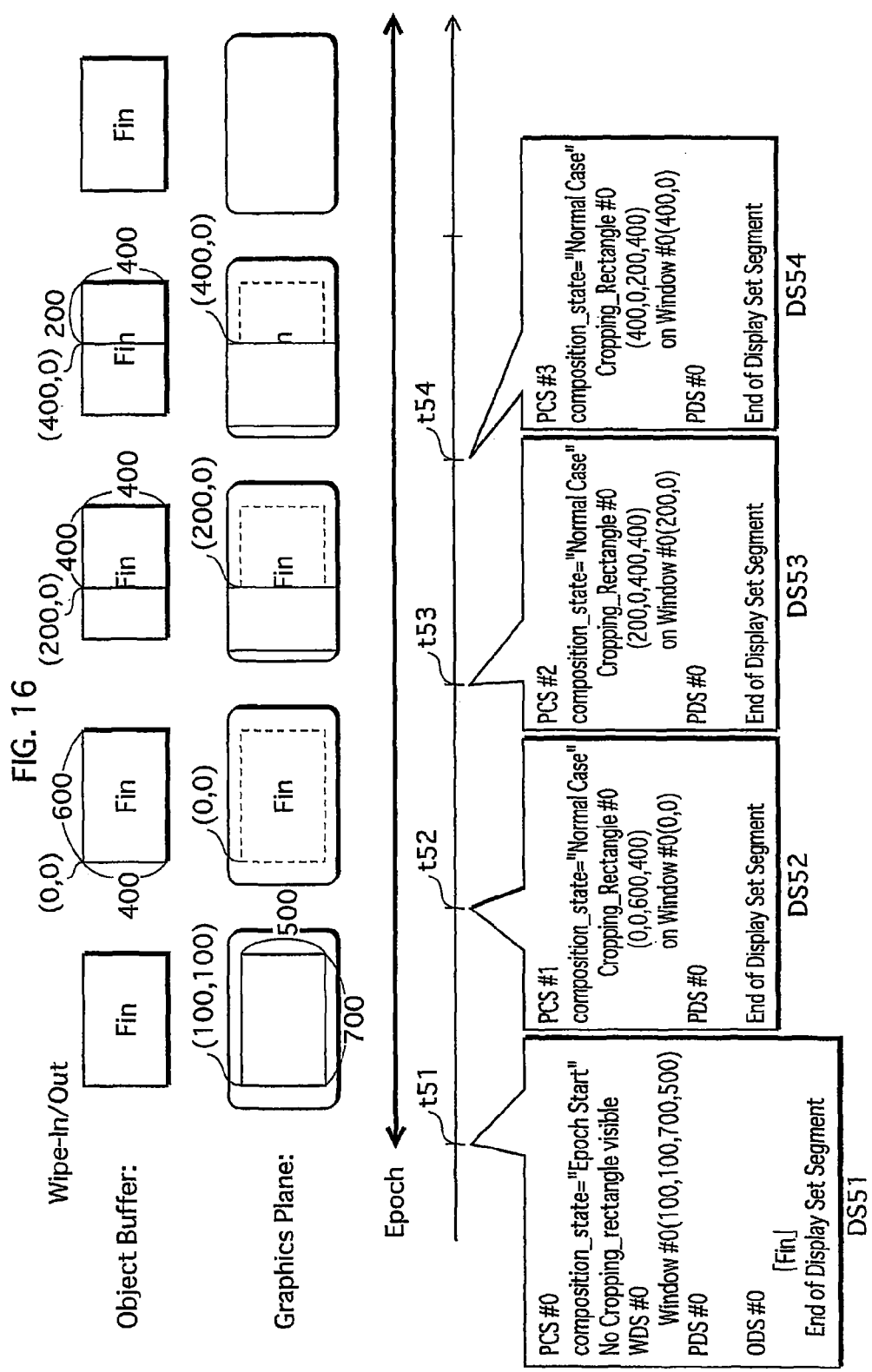
FIG. 16 is an example of a description of a Display Set when Wipe-In/Out is performed, illustrating along a timeline.

Finally, a description protocol for a Wipe-In/Out effect is explained. FIG. 16 shows an example of the description of the DS when Wipe-In/Out is performed, illustrating along a timeline. Display Sets DS21, DS22, DS23, and DS24 are at points t21, t22, t23, and t24 on the reproduction timeline in the drawing.

The DS51 at the point t51 includes a PCS#0 whose composition_state is set to "Epoch Start" and the object_cropped_flag is "0" (no_cropping_rectangle_visible), a WDS#0 having a statement for a Window in a width 700×height 500 at (100,100) in the Graphics Plane, a PDS#0, an ODS#0 indicating a subtitle "Fin", and an END.

The DS52 at the point t52 includes a PCS#1 whose composition_state is "Normal Case" and indicating the crop operation of the Graphics Object to be in a 600×400 size from (0,0) in the Object Buffer (cropping_rectangle#0(0,0,600, 400)), and positioning the cropped Graphics Object at the coordinates (0,0) in the Graphics Plane (on Window#0 (0,0)). An area of the 600×400 size from (0,0) in the Object Buffer includes the subtitle "Fin", and thus the subtitle "Fin" appears on the Graphics Plane.

The DS53 at the point t53 includes a PCS#2 whose composition_state is "Normal Case" and indicating the crop operation of the Graphics Object to be in a 400×400 size from (200,0) in the Object Buffer (cropping_rectangle#0 (200,0, 400,400)), and positioning the cropped Graphics Object at the coordinates (200,0) in the Graphics Plane (on Window#0 (200,0)). By this, an area indicated by coordinates (200,0) and (400,400) in the Window becomes a display area, and an area indicated by coordinates (0,0) and (199,400) becomes a no-display area.

The DS54 at the point t54 includes a PCS#3 whose composition_state is "Normal Case" and indicating the crop operation of the Graphics Object to be in a 200×400 size from (400,0) in the Object Buffer (cropping_rectangle#0 (400,0, 200,400)), and positioning the cropped Graphics Object at the coordinates (400,0) in the Graphics Plane (on Window#0 (400,0)). By this, an area indicated by coordinates (0,0) and (399,400) becomes the no-display area.

By this, as the no-display area becomes larger, the display area becomes smaller, and thus the Wipe-In/Out effect is realized.

As described above, various effects such as Cut-In/Out, Fade-In/Out, Wipe-In/Out, and Scrolling may be realized using corresponding scripts, and therefore it is possible to make various arrangements in rendering the subtitles.

Constraints for realizing the above effects are as follows. In order to realize the Scrolling effect, operations for clearing and redrawing of the Window becomes necessary. Taking the example of FIG. 15, it is necessary to perform "window clear" to erase the Graphics Object "Credits:" at the t32 from the Graphics Plane, and then to perform "window redraw" to write a lower part of "Credits:" and an upper part of "Company" to the Graphics Plane during an interval between the t32 and t33. Given that the interval is the same as an interval of video frames, a transfer rate between the Object Buffer and the Graphics Plane desirable for the Scrolling effect becomes an important point.

Here, a constraint about how large the Window may be is looked into. An Rc is the transfer rate between the Object Buffer and the Graphics Plane. A worst scenario here is to perform both of the Window clear and Window redraw at the rate Rc. In this case, each of the Window clear and Window redraw is required to be performed at a rate half of Rc (Rc/2).

In order to make the Window clear and Window redraw synchronized with a video frame, an equation below is need to be satisfied.

$$\text{Window size} \times \text{Frame Rate} \approx Rc/2$$

If the Frame Rate is 29.97, Rc is expressed by an equation below.

$$Rc = \text{Window size} \times 2 \times 29.97$$

In rendering the subtitles, the Window size accounts for at least 25% to 33% of the Graphics Plane. A total number of pixels in the Graphics Plane is 1920×1080. Taking that an index bit length per pixel is 8 bits, a total capacity of the Graphics Plane is 2 Mbytes ($\approx$1920×1080×8).

Taking that the Window size is ¼ of the total capacity of the Graphics Plane, the Window size becomes 500 Kbytes (=2 Mbytes/4). By substituting this value to the above equation, Rc is calculated to be 256 Mbps (=500 Kbytes×2×29.97). If the rate for the Window clear and Window redraw may be a half or a quarter of the frame rate, it is possible to double or quadruple the size of the Window even if the Rc is the same.

By keeping the Window size 25% to 33% of the Graphics Plane and displaying the subtitles at the transfer rate of 256 Mbps, it is possible to maintain the sync display between the graphics and the movie picture, no matter what kind of display effect is to be realized.

Next, the position, size, and area of the Window are explained. As explained above, the position and area of the Window does not change in one Epoch. The position and the size of the Window set to be the same during one Epoch because it is necessary to change a target write address of the Graphics Plane if the position and the size change, and changing the address causes an overhead that lowers the transfer rate from the Object Buffer to the Graphics Plane.

A number of Graphics Objects per Window has a limitation. The limitation of the number is provided in order to reduce the overhead in transferring decoded Graphics Object. The overhead here is generated when setting the address of an edge of the Graphics Object, and the more a number of edges, the more the overhead is generated.

FIG. 17 shows examples in comparison, an example in which a Window has four Graphics Objects and another example in which a Window has two Graphics Objects. The number of the edges of the example with four Graphics Objects is twofold of the number of the edges of the example with two Graphics Objects.

Without the limitation in the number of the Graphics Object, it becomes unknown how many overheads could be generated in transferring the Graphics, and thus the load for the transfer increases and decreases drastically. On the other hand, when a maximum number of the Graphics Object in a Window is two, the transfer rate may be set taking up to 4 overhead into account. Accordingly, it is easier to set the number of a minimum transfer rate.

Next, an explanation about how the DS having the PCS and ODS is assigned to the timeline of the AVClip. The Epoch is a period of time in which a memory management is consecutive along the reproduction timeline. Since the Epoch is made of more than one DS, how to assign the DS to the reproduction timeline of the AVClip is important. The reproduction timeline of the AVClip is a timeline for specifying timings for decoding and reproducing of each piece of picture data that constitute the video stream multiplexed to the AVClip. The decoding and reproducing timings on the reproduction timeline are expressed at an accuracy of 90 KHz. A DTS and PTS that are attached to the PCS and ODS in the DS indicate timings for a synchronic control on the reproduction timeline. The assigning of the Display Set to the reproduction timeline means performing the synchronic control using the DTS and PTS attached to the PCS and ODS.

First, how the synchronic control is performed using the DTS and PTS attached to the ODS is explained below.

The DTS indicates, at the accuracy of 90 KHz, a time when the decoding of the ODS starts, and the PTS indicates a time when the decoding ends.

The decoding of the ODS does not finish at once, and has a certain length of time. In response to a request for clearly indicating a starting point and an ending point of a decode duration, the DTS and PTS of the ODS respectively indicate the times when the decoding starts and ends.

The value of the PTS indicates the deadline, and therefore it is necessary that the decoding of the ODS has to be completed by the time indicated by the PTS and the decompressed Graphics Object is written to the Object Buffer on the reproduction apparatus.

The decode starting time of any ODSj in a DSn is indicated by a DTS (DSn [ODS]) at the accuracy of 90 KHz. Adding a maximum length of the decode duration to the DTS(DSn [ODS]) is the time when the decoding of the ODSj ends.

When a size of the ODSj is "SIZE (DSn [ODSj])" and a decoding rate of the ODS is an "Rd", the maximum time required for decoding indicated by second is expressed in "SIZE (DSn [ODSj])//Rd". The symbol "//" indicates an operator for a division with rounding up after a decimal place.

By converting the maximum time period into a number expressed at the accuracy of 90 KHz and adding to the DTS of the ODSj, the time when the decoding ends (90 KHz) indicated by the PTS is calculated.

The PTS of the ODSj in the DSn is expressed in a following equation.

$$PTS(DSn[ODSj]) = DTS(DSn[ODSj]) + 90{,}000 \times (SIZE(DSn[ODSj])//Rd)$$

Further, it is necessary that a relation between two succeeding ODS, ODSj and ODSj+1, satisfies a following equation.

$$PTS(DSn[ODSj]) \leq DTS(DSn[ODSj+1])$$

Next, settings of the DTS and PTS of the PCS are explained.

It is necessary that the PCS is loaded to the Object Buffer on the reproduction apparatus before the decode starting time (DTS (DSn[ODS1])) of a first ODS (ODS1) in the DSn, and before the time (PTS (DSn[PDS1])) when a first PDS (PDS1) in the DSn becomes effective. Accordingly, it is necessary that the DTS is set so as to satisfy following equations.

$$DTS(DSn[PCS]) \leq DTS(DSn[ODS1])$$

$$DTS(DSn[PCS]) \leq PTS(DSn[PDS1])$$

Further, the PTS of the PCS in the DSn is expressed in a following equation.

$$PTS(DSn[PCS]) \geq DTS(DSn[PCS]) + \text{decodeduration}(DSn)$$

The "decodeduration(DSn)" indicates a time duration for decoding all the Graphics Objects used for updating PCS. The decode duration is not a fixed value, but does not vary according to a status of the reproduction apparatus and a device or a software mounted to the reproduction apparatus. When the Object used for composing a screen of a DSn.PCSn is a DSn.PCSn.OBJ[j], the decodeduration(DSn) is affected by time (i) needed for clearing the Window, decode durations (ii) for decoding a DSn.PCSn.OBJ, and time (iii) needed for writing of the DSn.PCSn.OBJ. When the Rd and Rc are set, the decode_duration (DSn) is always the sane. Therefore, the PTS is calculated by calculating lengths of these durations in authoring.

Figure 19:
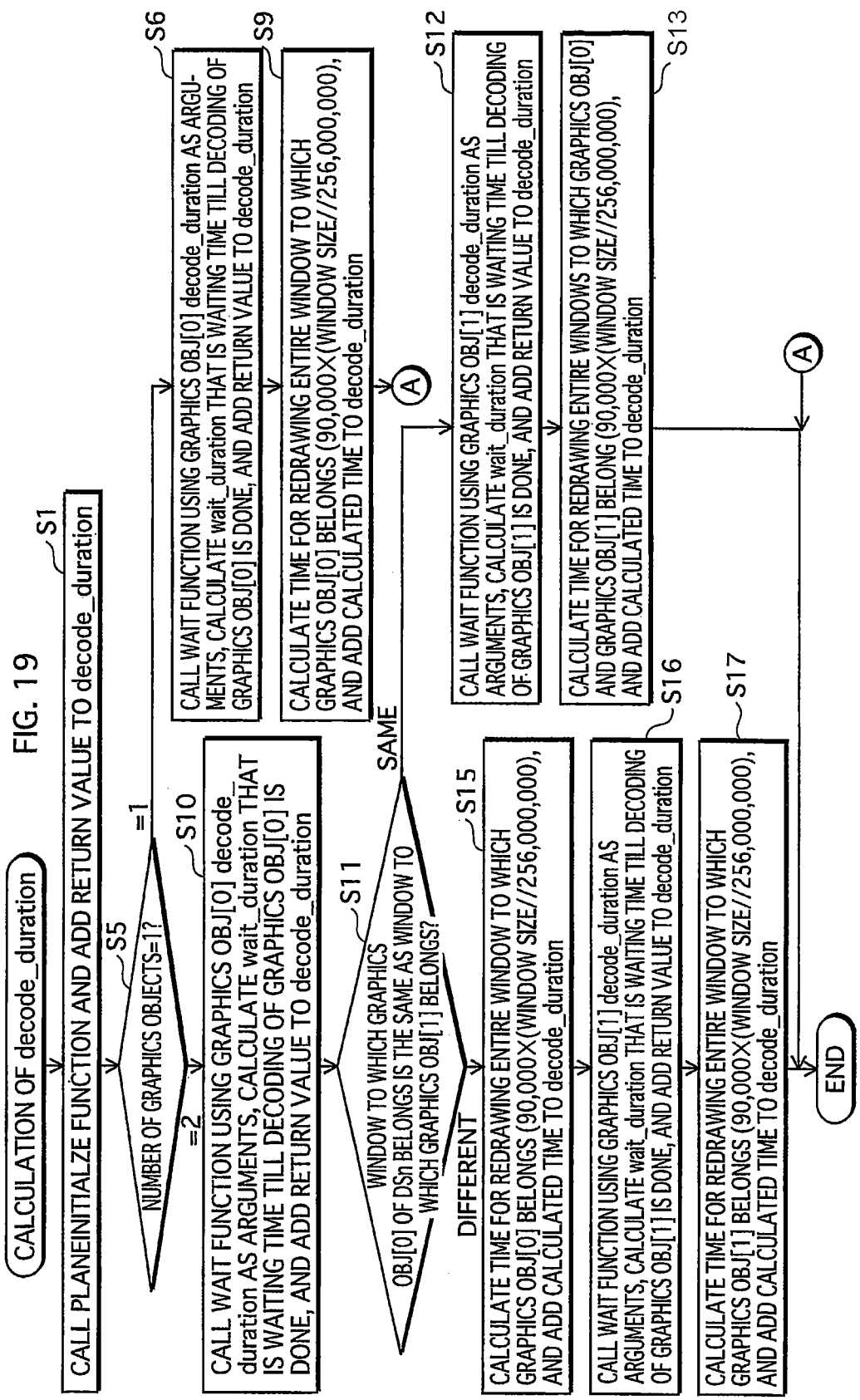
FIG. 19 is a flowchart of the algorithm of FIG. 18.
Figure 20A:
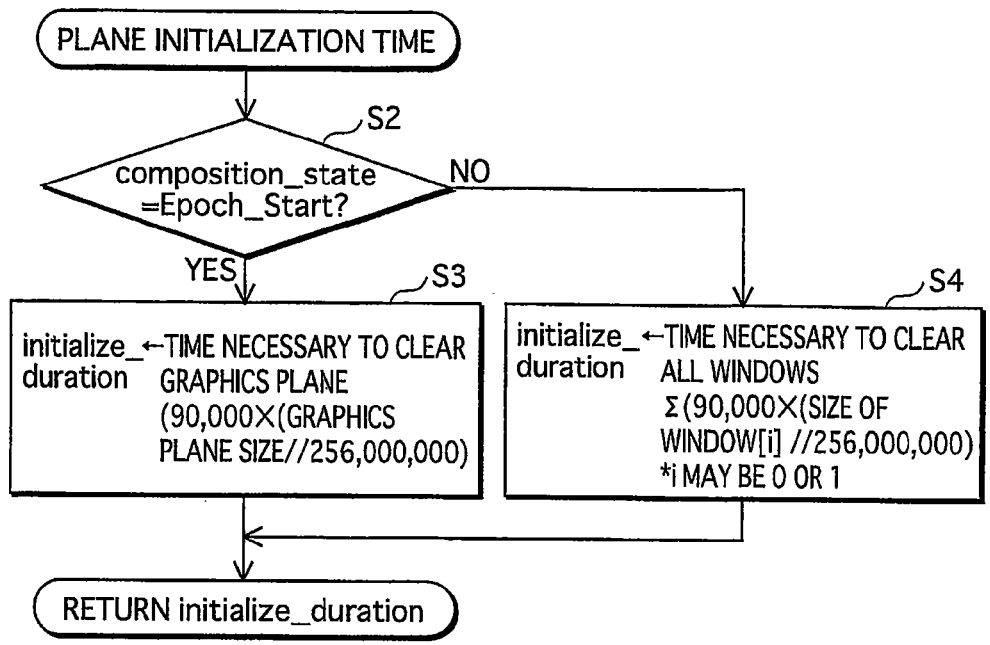
FIGS. 20A and B are flowcharts of the algorithm of FIG. 18.
Figure 20B:
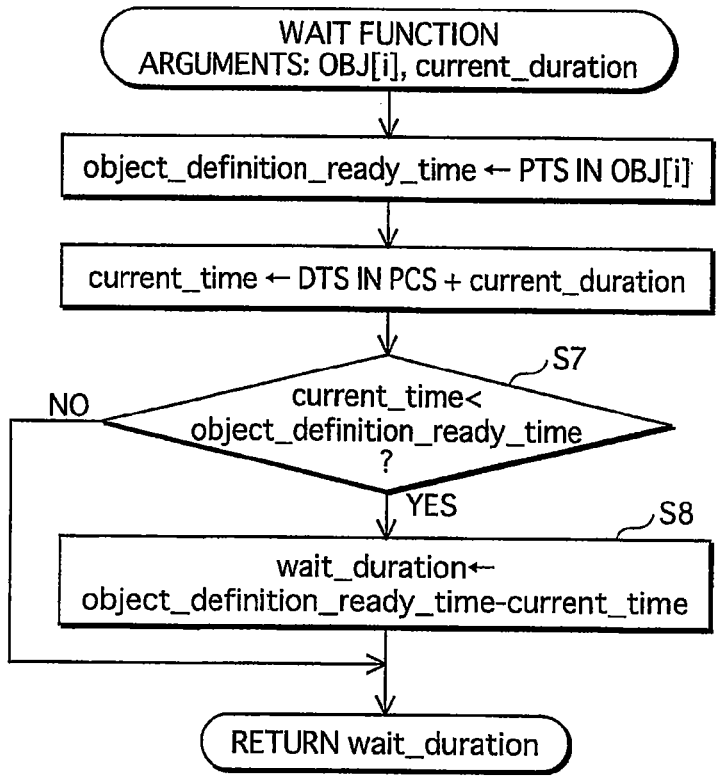

The calculation of the decode_duration is performed based on a program shown in FIG. 18 . FIGS. 19, 20A and 20B are flowcharts schematically showing algorithms of the program. An explanation about the calculation of the decode_duration is given below referring to these drawings. In the flowchart shown in FIG. 19, first, a PLANEINITIALZE function is called (Step S1 in FIG. 19). The PLANEINITIALZE function is used for calling a function for calculating a time period necessary to initialize the Graphics Plane for rendering the DS. In the Step S1 in FIG. 19, the function is called with arguments DSn, DSn. PCS. OBJ[0], and decode_duration.

The following explains the PLANEINITIALZE function in reference to FIG. 20A. In the drawing, initialize_duration is a variable indicating a return value of the PLANEINITIALZE function.

Step S2 in FIG. 20 is an if statement for switching operations depending on whether or not the page_state in the PCS in the DSn indicates the Epoch Start. If the page_state indicates the Epoch Start (DSn.PCS.page_state==epoch_start, Step S2=Yes in FIG. 18), a time period necessary to clear the Graphics Plane is set to an initialize_duration (Step S3).

When the transfer rate Rc between the Object Buffer and the Graphics Plane is 256,000,000 as described in the above, and the total size of the Graphics Plane is set to video_width*video_height, the time period necessary to clear is "video_width*video_height//256,000,000". When multiplied by 90.000 Hz so as to express at the time accuracy of PTS, the time period necessary to clear the Graphics Plane is "90,000×video_width*video_height//256,000,000". This time period is added to the initialize_duration.

If the page_state does not indicate the Epoch Start (Step S2=No), a time period necessary to clear Window [i] defined by the WDS is added to the initialize_duration for all Windows (Step S4). When the transfer rate Rc between the Object Buffer and the Graphics Plane is 256,000,000 as described in the above and a total size of Window[i] that belongs to the WDS is ΣSIZE(WDS.WIN[i]), the time period necessary to clear is "ΣSIZE(WDS.WIN[i])//256,000,000". When multiplied by 90.000 Hz so as to express at the time accuracy of PTS, the time period necessary to clear the Windows that belong to the WDS is "90,000×ΣSIZE(WDS.WIN[i])//256,000,000". This time period is added to the initialize_duration, and the initialize_duration as a result is returned. The above is the PLANEINITIALZE function.

Step S5 in FIG. 19 for switching operations depending on whether the number of the Graphics Objects in the DSn is 2 or 1 (if(DSn.PCS.num_of_object==2, if(DSn.PCS.num_of_object==1 in FIG. 18), and if the number is 1 (Step S5), a waiting time for decoding the Graphics Object is added to the decode_duration (Step S6). Calculation of the waiting time is performed by calling a WAIT function (decode_duration+=WAIT(DSn, DS.PCS.OBJ[0], decode_duration) in FIG. 18). The function is called using arguments set to DSn, DSn.PCS.OBJ [0], decode_duration, and a return value is wait_duration.

FIG. 20B is a flowchart showing an operation of the WAIT function.

In the flowchart, the decode_duration of an invoker is set as a current_duration. An object_definition_ready_time is a variable set to the PTS of the Graphics Object of the DS.

A current_time is a variable set to a total value of the current_duration and the DTS of the PCS in the DSn. When the object_definition_ready_time is larger than the current_time (Yes to Step S7, if (current_time<object_definition_ready_time)), the wait_duration as the return value is set to be a difference between the object_definition_ready_time and the current_time (Step S8, wait_duration+=object _definition_ready_time−current_time). The decode_duration is set to the time period that the return value of the WAIT function added to the time period necessary for re-drawing the Window, (90,000*(SIZE(DSn.WDS.WIN[0]))//256,000,000).

The above explanation is for the case in which the number of the Graphics Object is one. In Step S5 in FIG. 5, it is judged if the number of the Graphics Objects is two. If the number of the Graphics Objects in the DSn is more than two (if(DSn.PCS.num_of_object==2) in FIG. 18), the WAIT function is called using OBJ[0] in the PCS as an argument, and add a return value to the decode_duration (Step S10).

In a succeeding Step S11, it is judged if the Window to which the OBJ[0] of the DSn belongs is the same as the Window to which the Graphics Object [1] belongs (if(DSn.OBJ[0]. window_id==DSn.PCS.OBJ[1].window_id). If the Window is the same, the WAIT function is called using OBJ[1] as an argument, and add a return value wait_duration to the decode_duration (Step S12), and add the time necessary to redraw the Window to which OBJ[0] belong (90,000* (SIZE (DSn.WDS.OBJ[0]. window_id))//256,000,000) to the decode_duration (Step S13).

If it is judged that the Windows are different (Step S11, "different"), the time necessary to redraw the Window is added to which OBJ[0] belong (90,000*(SIZE (DSn.WDS.OBJ[0]. window_id))//256,000,000) to the decode_duration (Step S15), the WAIT function is called using OBJ[1] as an argument, and add a return value wait_duration to the decode_duration (Step S16), and the time necessary to redraw the Window to which OBJ[1] belong (90,000*(SIZE (DSn.WDS.OBJ[0]. window_id))//256,000,000) to the decode_duration (Step S17).

The decode_duration is calculated by the above algorithm. A specific manner in which the PTS of the OCS is set is explained below.

Figure 21A:
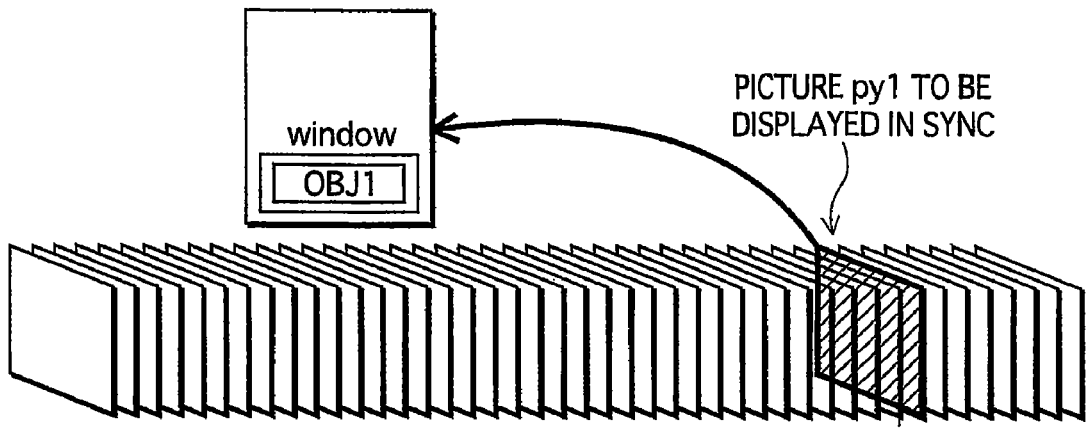
FIG. 21A illustrates a case in which each window has an Object Definition Segment.
Figure 21B:
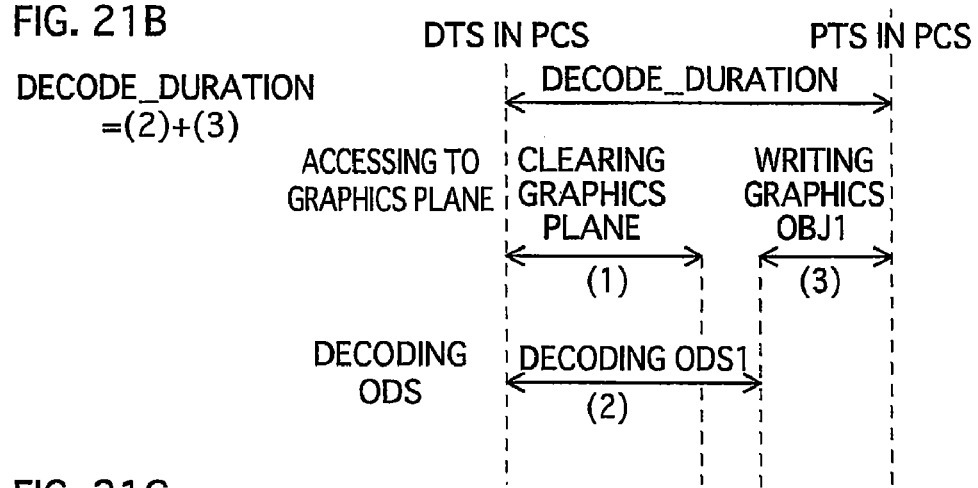
FIGS. 21B and C are timing charts showing orders among numerals referred to in FIG. 18.
Figure 21C:
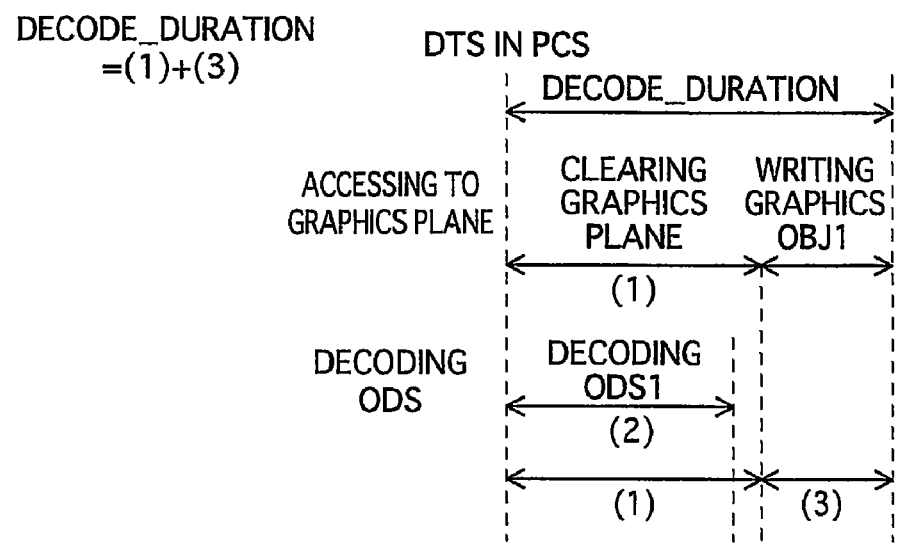

FIG. 21A illustrates a case in which one ODS is included in one Window. FIGS. 21B and 21C are timing charts showing values in an order of time that are referred to in FIG. 18. A bottom line "ODS Decode" and a middle line "Graphics Plane Access" in each chart indicate two operations that are performed simultaneously when reproducing. The above algorithm is described assuming that these two operations are performed in parallel.

The Graphics Plane Access includes a clearing period (1) and a write period (3). The clearing period (1) indicates either a time period necessary to clear an entire Graphics Plane (90,000×(size of Graphics Plane//256,000,000)), or a time period necessary to clear all Windows on the Graphics Plane (Σ(90,000×(size of Window [i]//256,000,000)).

The write period (3) indicates a time period necessary to render an entire Window (90,000×(size of Window [i]//256,000,000)).

Further, a decode period (2) indicates a time period between the DTS and the PTS of the ODS.

Lengths of the clearing period (1), the decode period (2), and the write period (3) may vary depending on a range to be cleared, a size of ODS to be decoded, and a size of the Graphics Object to be written to the Graphics Plane. For convenience, a starting point of the decode period (2) in the drawing is the same as a starting point of the clearing period (1).

FIG. 21B illustrates a case in which the decode period (2) is long, and the decode_duration equals to a total of the decode period (2) and the write period (3).

FIG. 21C illustrates a case in which the clearing period (1) is long, and the decode_duration equals to a total of the clearing period (1) and the write period (3).

Figure 22A:
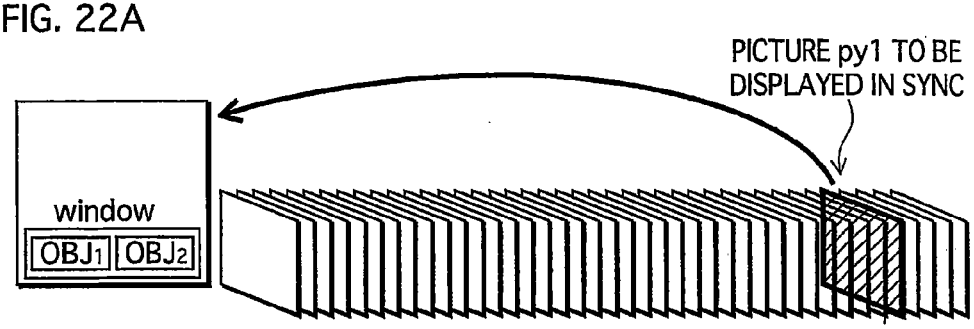
FIG. 22A illustrates a case in which each window has two Object Definition Segments.
Figure 22B:
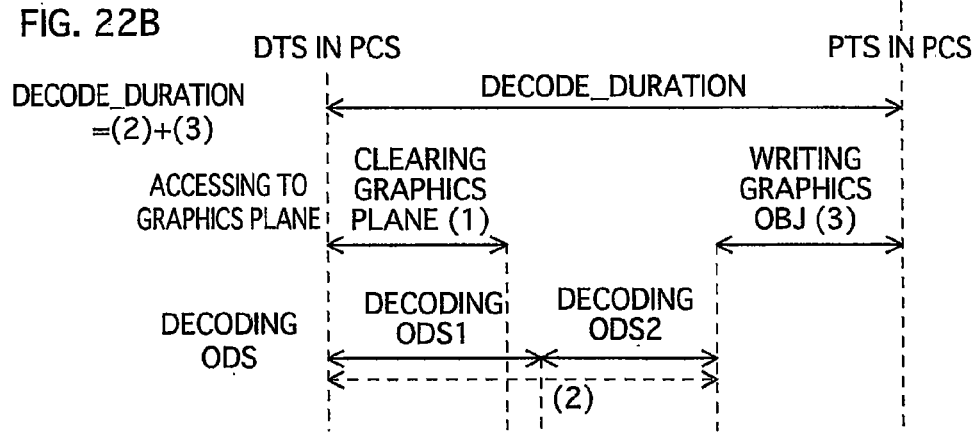
FIGS. 22B and C are timing charts showing orders among numerals referred to in FIG. 18.
Figure 22C:
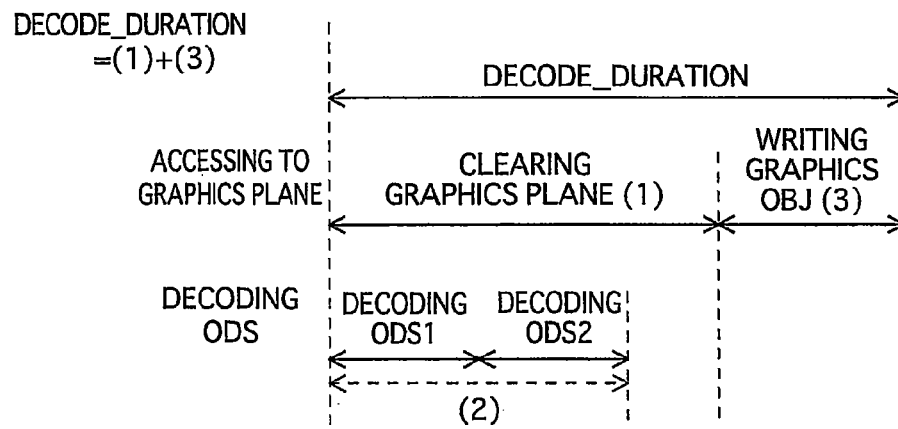

FIGS. 22A to 22C illustrate a case in which two ODS is included in one Window. The decode period (2) in both FIGS. 22B and 22C indicates a total time period necessary for decoding two Graphics. Likewise, the write period (3) indicates a total time period necessary for writing two Graphics to the Graphics Plane.

Even though the number of ODS is two, it is possible to calculate the decode_duration in the same manner as in the case of FIG. 21. When the decode period (3) for decoding the two ODS is long, the decode_duration equals to a total of the decode period (2) and the write period (3) as shown in FIG. 22B.

When the clearing period (1) is long, the decode_duration equals to a total of the clearing period (1) and the write period (3).

FIG. 23A describes a case in which each of two Windows includes an ODS. As in the previous cases, when the clearing period (1) is longer than the decode period (3) for decoding the two ODS, the decode_duration equals to a total of the clearing period (1) and the decode period (2). However, when the clearing period (1) is shorter than the decode period (3), it is possible to write to a first Window before the decode period (2) ends. Accordingly, the decode_duration does not equal to either of a total of the clearing period (1) and the write period (3), or a total of the decode period (2) and the write period (3).

When a time period necessary for decoding a first ODS is a write period (31) and a time period necessary for decoding a second ODS is a write period (32), FIG. 23B illustrates a case in which the decode period (2) is longer than a total of the clearing period (1) and the write period (31). In this case, the decode_duration equals to a total of the decode period (2) and the write period (32).

FIG. 23C illustrates a case in which a total of the clearing period (1) and the write period (31) is longer than the decode period (2). In this case, the decode_duration equals to a total of the clearing period (1), the write period (31), and the write period (32).

The size of the Graphics Plane is known from a model of the reproduction apparatus in advance. Also, the size of the Window, and the size and number of the ODS are also known at the authoring. Accordingly, it is possible to find to which combination of time periods the decode_duration equals: the clearing period (1) and the write period (3), the decode period (2) and the write period (3), the decode period (2) and the write period (32), or the clearing period (1), the write period (3) and the write period (32).

By setting the PTS of the ODS based on the calculation of the decode_duration explained above, it is possible to synchronously display the graphics with the picture data at a high accuracy. Such a sync display at a high accuracy becomes possible by defining the Window and limiting an area to re-draw to the Window. Thus, introducing a concept of Window into an authoring environment has a great significance.

The following is an explanation about settings of the DTS and PTS of the WDS in the DSn. The DTS of the WDS may be set so as to satisfy an equation below.

$$DTS(DSn\ [WDS]) \geq DTS(DSn\ [PCS])$$

On the other hand, the OTS of the WDS in the DSn indicates a deadline to start writing to the Graphics Plane. Because it is sufficient to write to the Window on the Graphics Plane, the time to start writing to the Graphics Plane is determined by subtracting a time length indicated by the PTS of the PCS from a time period necessary for writing the WDS. When a total size of the WDS is ΣSIZE (WDS.WIN [i]), the time necessary for clearing and re-drawing is "ΣSIZE (WDS.WIN [i])//256,000,000". When expressing at a time accuracy of 90,000 KHz, the time is "90,000×ΣSIZE (WDS.WIN[i])//256,000,000".

Accordingly, it is possible to calculate the PTS of the WDS by the following equation.

$$PTS(DSn[WDS])=PTS(DSn[PCS])-90000\times\Sigma SIZE\ (WDS.WIN[i])//256,000,000$$

The PTS indicated in the WDS is the deadline, and it is possible to start writing to the Graphics Plane earlier than the PTS. In other words, as shown in FIG. 23, once decoding the ODS to be rendered in one of the Windows, writing of the Graphics Object obtained by the decoding may start at this point.

As described above, it is possible to assign the Window to any point of time on the reproduction timeline of the AVClip using the DTS and PTS added to the WDS.

Figure 24:
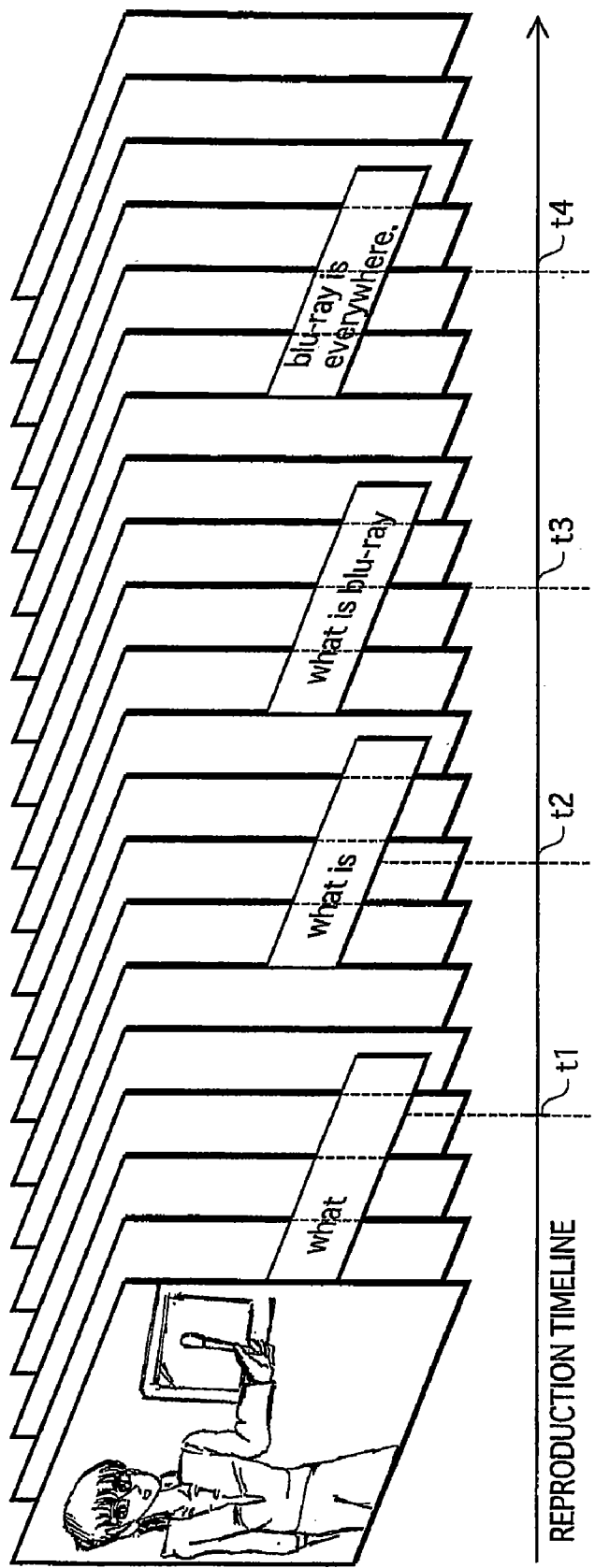
FIG. 24 illustrates shifts in time of update described in an example in the present specification.

Explanations about an example of settings of the DTS and PTS in a Display Set based on the settings are give below, referring to specific example illustrated in FIGS. 24-25. The example is about a case in which subtitles are displayed by writing to the Graphics Plane four times, and an update is performed for displaying each of two subtitles "what is blu-ray." and "blu-ray is everywhere." FIG. 24 illustrates shifts in time of the update in the example. Until a point t1, "what" is displayed, and "what is" is displayed after the t1 till a t2, and then "what is blu-ray. " is displayed at a t3. After a whole sentence of a first subtitle has appeared, a second subtitle "blu-ray is everywhere." is displayed at a t4.

Figures 25A, 25B:
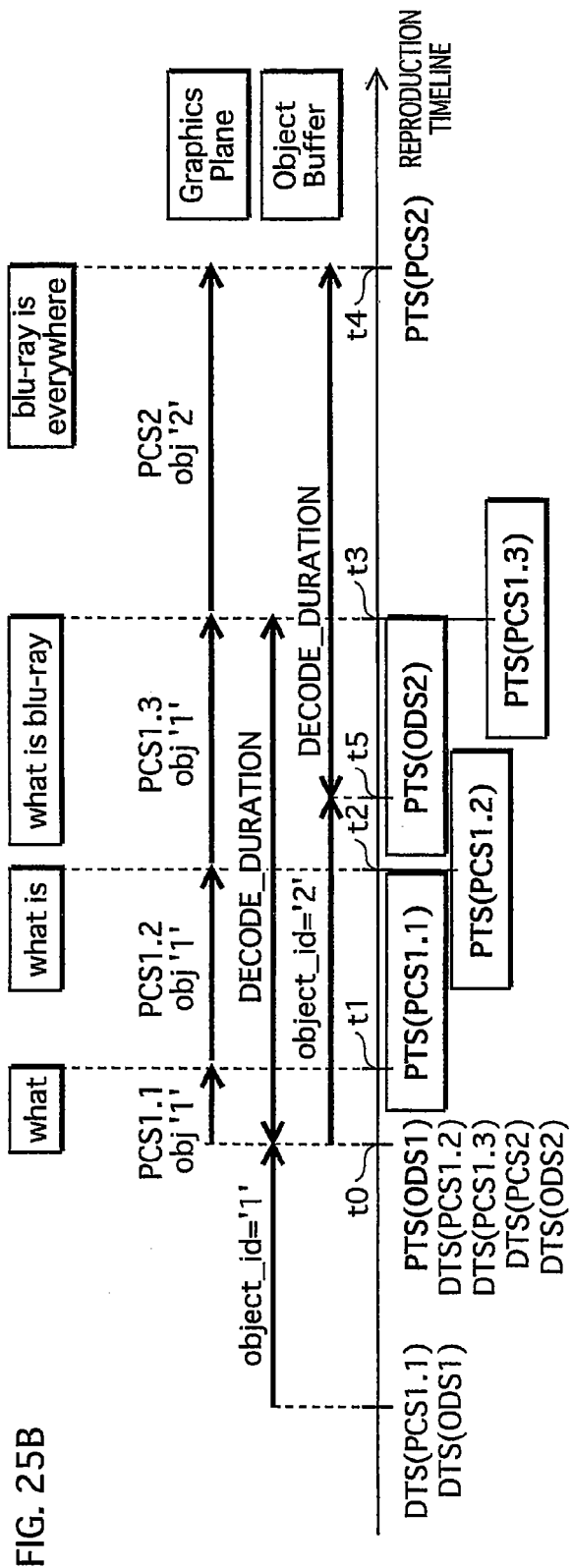
FIG. 25A illustrates four Display Sets that are described so as to perform the above explained update.
FIG. 25B is a timing chart showing settings of DTS and PTS of functional segments included in the four Display Sets.

FIG. 25A illustrates four Display Sets that are described so as to perform the above explained update. A DS1 includes a PCS1.2 for controlling an update at the t1, a PDS1 for coloring, an ODS1 corresponding to the subtitle "what is blu-ray.", and an END as an ending code of the DS1.

A DS2 includes a PCS1.2 for controlling an update at the t2, and an END. A DS 3 includes a PCS1.3 for controlling an update at a t3 and an END. A DS 4 includes a PCS2 for controlling an update at the t2, a PDS2 for color conversion, an ODS2 corresponding to the subtitle "blu-ray is everywhere.", and an END.

Referring to a timing chart in FIG. 25B, settings of DTS and PTS for each functional segment in the four Display Sets are explained.

The reproduction timeline in the timing chart is the same as the timeline in FIG. 24. In the timing chart of FIG. 25A, PTS (PCS1.1), PTS (PCS1.2), PTS (PCS1.3), and PTS (PCS2) are respectively set at a display point t1 for displaying "what", a display point t2 for displaying "what is", a display point t3 for displaying "what is blu-ray.", and a display point T4 for displaying "blue-ray is everywhere.". Each PTS are set as above, because it is necessary that the control such as cropping described in each PCS is performed at the display point of each subtitle.

PTS (ODS1) and PTS (ODS2) are set so as to indicate points that are calculated by subtracting decode_duration from the points indicated by PTS (PCS1.1) and PTS (PCS2), respectively, because PTS (PCS) is required to be set so as to satisfy a formula below.

$$PTS(DSn[PCS]) \geq DTS(DSn[PCS])+\text{decodeduration}\ (DSn)$$

In FIG. 25B, PTS (ODS2) is set so as to indicate a point t5 that comes before the point t4, and PTS (ODS1) is set so as to indicate a point t0 that comes before the point t1.

DTS (ODS1) and DTS (ODS2) are set so as to indicate points that are calculated by subtracting decode_duration from the points indicated by PTS (ODS1) and PTS (ODS2), respectively, because DTS (ODS) is required to be set so as to satisfy an equation below.

$$PTS(DS[ODSj])=DTS(DSn[ODSj])+90,000\times(SIZE\ (DSn[ODSj])//Rd)$$

In FIG. 25B, PTS(ODS2) is set so as to indicate the point t5 that comes before the point t0, and PTS(ODS1) is set so as to indicate a point that comes before the point t0. A relation indicated by DTS (ODS2)=PTS(ODS1) is satisfied here.

By setting a PTS of an ODS immediately after a PTS of a preceding ODS to be displayed earlier, the reproduction apparatus performs an operation in which the ODS is read out to the memory so as to overwrite the preceding ODS, and thus it is possible that the reproduction process is performed by a small size of memory. By realizing such a reproduction process, choices for a memory size for a reproduction apparatus become wider.

The DTS of PCS1.1 is set so as to be DTS (PCS1.1)=DTS (ODS1), because the value for the DTS of PCS1.1 may be any point before the point indicated by DTS (ODS1).

The PTS of ODS1, the DTS of ODS2, and the PTS of the PCS1.2, PCS1.3, and PCS2 are set at the point t0, so as to satisfy a relation indicated by an equation below.

$$PTS(ODS1)=DTS(ODS2)=PTS(PCS1.2)=PTS\ (PCS1.3)=PTS(PCS2)$$

This is because the value for the DTS of PCS1.2 and PCS1.3 may be any points before the point indicated by PTS (PCS1.3), and the DTS of PCS2 may be any point before the point indicated by DTS (PCS2).

As explained above, it is possible to perform update of a succeeding PCS as soon as the updating of a previous PCS is completed, by reading out more than one PCS at the same time.

It is sufficient that the DTS and PTS of PCS and the DTS and PTS of ODS satisfy the relations indicated by the formulae above. Accordingly, it becomes possible that the values are set to be DTS (ODS2)=PTS (ODS1) or PTS (ODS1)=

DTS (ODS2)=PTS (PCS1.2)=PTS (PCS1.3)=DTS (PCS2). By such settings for time stamps, it is possible to adjust time length of a period in which load in decoding increases or more buffers are needed. Such adjustment expands possibility of the controls during the reproduction, and advantageous for those who perform authoring or manufacture reproducing apparatuses.

Data structures of the Display Sets (PCS, WDS, PDS, ODS) explained above is an instance of the class structure described in a programming language. Producers that perform authoring may obtain the data structures on the BD-ROM by describing the class structure according to the syntax provided in the Blu-ray Disc Prerecording Format.

Figure 26:
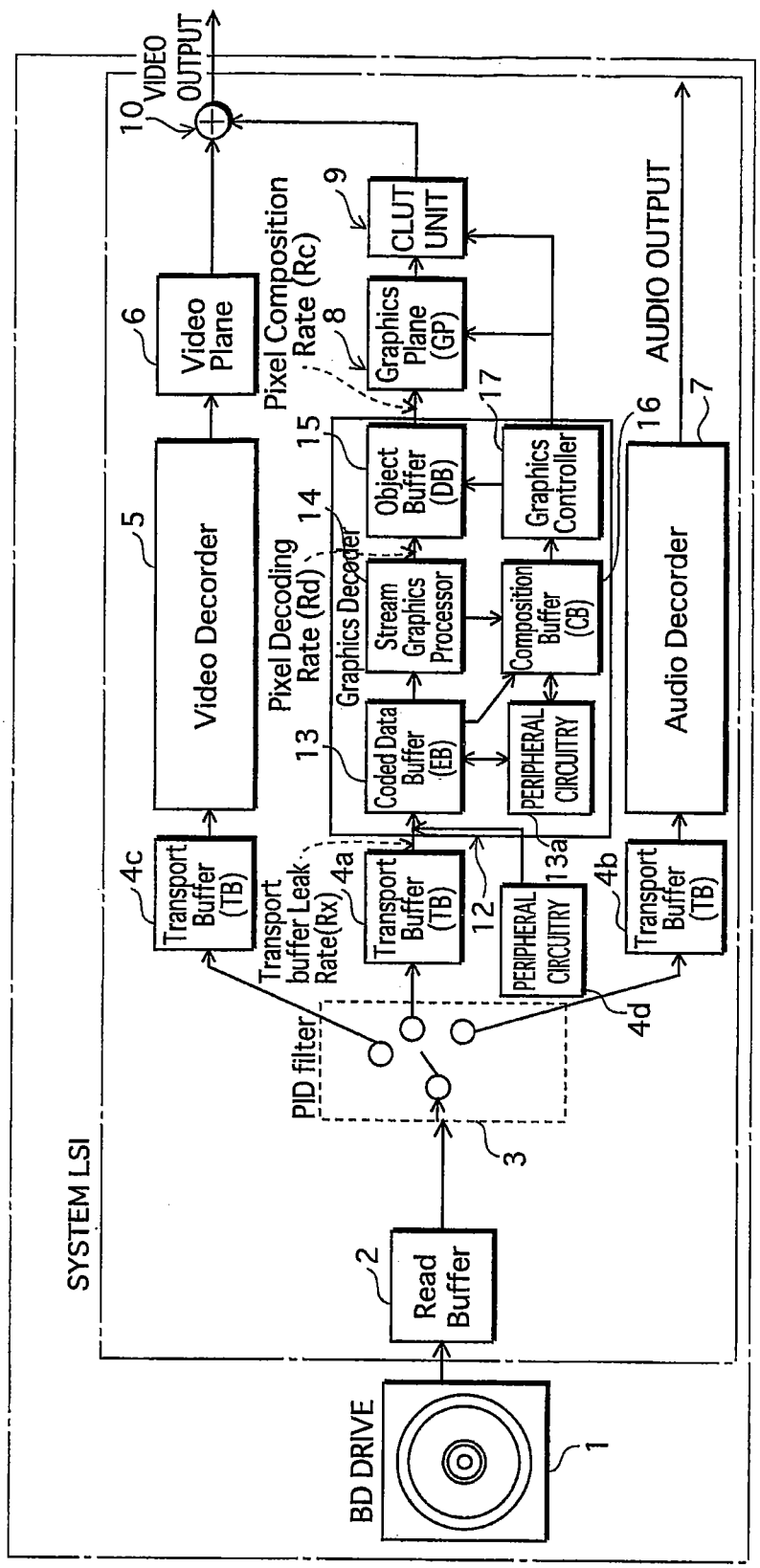
FIG. 26 illustrates an internal structure of a reproduction apparatus according to the present invention.

Next, a practical example of a reproduction apparatus according to the present invention is explained below. FIG. 26 illustrates an internal structure of the reproduction apparatus according to the present invention. The reproduction apparatus according to the present invention is industrially produced based on the internal structure shown in the drawing. The reproduction apparatus according to the present invention is mainly structured by three parts: a system LSI, a drive device, and a microcomputer system, and it is possible to industrially produce the reproduction apparatus by mounting the three parts to a cabinet and a substrate of the apparatus. The system LSI is an integrated circuit in which various processing units for carrying out a function of the reproduction apparatus are integrated. The reproduction apparatus manufactured in the above manner comprises a BD drive 1, a Read Buffer 2, a PID filter 3, Transport Buffers 4a-4c, a peripheral circuit 4d, a Video Decoder 5, a Video Plane 6, an Audio Decoder 7, a Graphics Plane 8, a CLUT unit 9, an adder 10, a Graphics Decoder 12, a Coded Data Buffer 13, a peripheral circuit 13a, a Stream Graphics Processor 14, an Object Buffer 15, a Composition Buffer 16, and a Graphical Controller 17.

The BD drive 1 performs load/read/eject of the BD-ROM, and accesses to the BD-ROM.

The Read Buffer 2 is a FIFO memory for storing the TS packets read from the BD-ROM in a first-in first-out order.

The PID filter 3 filters more than one TS packet outputted from the Read Buffer 2. The filtering by the PID filter 3 is to write the only TS packets having a desired PID to the Transport Buffers 4a-4c. Buffering is not necessary for the filtering by the PID filter 3, and accordingly, the TS packets inputted to the PID filter 3 are written to the Transport Buffers 4a-4c without delay.

The Transport Buffers 4a-4c are for storing the TS packets outputted from the PID filter 3 in a first-in first-out order. A speed at which the TS packets from the Transport Buffers 4a-4c are outputted is a speed Rx.

The peripheral circuit 4d is a wired logic for converting the TS packets read from the Transport Buffers 4a-4c into functional segments. The functional segments obtained by the conversion are stored in the Coded Data Buffer 13.

The Video Decoder 5 decodes the more than one TS packets outputted from the PID filter 3 into a decompressed picture and writes to the Video Plane 6.

The Video Plane 6 is a plane memory for a moving picture.

The Audio Decoder 7 decodes the TS packets outputted from the PID filter 3 and outputs decompressed audio data.

The Graphics Plane 8 is a plane memory having an area for one screen, and is able to store decompressed graphics for one screen.

The CLUT unit 9 converts an index color of the decompressed Graphics stored in the Graphics Plane 8 based on the values for Y, Cr, and Cb indicated by the PDS.

The adder 10 multiplies the decompressed Graphics to which the color conversion has been performed by the CLUT unit 9 by the T value (Transparency) indicated by the PDS, adds the decomposed picture data stored in the Video Plane per pixel, then obtains and outputs the composed image.

The Graphics Decoder 12 decodes the Graphics Stream to obtain the decompressed graphics, and writes the decomposed graphics as the Graphics Object to the Graphics Plane 8. By decoding the Graphics Stream, the subtitles and menus appear on the screen. The Graphics Decoder 12 includes the Coded Data Buffer 13, the peripheral circuit 13a, the Stream Graphics Processor 14, the Object Buffer 15, the Composition Buffer 16, and the Graphical Controller 17.

The Coded Data Buffer 13 is a buffer in which the functional segment is stored along with the DTS and PTS. The functional segment is obtained by removing a TS packet header and a PES packet header from each TS packet in the Transport Stream stored in the Transport Buffer 4a-4c and by arranging the payloads sequentially. The PTS and DTS out of the removed TS packet header and PES packet header are stored after making correspondence between the PES packets.

The peripheral circuit 13a is a wired logic that realizes a transfer between the Coded Data Buffer 13 and the Stream Graphics Processor 14, and a transfer between the Coded Data Buffer 13 and the Composition Buffer 16. In the transfer operation, when a current time is a time indicated by the DTS of the ODS, the ODS is transferred from the Coded Data Buffer 13 to the Stream Graphics Processor 14. When the current time is a time indicated by the DTS of the PCS and PDS, the PCS and PDS are transferred to the Composition Buffer 16.

The Stream Graphics Processor 14 decodes the ODS, and writes the decompressed graphics of the index color obtained by decoding as the Graphics Object to the Object Buffer 15. The decoding by the Stream Graphics Processor 14 starts at the time of the DTS corresponding to the ODS, and ends by the decode end time indicated by the PTS corresponding to the ODS. The decoding rate Rd of the Graphics Object is an output rate of the Stream Graphics Processor 14.

The Object Buffer 15 is a buffer corresponding to a pixel buffer in the ETSI EN 300 743 standard, and the Graphics Object obtained by the decode that the Stream Graphics Processor 14 performs is disposed. The Object Buffer 15 needs to be set to twice or four times as large as the Graphics Plane 8, because in case the Scrolling effect is performed, the Object Buffer 15 needs to store the Graphics Object that is twice or four times as large as the Graphics Plane.

The Composition Buffer 16 is a memory in which the PCS and PDS are disposed.

The Graphical Controller 17 decodes the PCS disposed in the Composition Buffer 16, and performs a control based on the PCS. A timing for performing the control is based on the PTS attached to the PCS.

Figure 27:
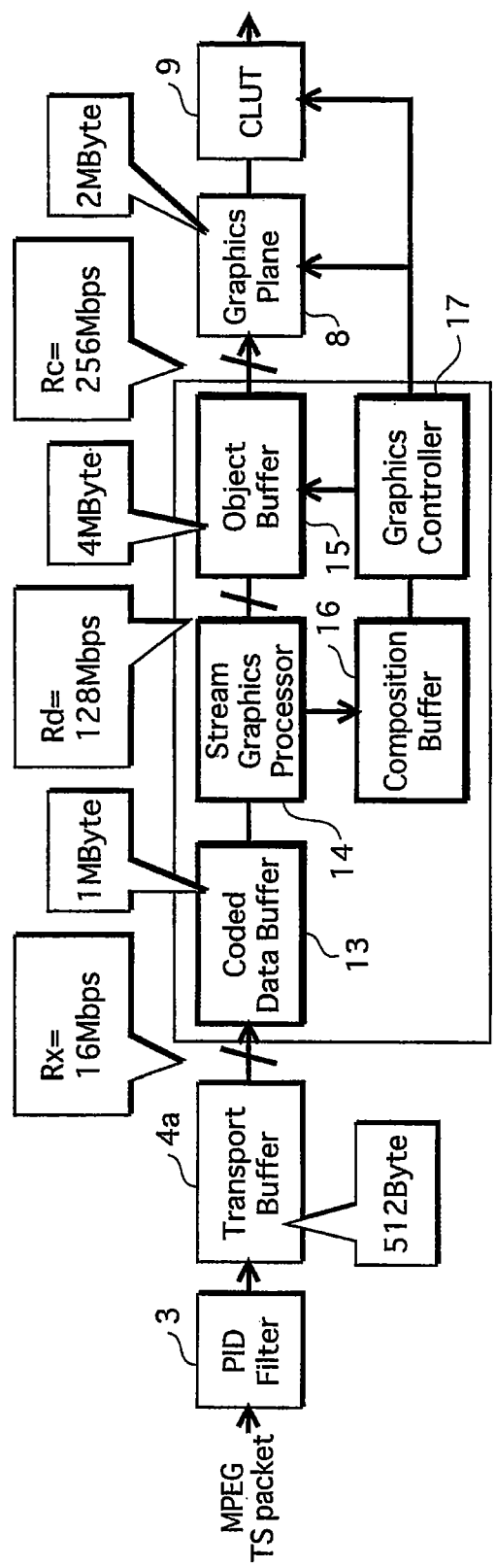
FIG. 27 illustrates sizes of write rates Rx, Rc, and Rd, Graphics Plane 8, Coded Data Buffer 13, Object Buffer 15, and Composition Buffer 16.

Next, recommended values for the transfer rate and buffer size for structuring the PID filter 3, Transport Buffer 4a-4c, Graphics Plane 8, CULT unit 9, Coded Data Buffer 13, and Graphical Controller 17 are explained. FIG. 27 illustrates sizes of the write rates Rx, Rc, and Rd, Graphics Plane 8, Coded Data Buffer 13, Object Buffer 15, and Composition Buffer 16.

The transfer rate Rc between the Object Buffer 15 and the Graphics Plane 8 is the highest transfer rate in the reproduction apparatus of the present embodiment, and calculated as 256 Mbps (=500 Kbytes×29.97×2) from the window size and the frame rate.

Unlike the Rc, the transfer rate Rd (Pixel Decoding Rate) between the Stream Graphics Processor 14 and Object Buffer 15 does not need to be updated every video frame cycle, and 1/2 or 1/4 of the Rc is sufficient for the Rd. Accordingly, the Rd is either 128 Mbps or 64 Mbps.

The Transport Buffer Leak Rate Rx between the Transport Buffer 4*a*-4*c* and Coded Data Buffer 13 is a transfer rate of the ODS in a compressed state. Accordingly, the transfer rate Rd multiplied by the compression rate is sufficient for the Transport Buffer leak rate Rx. Given the compression rate of the ODS is 25%, 16 Mbps (=64 Mbps×25%) is sufficient.

The transfer rates and buffer sizes shown in the drawing are the minimum standard, and it is also possible to set at higher rates and larger sizes.

In the above structured reproduction apparatus, each elements perform a decoding operation in a pipeline structure.

Figure 28:
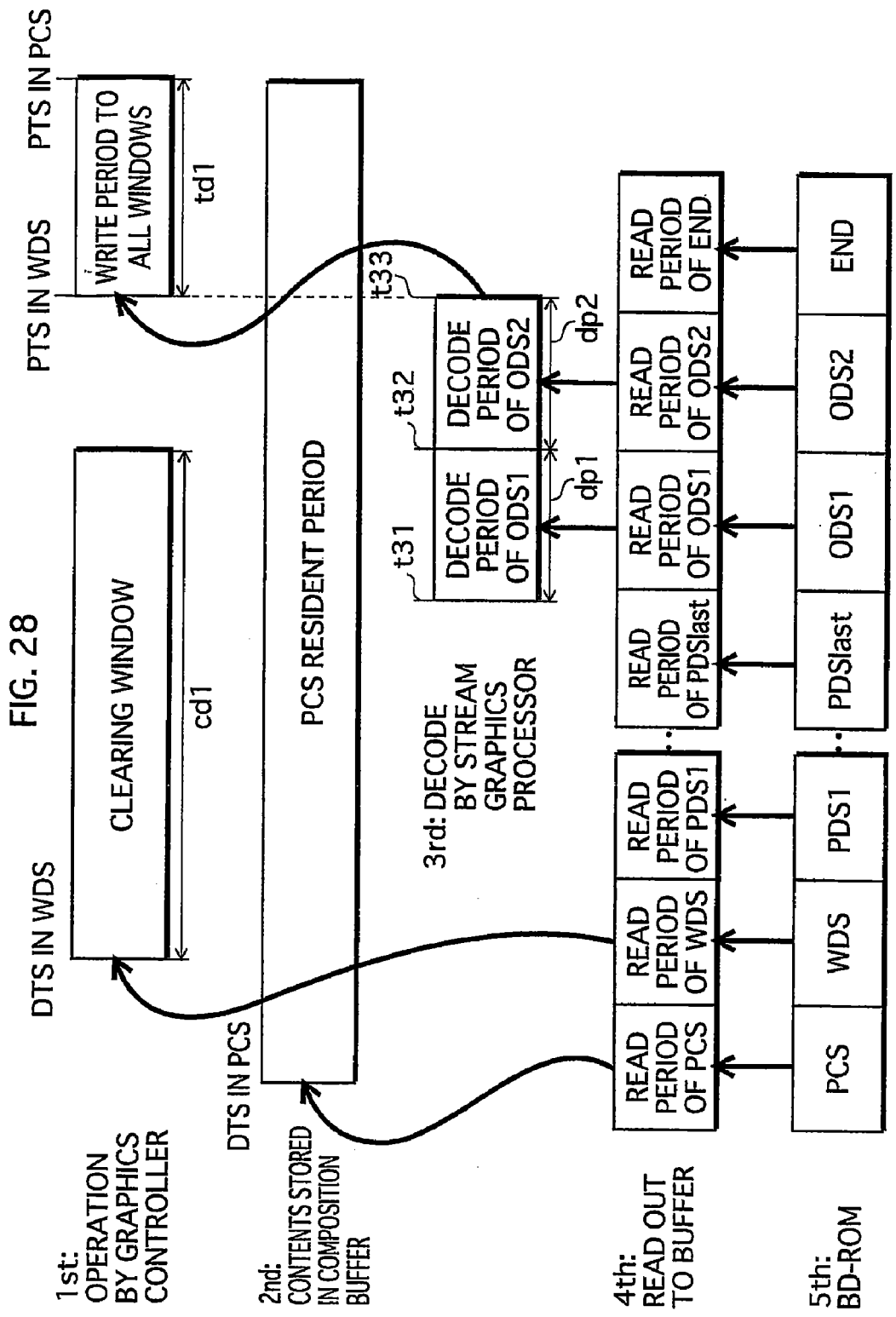
FIG. 28 is a timing chart illustrating a pipeline processing by the reproduction apparatus.

FIG. 28 is a timing chart illustrating a pipeline processing by the reproduction apparatus. A 5th row in the drawing is a Display Set in the BD-ROM, a 4th row shows read periods from the PCS, WDS, PDS, and ODS to the Coded Data Buffer 13. A 3rd row shows decode periods of each ODS by the Stream Graphics Processor 14. A 1st row shows operations that the Graphical Controller 17 performs.

The DTS (decode starting time) attached to the ODS1 and ODS2 indicate t31 and t32 in the drawing, respectively. Because the decode starting time is set by DTS, each ODS is required to be read out to the Coded Data Buffer 13. Accordingly, the reading of the ODS1 is completed before a decode period dp1 in which the ODS1 is decoded to the Coded Data Buffer 13. Also, the reading of the ODS2 is completed before a decode period dp2 in which the ODS2 is decoded to the Coded Data Buffer 13.

On the other hand, the PTS (decode ending time) attached to the ODS1 and ODS2 indicate 132 and 133 in the drawing, respectively. Decoding of the ODS1 by the Stream Graphics Processor 14 is completed by the t32, and decoding of the ODS2 is completed by a time indicated by the t33. As explained above, the Stream Graphics Processor 14 reads the ODS to the Coded Data Buffer 13 by the time the DTS of the ODS indicates, and decodes the ODS read to the Coded Data Buffer 13 by the time the PTS of the ODS indicates, and write the decoded ODS to the Object Buffer 15.

A period cd1 at the 1st row in the drawing indicates a period necessary for the Graphics Controller 17 to clear the Graphics Plane. Also, a period td1 indicates a period necessary to write the Graphics Object obtained on the Object Buffer to the Graphics Plane 8. The PTS of the WDS indicates the deadline to start writing, and the PTS of the PCS indicates ending of the write and a timing for display. At the time indicated by the PTS of the PCS, the decompressed graphics to compose an interactive screen is obtained on the Graphics Plane 8.

After the CLUT unit 9 performs the color conversion of the decompressed graphics and the adder 10 performs composition of the decomposed graphics and a decomposed picture stored in the Video Plane 6, a composite image is obtained.

In the Graphics Decoder 12, the Stream Graphics Processor 14 performs decoding continuously while the Graphics Controller 17 performs clearing of the Graphics Plane 8. By the above pipeline processing, it is possible to perform a prompt display of the graphics.

Figure 29:
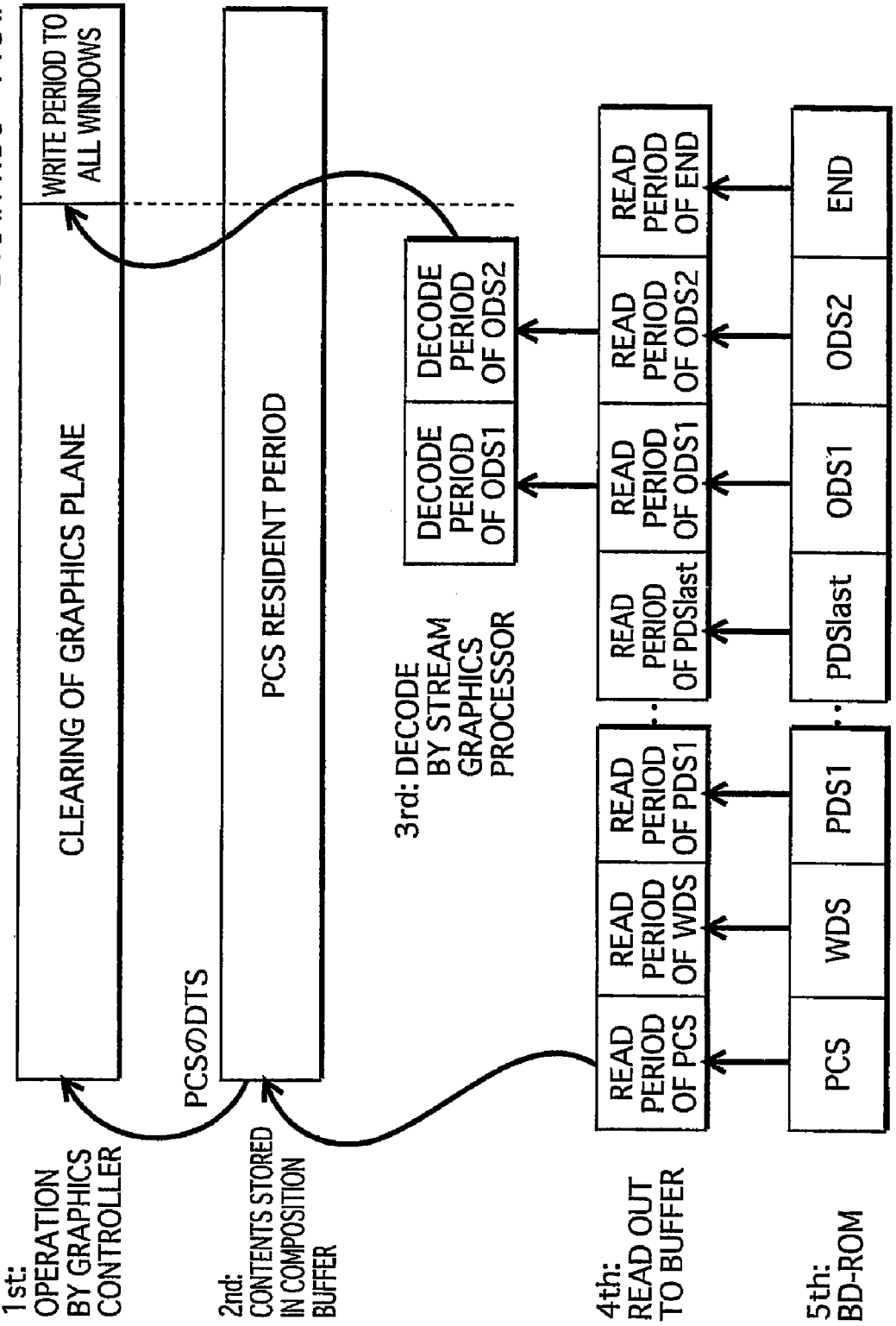
FIG. 29 illustrates a timing chart in a pipeline processing of a case in which decoding of the CDS ends before clearing of the Graphics Plane is completed.

In FIG. 28, a case in which the clearing of the Graphics Plane ends before completing the decoding of the ODS is explained. FIG. 29 illustrates a timing chart in a pipeline processing of a case in which the decoding of the ODS ends before the clearing of the Graphics Plane is completed. In this case, it is not possible to write to the Graphics Plane at a time of completion of the decoding of the ODS. When the clearing of the Graphics Plane is completed, it becomes possible to write the graphics obtained by the decode to the Graphics Plane.

Next, how the controlling unit 20 and the Graphics Decoder 12 are implemented is explained below. The controlling unit 20 is implemented by writing a program performing an operation shown in FIG. 30, and having a general CPU execute the program. The operation performed by the controlling unit 20 is explained by referring to FIG. 30.

Figure 30:
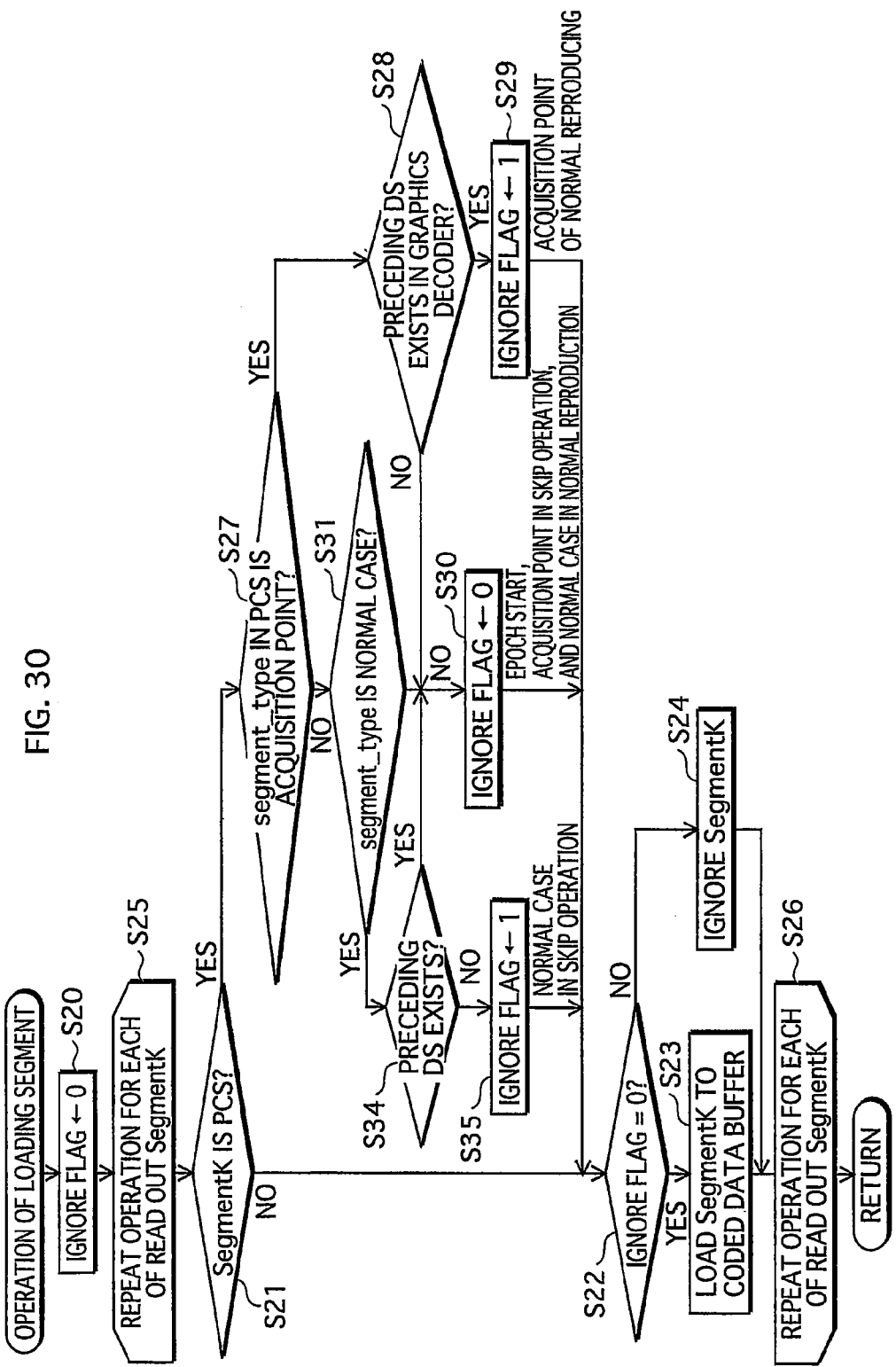
FIG. 30 is a flowchart illustrating a process of a loading operation of a functional segment.

FIG. 30 is a flowchart showing a process of a loading operation of the functional segment. In the flowchart, SegmentK is a variable indicating each of Segments (PCS, WDS, PDS, and ODS) that is read out in reproducing the AVClip. An ignore flag is a flag to determine if the SegmentK is ignored or loaded. The flowchart has a loop structure, in which first the ignore flag is initialized to 0 and then Steps S21-S24 and Steps S27-S31 are repeated for each SegmentK (Step S25 and Step 326).

Step S21 is for judging if the SegmentK is the PCS, and if the SegmentK is the PCS, judgments in Step S27 and Step S28 are performed.

Step S22 is for judging if the ignore flag is 0. If the ignore flag is 0, the operation moves to Step S23, and if the ignore flag is 1, the operation moves to Step S24. If the ignore flag is 0 (Yes in Step S22), the SegmentK is loaded to the Coded Data Buffer 13 in Step S23.

If the ignore flag is 1 (No in Step S22), the SegmentK is ignored in Step S24. By this, the rest of all functional segments that belong to the DS are ignored because Step S22 is No (Step S24).

As explained above, whether the SegmentK is ignored or loaded is determined by the ignore flag. Steps S27-S31, S34, and S35 are steps for setting the ignore flag.

In Step S27, it is judged if segmet_type of the SegmentK is the Acquisition Point. If the SegmentK is the Acquisition Point, the operation moves to Step S28, and if the SegmentK is either the Epoch Start or Normal Case, then the operation moves to Step S31.

In Step S28, it is judged if a preceding DS exists in any of the buffers in the Graphics Decoder 12 (the coded data buffer 13, stream graphics processor 14, object buffer 15, and composition buffer 16). The judgment in Step S28 is made when the judgment in Step S27 is Yes. A case in which a preceding DS does not exist in the Graphics Decoder 12 indicates a case in which the skip operation is performed. In this case, the display starts from the DS that is the Acquisition Point, and therefore the operation moves to Step S30 (No in Step S28). In Step S30, the ignore flag is set to 0 and the operation moves to Step S22.

A case in which a preceding DS exists in the Graphics Decoder 12 indicates a case in which normal reproduction is performed. In this case, the operation moves to Step S29 (Yes in Step S28). In Step S29, the ignore flag is set to 1 and the operation moves to Step S22.

In Step S31, it is judged if segment_type of the PCS is the Normal Case. If the PCS is the Normal Case, the operation moves to Step S34, and if the PCS is the Epoch Start, then the ignore flag is set to 0 in Step S30.

In Step S34, like in Step S28, it is judged if a preceding DS exists in any of the buffers in the Graphics Decoder 12. If the preceding DS exists, the ignore flag is set to 0 (Step S30). If the preceding DS does not exist, it is not possible to obtain sufficient functional segments to compose an interactive screen and the ignore flag is set to 1 (Step S35).

By setting the ignore flag in the above manner, the functional segments that constitute the Normal Case are ignored when the preceding DS does not exit in the Graphics Decoder 12.

Figure 31:
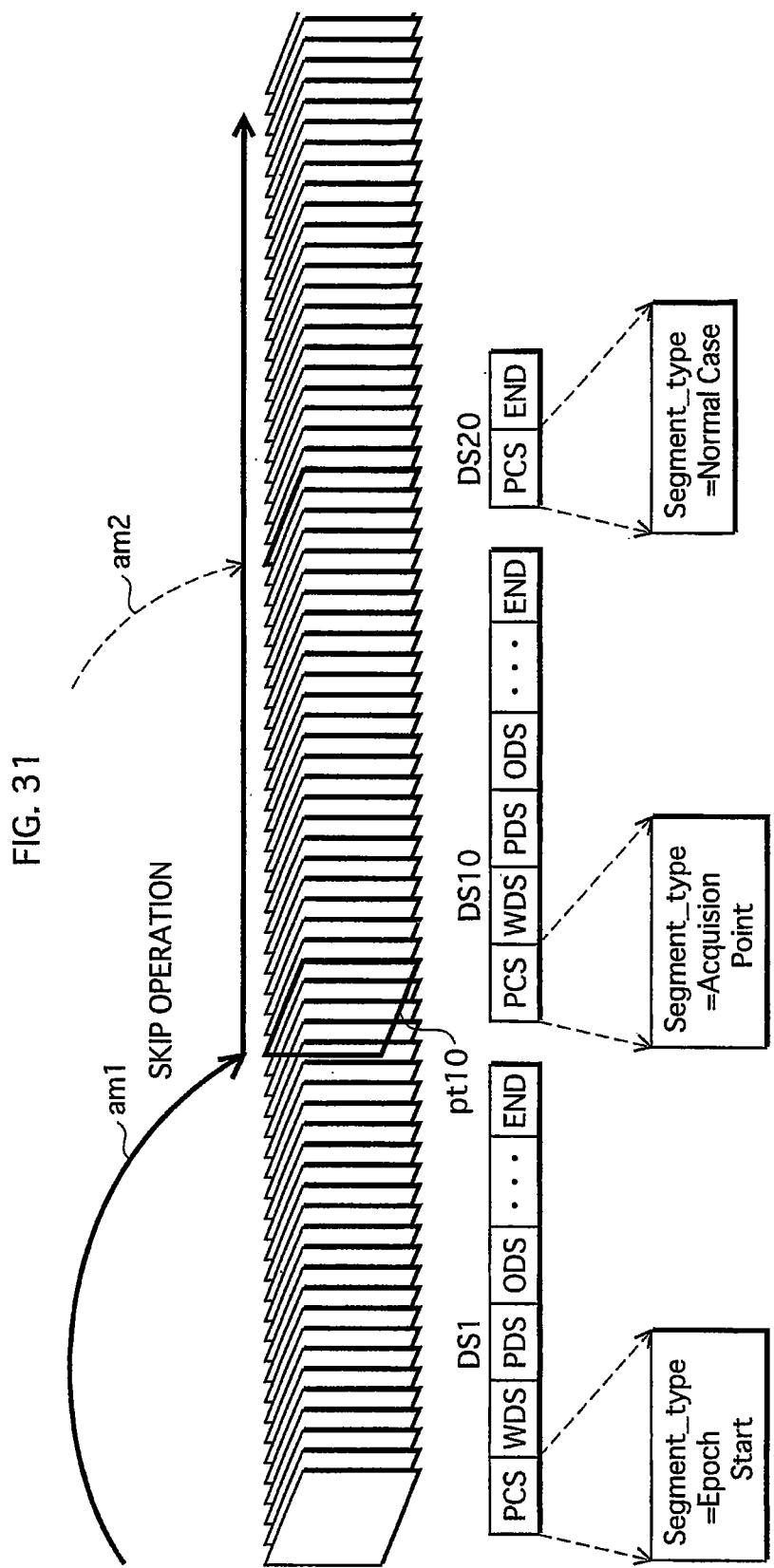
FIG. 31 shows an example of multiplexing.

Taking an example of a case in which the DS is multiplexed as shown in FIG. 31, a manner how the reading of the DS is performed is explained. In the example of FIG. 31, three DS are multiplexed with a moving picture. The segment_type of a DS1 is Epoch Start, the segment_type of a DS10 is Acquisition Point, and the segment_type of a DS20 is Normal Case.

Figure 32:
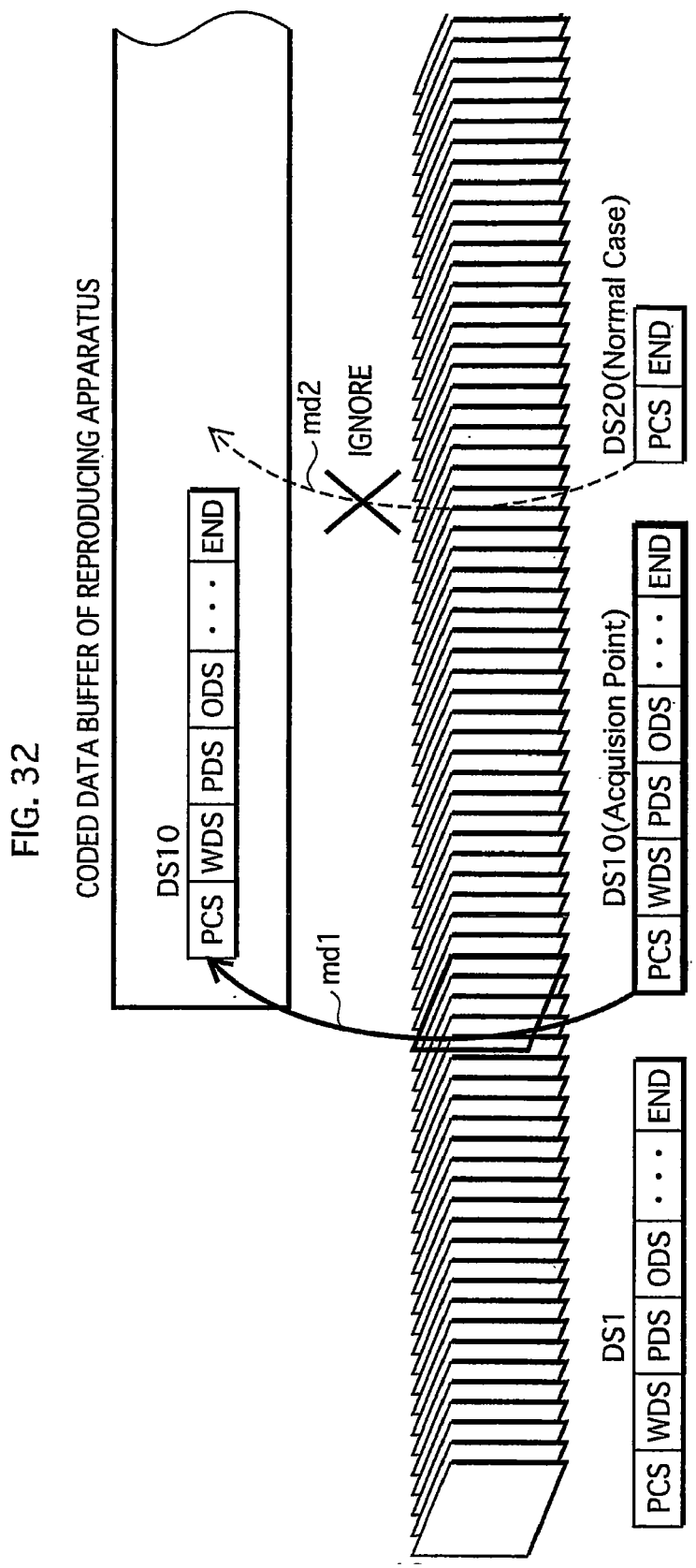
FIG. 32 illustrates a manner in which a DS10 is loaded to the Coded Data Buffer 13.

Given that, in an AVClip in which the three DS and the moving picture are multiplexed, a skip operation to a picture data pt10 as shown by an arrow am1 is performed, the DS10 is the closest to a skipping target, and therefore the DS10 is the DS described in the flowchart in FIG. 30. Although the segment_type is judged to be the Acquisition Point in Step S27, the ignore flag is set to 0 because no preceding DS exists in the Coded Data Buffer 13, and the DS10 is loaded to the Coded Data Buffer 13 of the reproduction apparatus as shown by an arrow md1 in FIG. 32. On the other hand, in a case in which the skipping target is after the DS10 (an arrow am2 in FIG. 31), the DS20 is to be ignored because the DS20 is Normal Case Display Set and DS20 because a preceding DS does not exist in the Coded Data Buffer 13 (an arrow md2 in FIG. 32).

Figure 33:
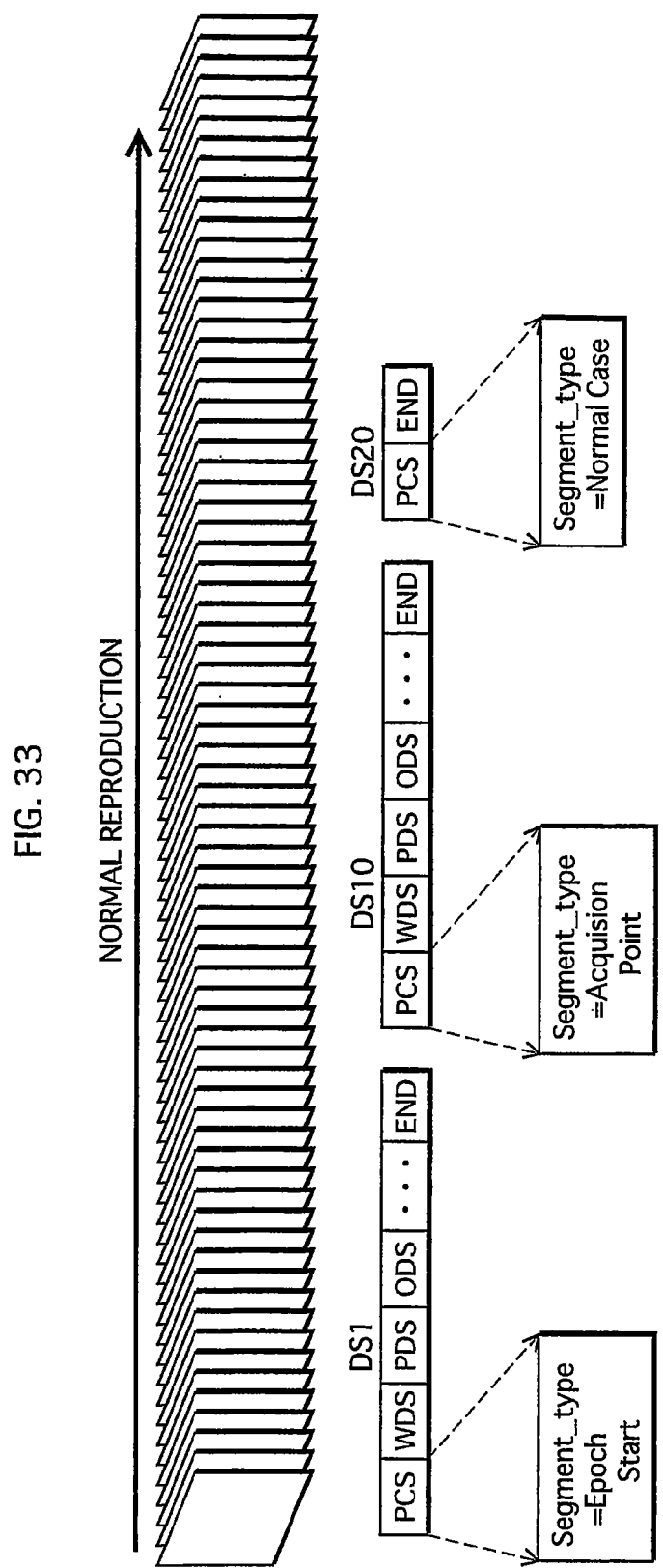
FIG. 33 illustrates loading of a DS1, the DS10, and a DS20 in a normal reproduction.
Figure 34:
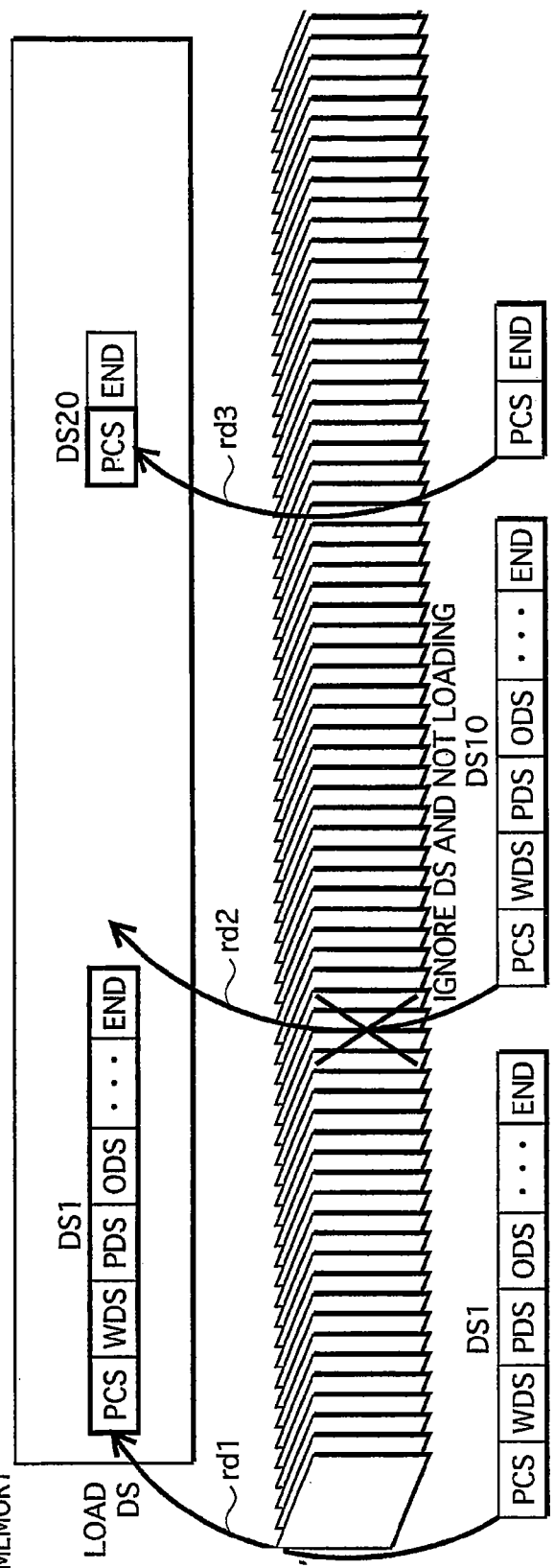
FIG. 34 illustrates loading of the DS1, DS10, and DS20 in the normal reproduction as shown in FIG. 33.

FIG. 33 illustrates loading of the DS1, DS10, and DS20 in a normal reproduction. The DS1 whose segment_type of the PCS is the Epoch Start is loaded to the Coded Data Buffer 13 as it is (Step S23). However, because the ignore flag of the DS10 whose segment_type of the PCS is the Acquisition Point is set to 1 (Step S29), the functional segments that constitute the DS10 are ignored and not loaded to the Coded Data Buffer 13 (an arrow rd2 in FIG. 34, and Step S24). Further, the DS20 is loaded to the Coded Data Buffer 13, because the segment_type of the PCS of the DS20 is the Normal Case (an arrow rd3 in FIG. 34).

Figure 35:
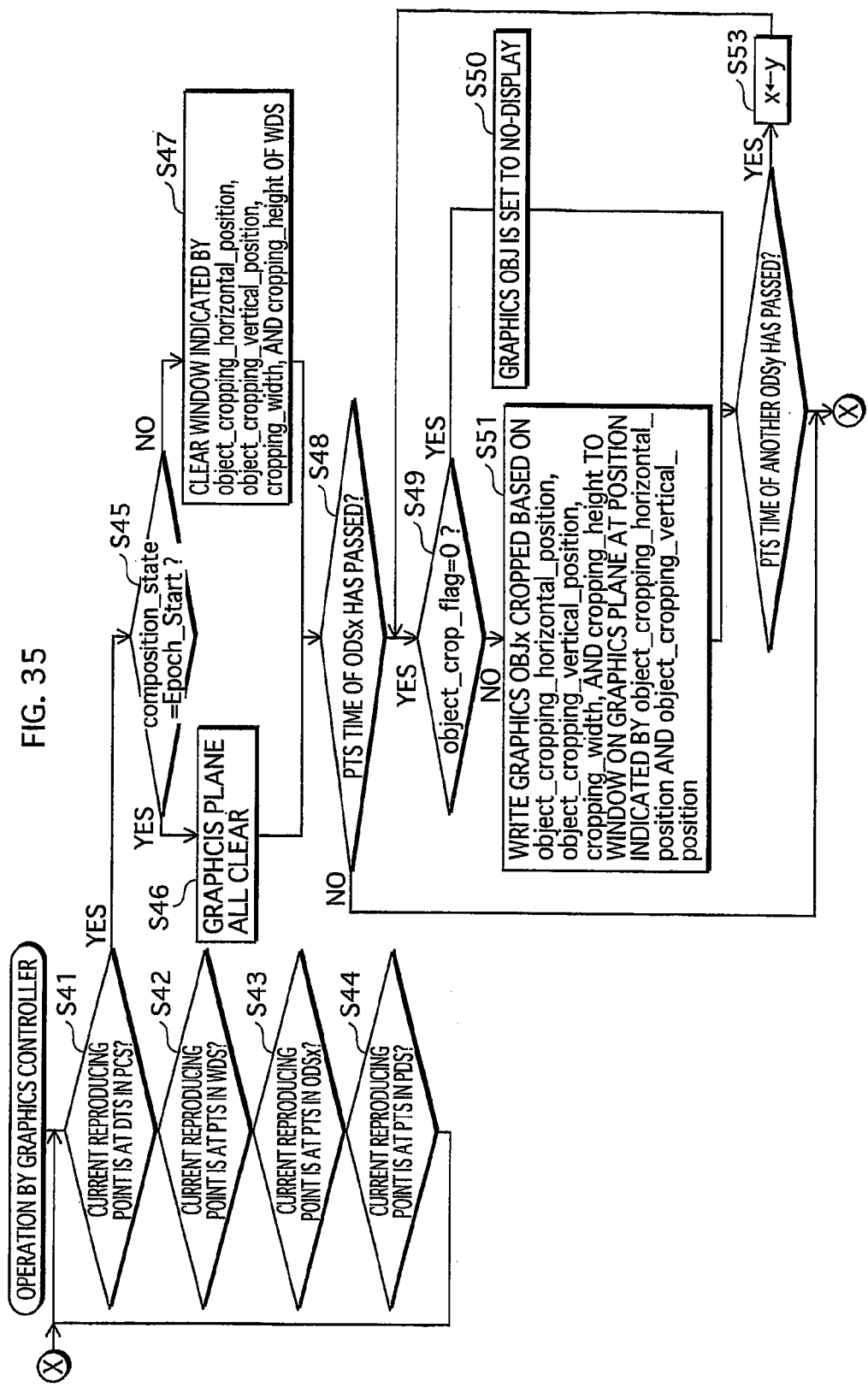
FIG. 35 illustrates a flowchart showing a process performed by the Graphical Controller 17.
Figure 36:
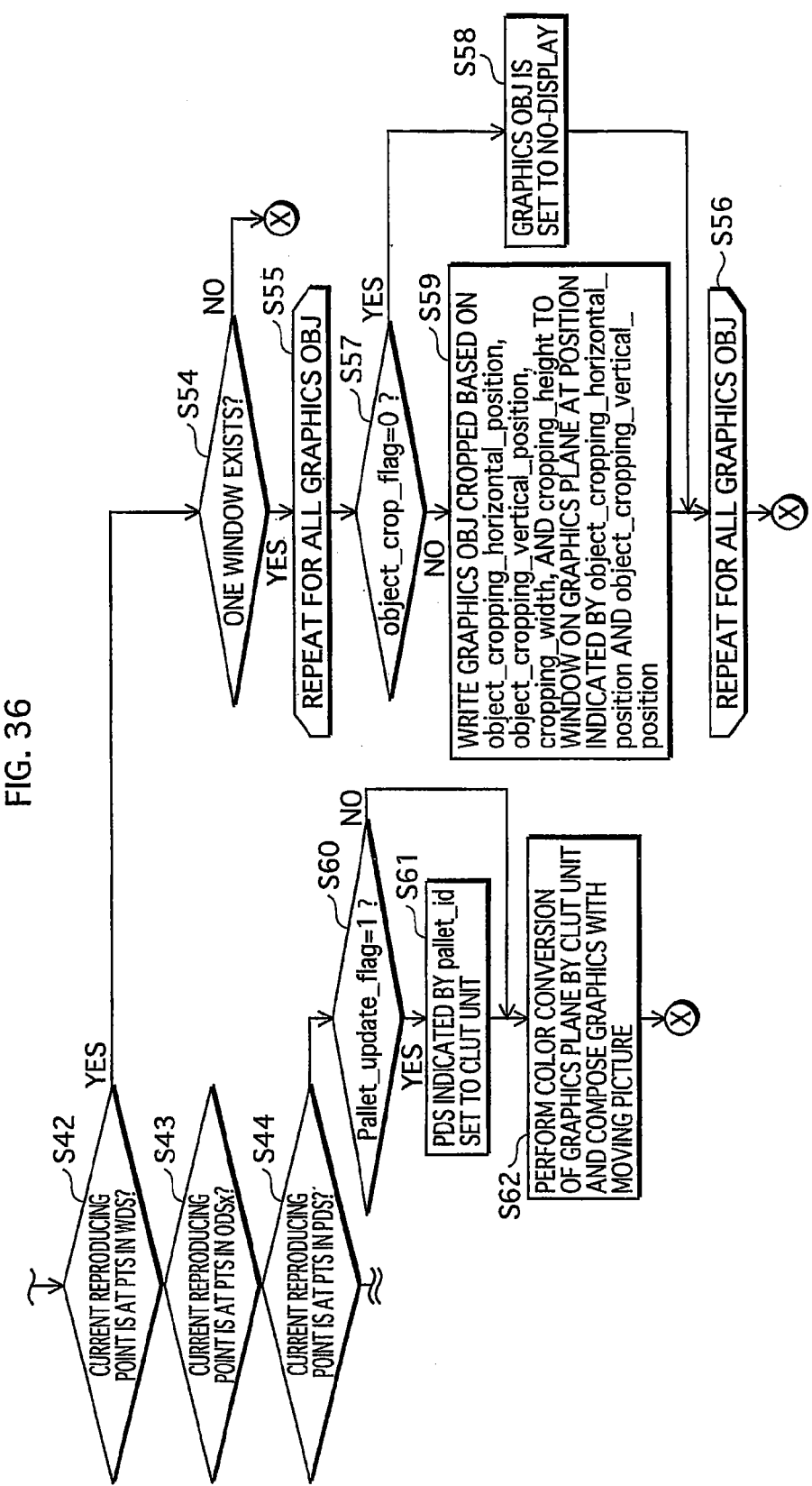
FIG. 36 illustrates a flowchart showing the process performed by the Graphical Controller 17.
Figure 37:
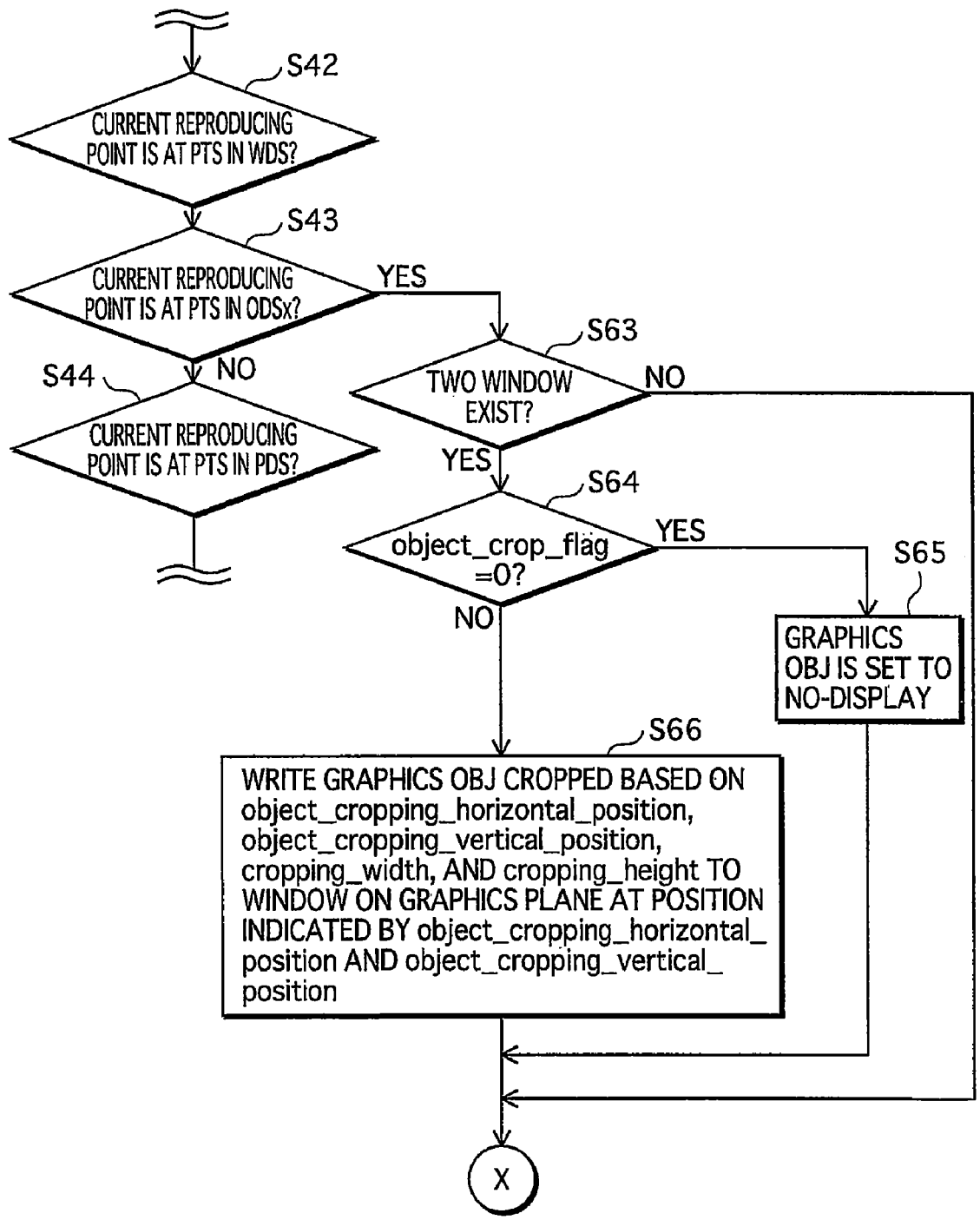
FIG. 37 illustrates a flowchart showing the process performed by the Graphical Controller 17.

Next, operations by the Graphical Controller 17 are explained. FIGS. 35-37 illustrate a flowchart showing the operations performed by the Graphical Controller 17.

Steps S41-S44 are steps for a main routine of the flowchart and waits for any of events prescribed in Steps S41-S44 occurs.

Step S41 is to judge if a current reproducing time is a time indicated by the DTS of the PCS, and if the judging is Yes, then an operation in Steps S45-S53 is performed.

Step S45 is to judge if the composition_state of the OCS is the epoch_start, and if judged to be the epoch_start, the Graphics Plane 8 is all cleared in Step S46. If judged to be other than the epoch_start, the Window indicated by the window_horizontal_position, window_vertical_position, window_width, and window_height of the WDS is cleared.

Step S48 is a step performed after the clearing performed in Step S46 or in Step S47, and to judge if the time indicated by the PTS of any ODSx has passed. The decoding of any ODSx could be already completed by the time the clearing ends, because the clearing of an entire Graphics Plane 8 takes time. Therefore, in Steps S48, it is judged if the decoding of any ODSx is already completed by the time the clearing ends. If the judging is No, the operation returns to the main routine. If the time indicated by the PTS of any ODSx has already passed, an operation in Steps S49-S51 is performed. In Step S49, it is judged if object_crop_flag is 0, and if the flag indicates 0, then the Graphics Object is set to "no display" (Step S50).

If the flag is not 0 in Step S49, then an object cropped based on object_cropping_horizontal_position, object_cropping_vertical_position, cropping_width, and cropping_height is written to the Window in the Graphics Plane 8 at the position indicated by object_cropping_horizontal_position and object_cropping_vertical_position (Step S51). By the above operation, one or more Graphics Objects are rendered in the Window.

In Step 52, it is judged if the time corresponding to a PTS of another ODSy has passed. When writing the ODSx to the Graphics Plane 8, if the decoding of the ODSy has already been completed, then the ODSy becomes ODSx (Step S53), and the operation moves to Step S49. By this, the operation from Steps S49-S51 is also performed to another ODS.

Next, by referring to FIG. 36, Step S42 and Steps S54-S59 are explained below.

In Step 42, it is judged if the current reproducing point is at the PTS of the WDS. If the judging is that the current reproducing point is at the PTS of the WDS, then it is judged if the number of the Window is one or not in Step S54. If the judging is two, the operation returns to the main routine. If the judging is one, a loop processing of Steps S55-S59 is performed. In the loop processing, operations in Steps S55-S59 are performed to each of the two Graphics Object displayed in the Window. In Step S57, it is judged if object_crop_flag indicates 0. If it indicates 0, then the Graphics is not displayed (Step S58).

If it doesn't indicate 0, then a cropped object based on object_cropping_horizontal_position, object_cropping_vertical_position, cropping_width, and cropping_height is written to the Window in the Graphics Plane 8 at the position indicated by object_cropping_horizontal_position and object_cropping_vertical_position (Step S59). By repeating the above operations, more than one Graphics Object is rendered in the Window.

In Step S44, it is judged if the current reproducing point is at the PTS of the PDS. If the judging is that the current reproducing point is at the PTS of the PDS, then it is judged if pallet_update_flag is one or not in Step S60. If the judging is one, the PDS indicated by pallet_id is set in the CLUT unit (Step S61). If the judging is 0, then Step S61 is skipped.

After that, the CLUT unit performs the color conversion of the Graphics Object on the Graphics Plane 8 to be combined with the moving picture (Step S62).

Next, by referring to FIG. 37, Step S43 and Steps S64-S66 are explained below.

In Step 43, it is judged if the current reproducing point is at the PTS of the ODS. If the judging is that the current reproducing point is at the PTS of the ODS, then it is judged if the number of the Window is two or not in Step S63. If the judging is one, the operation returns to the main routine. If the judging is two, operations in Steps S64-S66 are performed. In Step S64, it is judged if object_crop_flag indicates 0. If it indicates 0, then the Graphics is not displayed (Step S65).

If it doesn't indicate 0 then a cropped object based on object_cropping_horizontal_position, object_cropping_vertical_position, cropping_width, and cropping_height is written to the Window in the Graphics Plane 8 at the position indicated by object_cropping_horizontal_position and object_cropping_vertical_position (Step S66). By repeating the above operations, the Graphics Object is rendered in each Window.

The above explanations are about the DTS and PTS of the PCS, and the DTS and PTS of the ODS that belong to DSn. The DTS and PTS of the PDS, and the DTS and PTS of the END are not explained. First, the DTS and PTS of the PD that belongs to the DSn are explained.

As for the PDS that belongs to the DSn, it is sufficient if the PDS is available in the CLUT unit 9 by the PCS is loaded to the Composition Buffer 16 (DTS (DSn [PCS])) after decoding start point of a first ODS (DTS (DSn [ODS1])). Accordingly, a value of PTS of each PDS (PDS1-PDSlast) in the DSn is required to be set so as to satisfy the following relations.

$$DTS(DSn[PCS]) \leq PTS(DSn[PDS1])$$

$$PTS(DSn[PDSj]) \leq PTS(DSn[PDSj+1]) \leq PTS(DSn[PDSlast])$$

$$PTS(DSn[PDSlast]) \leq DTS(DSn[ODS1])$$

Note that the DTS of the PDS is not referred to during the reproducing, the DTS of the ODS is set to the same value as the PTS of the PDS in order to satisfy the MPEG2 standard.

Figure 38:
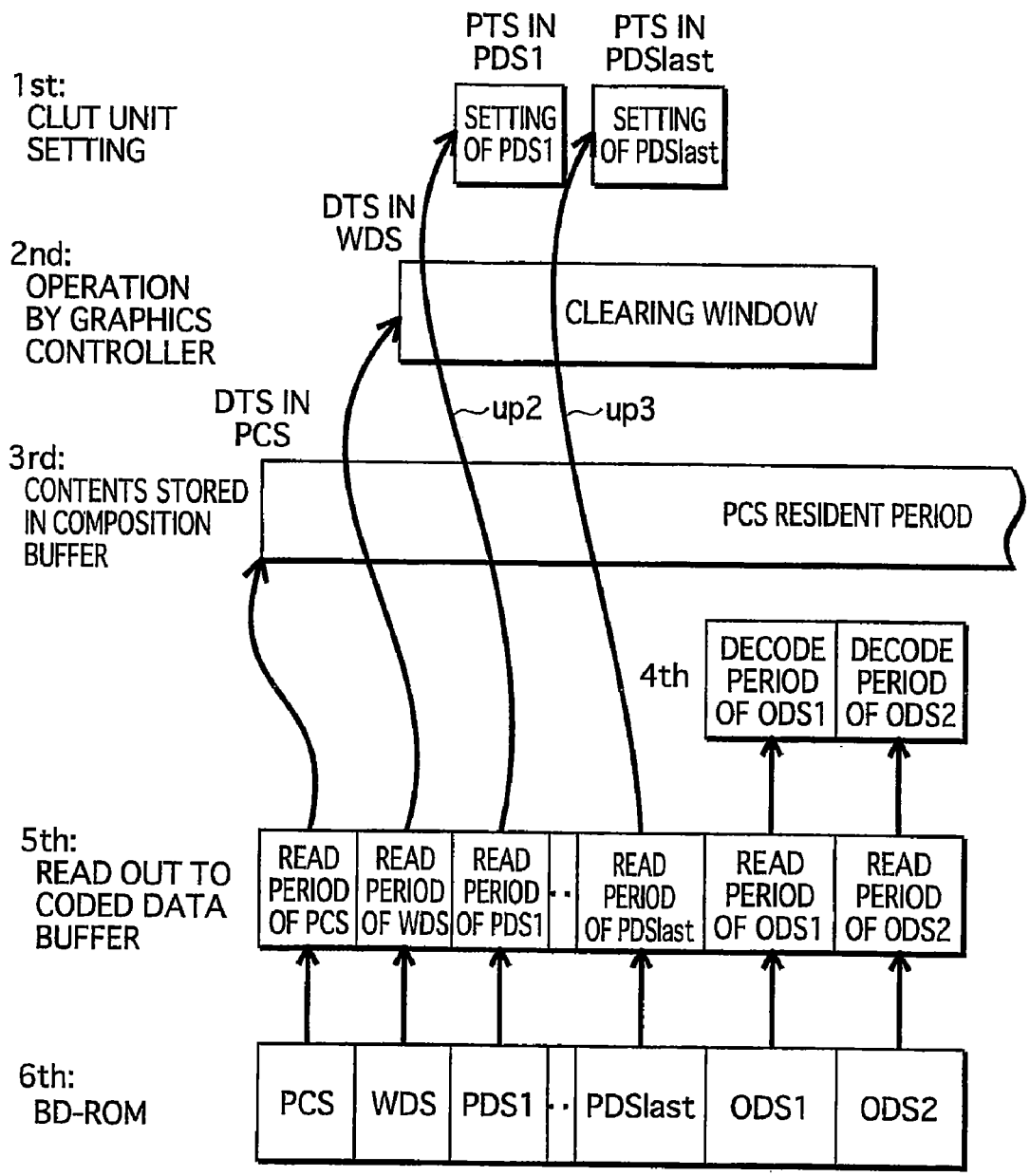
FIG. 38 illustrates a pipeline process of the reproduction apparatus based on the PTS of the PDS.

Following is an explanation about roles of the DTS and PTS in the pipeline processing of the reproduction apparatus when the DTS and PDS are set so as to satisfy the above relations. FIG. 38 illustrates the pipeline of the reproduction apparatus based on the PTS of the PDS. FIG. 38 is based on FIG. 26. A first row in FIG. 38 indicates setting the ODS in the CLUT unit 9. Under the first row are the same as first to fifth rows in FIG. 26. The setting of the PDS1-PDSlast to the CLUT unit 9 is performed after the transferring the PCS and WDS and before the decoding of the ODS1, and accordingly the setting of the PDS1-PDSlast to the CLUT unit 9 is set before a point indicated by the DTS of the ODS1 as shown by arrows up2 and up3.

As described above, the setting of the PDS is performed in prior to the decoding of the ODS.

Next, a setting of the PTS of END of Display Set segment in the DSn is explained. The END that belongs to the DSn indicates the end of the DSn, and accordingly it is necessary that the PTS of the END indicates the decode ending time of the ODS2. The decode ending time is indicated by the PTS (PTS(DSn[ODSlast])) of the ODS2 (ODSlast), and therefore the PTS of the END is required to be set at a value that satisfies an equation below.

$$DTS(DSn[END]) = PTS(DSn[ODSlast])$$

In terms of a relation between the DSn and the PCS that belongs to the DSn+1, the PCS in the DSn is loaded to the Composition Buffer 16 before a loading time of the first ODS (ODS1), and therefore the PTS of the END should be after a loading time of the PCS in the DSn and before a loading time of the PCS that belongs to the DSn+1. Accordingly, the PTS of the END is required to satisfy a relation below.

$$DTS(DSn[PCS]) \leq PTS(DSn[END]) \leq DTS(DSn+1[PCS])$$

On the other hand, the loading time of the first ODS (ODS1) is before a loading time of a last PDS (PDSlast), and therefore the PTS of the END (PTS (DSn [END])) should be after a loading time of the PDS that belongs to the DSn (PTS (DSn [PDSlast])). Accordingly, the PTS of the END is required to satisfy a relation below.

$$PTS(DSn[PDSlast]) \leq PTS(DSn[END])$$

Figure 39:
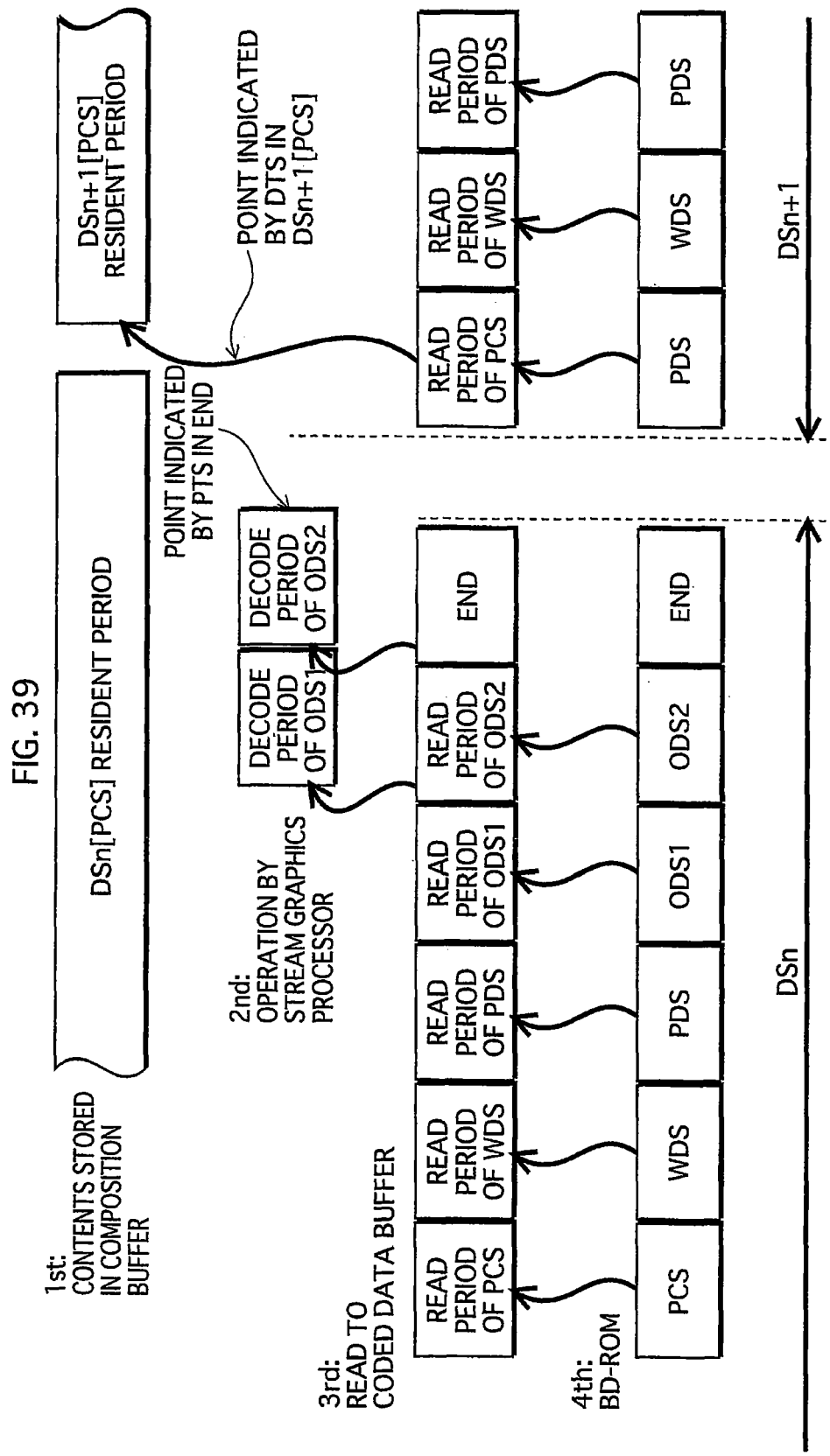
FIG. 39 is a diagram describes a significance of the END in the pipeline process of the reproduction apparatus.

Following is an explanation about significance of the PTS of the END in the pipeline processing of the reproduction apparatus. FIG. 39 is a diagram describes the significance of the END in the pipeline process of the reproduction apparatus. FIG. 39 is based on FIG. 26, and each row in FIG. 39 is substantially the same as FIG. 26 other than that a first row in FIG. 39 indicates the content of the Composition Buffer 16. Further, in FIG. 39, 2 Display Sets, DSn and DSn+1 are illustrated. The ODSlast in the DSn is the last ODSn of A-ODSs, and accordingly, the point indicated by the PTS of the END is before the DTS of the PCS in the DSn+1.

By the PTS of the END, it is possible to find when the loading of the ODS in the DSn is completed during reproduction.

Note that although the DTS of the END is not referred to during reproduction, the DTS of the END is set to the same value as the PTS of the END in order to satisfy the MPEG2 standard.

As described in the above, a part of the Graphics Plane is specified as the Window for displaying the Graphics according to the present embodiment, and therefore the reproduction apparatus does not have to render the Graphics for an entire Plane. The reproduction apparatus may render the Graphics for only a predetermined size of Window, such as 25% to 33% of the Graphics Plane. Because the rendering of the Graphics other than the Graphics in the Window is not necessary, the load for software in the reproduction apparatus decreases.

Even in a worst case in which the updating of the Graphics is performed such as 1/4 of the Graphics Plane, it is possible to display the Graphics synchronously with the picture by the reproduction apparatus performing the write to the Graphics Plane at a predetermined transfer rate such as 256 Mbps, and by setting the size of the Window so as to ensure the sync display with the picture.

Thus, it is possible to realize a high resolution subtitle display for various reproduction apparatuses, because the sync display is easily ensured.

[Second Embodiment]

Figure 40:
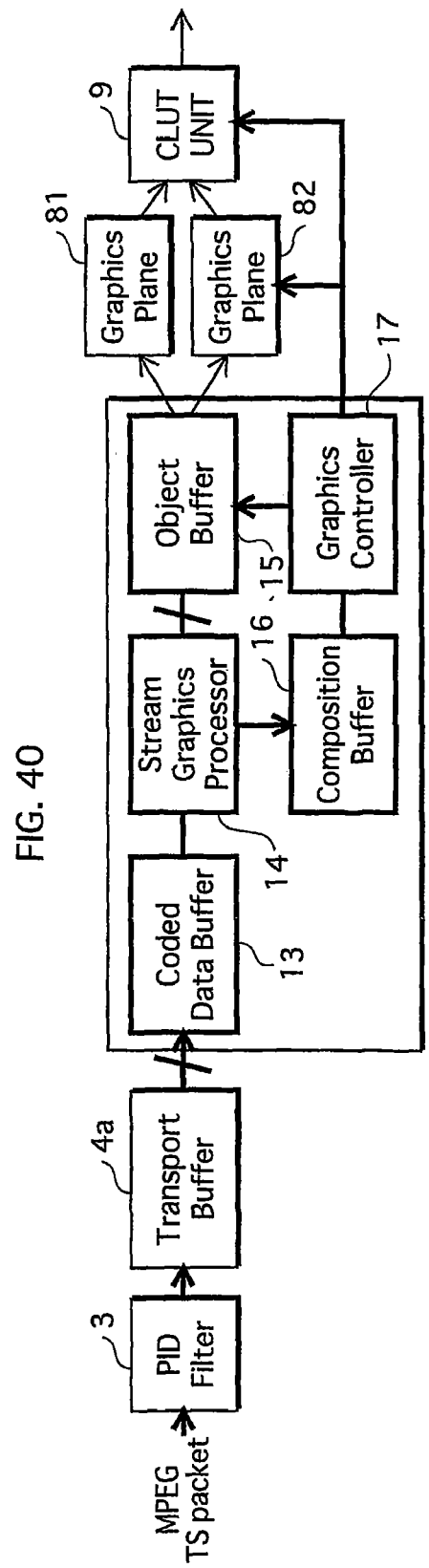
FIG. 40 illustrates an internal structure of the reproduction apparatus according to a second embodiment.

In the first embodiment, the size of the Window is set to 1/4 of an entire Graphics Plane and the writing rate Rc to the Graphics Plane is set to 256 Mbps, so as to update the Graphics for each video frame. Further, by setting the update rate to be 1/2 or 1/4 of the video frame rate, it becomes possible to update a larger size of the Graphics. However, when the update rate is 1/2 or 1/4 of the video frame rate, it takes 2 or 4 frames to write to the Graphics Plane. When one Graphics Plane is provided, a process of the writing of the Graphics during the 2 or 4 frames during which the Graphics is written becomes visible to a user. In such a case, a display effect such as switching from one Graphics to a larger Graphics in a moment may not be effectively realized. Therefore, in a second embodiment, two Graphics Planes are provided. FIG. 40 illustrates an internal structure of a reproduction apparatus according to the second embodiment. The reproduction apparatus in FIG. 40 is new in comparison with the reproduction apparatus according to FIGS. 24 and 25 in that the reproduction apparatus in FIG. 40 has two Graphics Planes (a Graphics Plane 81 and a Graphics Plane 82 in the drawing), and the two Graphics Planes constitute a double buffer. Accordingly, it is possible to write to one of the Graphics Planes while the reading is performed from the other of the Graphics Planes. Further, a Graphical Controller 17 according to the second embodiment switches the Graphics Plane that is read out at a point indicated by the PTS of the PCS.

Figure 41:
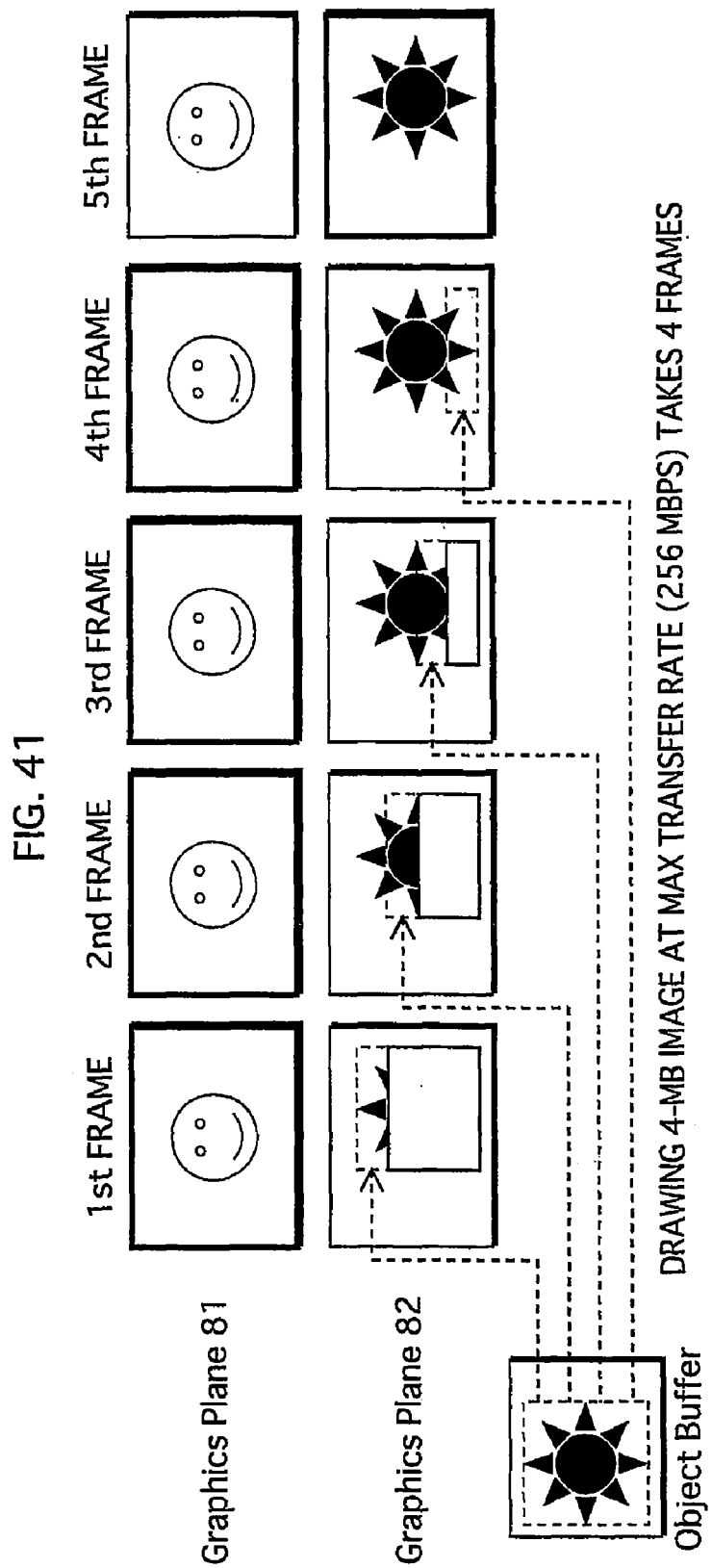
FIG. 41 schematically illustrates an operation of reading cut and writing to the Graphics Planes that constitute a double buffer.

FIG. 41 schematically illustrates an operation of reading out and writing to the Graphics Planes that constitute the double buffer. An upper row indicates contents of the Graphics Plane 81, and a bottom row indicates contents of the Graphics Plane 82. The contents of the both Graphics Planes per frame are illustrated from a first frame to a fifth frame (left to right). A part of the Graphics Planes 81 and 82 for each frame that are enclosed by a thick line is a target of the reading out. In the drawing, a face mark is contained in the Graphics Plane 81, and the face mark is to be replaced by a sun mark that is in an Object Buffer 15. A size of the sun mark is 4 Mbytes, which is a maximum size of the Object Buffer 15.

To write the sun mark to the Graphics Plane 82 at the writing rate to the Graphics Plane (Rc=256 Mbps), it takes 4 frames till the writing is completed, and only 1/4 of the sun mark is written to the Graphics Plane 82 during the first frame, 2/4 during the second frame, and 3/4 during the third frame. Because the Graphics Plane 81 is the target to be displayed in the screen, however, the process of writing the sun mark to the Graphics Plane is not visible to the user. At the fifth frame, when the target of display switches to the Graphics Plane 82, the contents of the Graphics Plane 82 become visible to the user. Thus, the switching from the face mark to the sun mark is completed.

As described above, according to the second embodiment, it is possible to switch display in the screen to another graphics at once ever, when a large size graphics is written to the Graphics Plane for four frames, and therefore useful when displaying such as credits, an outline of a movie, or a warning, at once in an entire screen.

[Third Embodiment]

Figure 42:
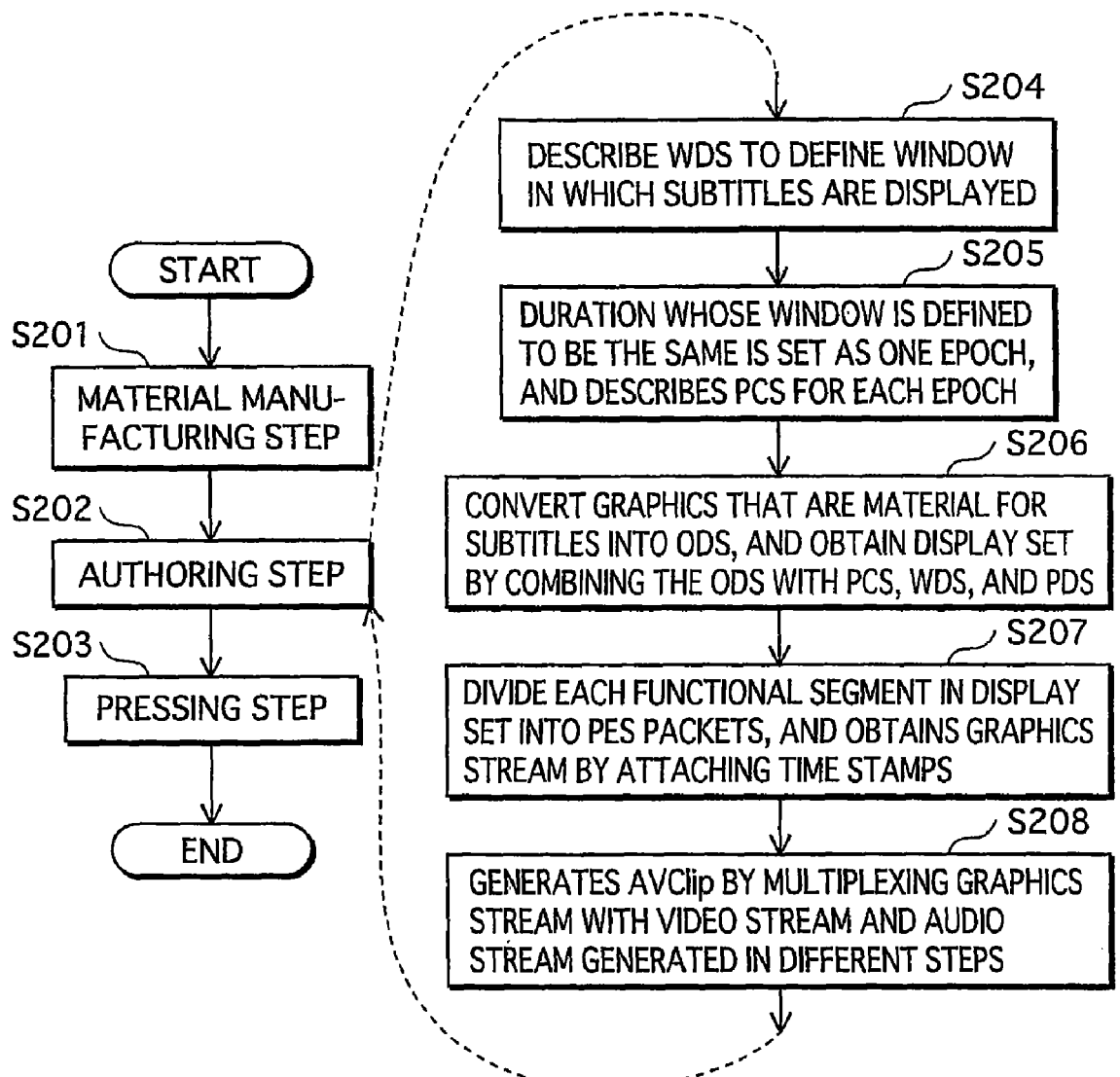
FIG. 42 is a flowchart illustrating the manufacturing process of the BD-ROM according to a third embodiment.

A third embodiment relates to a manufacturing process of the BD-ROM. FIG. 42 is a flowchart illustrating the manufacturing process of the BD-ROM according to the third embodiment.

The manufacturing of the BD-ROM includes a material manufacturing step S201 for producing material and recording movies and sound, an authoring step S202 for generating an application format using an authoring apparatus, and a pressing step S203 for manufacturing a master disc of the BD-ROM and pressing to finish the BD-ROM.

The authoring step of the BD-ROM includes Steps S204-S209 as follows.

In Step S204, the WDS is described so as to define the Window in which subtitles are displayed, and in Step S205, a period of time during which the window is defined to appear at the same position in the same size, is set as one Epoch, and the PCS for each Epoch is described.

After obtaining the OCS in the above manner, the Graphics as material for subtitles is converted into the ODS, and the Display Set is obtained by combining the ODS with the PCS, WDS, and PDS in Step S206. Then, in Step S207, each functional segment in the Display Set is divided into the PES packets, and the Graphics Stream is obtained by attaching the time stamp.

Finally, in Step S208, the AVClip is generated by multiplexing the graphics stream with the video stream and audio stream that are generated separately.

After obtaining the AVClip, the application format is completed by adjusting the AVClip into the BD-ROM format.

[Other Matters]

The above explanations do not illustrate all embodiments according to the present invention. The present invention may also be realized by modified examples shown below. Inventions described in the Claims of the present application include the above embodiments as well as expansions or generalizations of the modified examples. Although the degree of expansion and generalization is based on characteristics of technological levels of the related art at the time of the application, the inventions according to the Claims of the present application reflect the means to solve the technical problems in the conventional art, and therefore the scope of the invention does not exceed the technological scope that those skilled in the art would recognize as means to solve the technical problems in the conventional art. Thus, the inventions according to the Claims of the present application substantially correspond to the descriptions of the details of the invention.

(1) The BD-ROM is used in the explanations of all of the above embodiments. However, characteristics of the present invention are in the Graphics Stream that is recorded in a media, and such characteristics do not depend on physical properties of the BD-ROM. Any recording medium that is capable of storing the Graphics Stream may realize the present invention. Examples of such recording medium include optical discs such as a DVD-ROM, a DVD-RAM, a DVD-RW, a DVD-R, a DVD-+RW, a DVD+R, a CD-R, and a CD-RW, magnetic optical discs such as a PD and MO, semiconductor memory cards such as a compact flash card, a smart media, a memory stick, a multi-media card, and a PCM-CIA card, and magnetic discs such as a flexible disc, a SuperDisk, a Zip, and a Clik!, and removable hard disk drives such as an ORB, a Jaz, a SparQ, a SyJet, a EZFley, and a micro drive, in addition to built-in hard disks.

(2) The reproduction apparatus described in all of the above embodiments decodes the AVClip recorded in the BD-ROM and outputs the decoded AVClip to a TV. However, it is also possible to realize the present invention by the reproduction apparatus that includes only a BD-ROM drive, and the TV provided with other elements. In this case, the reproduction apparatus and the TV may be connected via IEEE1394 to create a home network. Moreover, although the reproduction apparatus in the embodiments is used by connecting to the TV, the reproduction apparatus may be an all in one TV and reproduction apparatus. Further, the LSI (integrated circuit) alone that forms an essential part of the processing in the reproduction apparatus of each embodiment may be put into practice. Such reproduction apparatus and the LSI are both described in the present, specification, and therefore manufacturing a reproduction apparatus based on the internal structure of the reproduction apparatus according to the first embodiment is an implementation of the present invention, no matter what working example it may take. Moreover, transferring whether as a gift or profit, lending, and importing of the reproduction apparatus according to the present invention are also considered to be the implementation of the present invention. Offering such transfer and lend to common users by way of storefront display and distribution of brochure is also considered to be the implementation of the present invention.

(3) Information processing executed by a program shown in the flowcharts is realized using hardware resources, and accordingly, the program whose processing is shown in each flowchart is established alone as an invention. Although all the above embodiments describe the program according to the present invention as built-in in the reproduction apparatus, the program according to the first embodiment alone may be implemented. Examples of implementation of the program alone include (i) producing the programs, (ii) transferring the programs as a gift or profit, (iii) lending the programs, (iv) importing the programs, (v) providing general public with the programs via an interactive electronic communications line, and (vi) offering the transfer and lend to common users by way of storefront display and distribution of brochure.

(4) Time elements in the steps that are performed in a sequential order in each flowchart are essential characteristics of the present invention, and it is clear that the process shown in each flowcharts discloses a method of reproduction. Performing the processes illustrated by the flowcharts by carrying out the operation in each step sequentially to obtain the object of the present invention and realizes the effects is the implementation of the recording method according to the present invention.

(5) It is desirable to add an extension header to each packets constituting the AVClip when recording in the BD-ROM. The extension header is 4-bytes data called TP_extra_header that includes arrival_time_stamp and copy_permission _indicator. The TS packets having the TP_extra_header (hereinafter referred to as the TS packets with EX) are grouped by every 32 packets and written to 3 sectors. A group including 32 TS packets with EX has 6144 bytes (=32×192), which is the same size as a size of 3 sectors 6144 bytes (=2048×3). The group of 32 TS packets with EX stored in 3 sectors is called Aligned Unit.

When the reproduction apparatus is used in the home network connected via the IEEE1394, the reproduction apparatus transmits the Aligned Unit in a following transmission procedure. A sender obtains TP_extra_header from each of the 32 TS packets with EX included in the Aligned Unit, and outputs main body of the TS packets after decoding based on DTCP standard. When outputting the TS packets, isochronous packets are inserted between any two successive TS packets. Insertion points are positions based on time indicated by arrival_time_stamp in TP_extra_header. Along with the output of the TS packets, the reproduction apparatus outputs DTCP_descriptor. The DTCP_descriptor indicates settings for copy permission. By describing the DTCP_descriptor so as to indicate the copying is prohibited, the TS packets are not recorded by other devices when using in the home network connected via the IEEE1394.

(6) The digital stream in the above embodiments is the AVClip. However, the digital stream may be a Video Object (VOB) in DVD-Video standard or DVD-Video Recording standard. The VOB is a ISO/IEC13818-1-standard-based program stream obtained by multiplexing the video stream and audio stream. Further, the video stream in the AVClip may also be based on MPEG4 or WMV standard. Moreover, the audio stream may be based on Linear-PCM, Dolby-AC3, MP3, MPEG-AAC, or DTS standard.

(7) The movie in the above embodiments may be obtained by encoding analog image signals transmitted via analog broadcasting, or may be stream data constituted by transport stream transmitted via digital broadcasting.

It is also possible to obtain contents by encoding analog or digital image signals that are recorded in a videotape. Further, the contents may also be obtained by encoding analog or digital image signals that are directly loaded from a video camera. Moreover, contents may be a digital work delivered by a distributing server.

(8) The Graphics Object in the first and second embodiments is raster data that is encoded based on run-length limited encoding. The run-length limited encoding is adopted for compressing and encoding the Graphics Object because the run-length limited encoding is the most appropriate for compressing and decompressing the subtitles. The subtitles have characteristics that a length in a horizontal direction becomes relatively long, and accordingly, high compression rate is obtained by using the run-length limited encoding. In addition, the run-length limited encoding is preferable for making software for decoding because the load in decompression is low. Further, in order to share the apparatus structure for decoding between the subtitles and the Graphics Object, the same compression/decompression method as for the subtitles is employed for the Graphics Object. However, using the run-length limited encoding is not an essential part of the present invention, and the Graphics Object may be PNG data. Moreover, the Graphics Object is not required to be the raster data and may be vector data. In addition, the Graphics Object may be transparent graphics.

(9) A target for display effect by the PCS may be the graphics for the subtitles selected based on a language setting of the reproduction apparatus. Realizing such a display has a high utilitarian value, because it becomes possible to realize an effect, which is realized by the moving picture itself in the conventional DVD, by the subtitle graphics displayed according to the language setting of the reproduction apparatus.

(10) A target for display effect by the PCS may be the graphics for the subtitles selected based on a display setting of the reproduction apparatus. Specifically, Graphics for various display modes such as a wide-vision, a pan-scan, and a letterbox are recorded in the BD-ROM, and the reproduction apparatus select any of the recorded settings based on the setting for the TV to which the reproduction apparatus is connected. In this case, the display effect based on the PCS is performed to the subtitle graphics displayed according to the display setting, the subtitles look more impressive and professional. Realizing such a display has a high utilitarian value, because it becomes possible to realize an effect similar to the effect realized in the moving picture itself in the conventional DVD, by the subtitle graphics being displayed according to the display setting of the reproduction apparatus.

(11) In the first embodiment, the Window size is set to be 25% of an entire Graphics Plane in order to set the writing rate Rc to the Graphics Plane to the rate at which the clearing of the Graphics Plane and redrawing is performed in one frame. However, the Rc may be set so that the clearing and re-drawing are completed during a vertical retrace period. Given that the vertical retrace period is 25% of 1/29.93 seconds, the Rc is 1 Gbps. Setting the Rc in such a way has a high utilitarian value, because it is possible to display the graphics smoother.

Further, it is also possible to perform the writing synchronously with line scanning, in addition to the writing during the vertical retrace period. By this, it is possible to display the graphics smoother even at the writing rate Rc is 256 Mbps.

(12) In the above embodiments, the Graphics Plane is mounted to the reproduction apparatus. However, it is also possible to mount a line buffer for storing decompressed pixels for a line in place of the Graphics Plane to the reproduction apparatus. Conversion into image signals is performed by line, and therefore the conversion into the image signals may be carried out with the line buffer alone.

(13) In the above embodiment, the explanations are given taking the text subtitles for the movie as the examples of the graphics. However, the graphics may include such as a combination of devices, characters, and colors that constitute a trade mark, a national crest, a national flag, a national emblem, a symbol and a great seal for supervision or certification that a national government uses, a crest, a flag, or an emblem of an international organization, or a mark of origin of a particular item.

(14) In the first embodiment, the Window for rendering the subtitles is defined either at an upper side of the screen, or the bottom of the screen, assuming that the subtitles are written horizontally. However, the Window may be defined to appear either on left or right side of the screen so as to display the subtitles or the left and right of the screen. In this way, it is possible to change text direction and display subtitles vertically.

(15) The AVClip in the above embodiments constitutes the movie. However, the AVClip may also be used for karaoke. In this case, the PCS may perform the display effect such that the color of the subtitles changes along with a song.

REFERENCE NUMBERS

1 BD drive
2 Read Buffer
3 PID Filter
4 TB Buffer
5 Video Decoder
6 Video Plane
7 Audio Decoder
8 Graphics Plane
9 CULT unit
10 adder
12 Graphics Decoder
13 Coded Data Buffer 14 Stream Graphics Processor
16 Composition Buffer
17 Graphics Controller
200 reproduction apparatus
300 TV
400 remote controller

INDUSTRIAL APPLICABILITY

A recording medium and a reproduction apparatus according to the present invention are capable of displaying subtitles with a display effect. Accordingly, it is possible to add higher values to movies supplied in the market, and to activate markets for films and consumer products. Thus, the recording medium and the reproduction apparatus according to the present invention have high industrial applicability in industry such as the film industry and consumer products industry.

The invention claimed is:
1. A playback method comprising:
presenting first graphics data including second graphics data and third graphics data on a graphics plane at a first time, the second graphics data being different from the third graphics data;
overlaying the first graphics data presented on the graphics plane onto first video data presented on a video plane;
presenting fourth graphics data including the second graphics data and fifth graphics data on the graphics plane at a second time which is after the first time, the second graphics data being different from the fifth graphics data; and
overlaying the fourth graphics data presented on the graphics plane onto second video data presented on the video plane,
wherein a window is defined on the graphics plane, and the third graphics data presented in the window is different from the fifth graphics data presented in the window,
wherein the second graphics data is presented outside of the window, and
wherein, when the fourth graphics data is presented on the graphics plane, the second graphics data presented outside of the window is not redrawn.
2. A playback method of claim 1,
wherein graphics data stored in an object buffer includes first cropped graphics data and second cropped graphics data,
wherein the first cropped graphics data is sent to the graphics plane from the object buffer, and
wherein the second cropped graphics data is sent to the graphics plane from the object buffer.

* * * * *